United States Patent
Sabella et al.

(10) Patent No.: US 12,302,275 B2
(45) Date of Patent: May 13, 2025

(54) MULTI-ACCESS EDGE COMPUTING (MEC) APPLICATION REGISTRY IN MEC FEDERATION

(71) Applicant: Intel Corporation, Santa Clara, CA (US)

(72) Inventors: Dario Sabella, Gassino (IT); Miltiadis Filippou, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/280,149

(22) PCT Filed: Jul. 1, 2022

(86) PCT No.: PCT/US2022/035974
§ 371 (c)(1),
(2) Date: Sep. 1, 2023

(87) PCT Pub. No.: WO2023/003686
PCT Pub. Date: Jan. 26, 2023

(65) Prior Publication Data
US 2024/0147404 A1    May 2, 2024

Related U.S. Application Data

(60) Provisional application No. 63/224,072, filed on Jul. 21, 2021.

(51) Int. Cl.
*H04L 67/10*     (2022.01)
*G06F 9/455*     (2018.01)
*H04W 60/04*    (2009.01)

(52) U.S. Cl.
CPC ........ *H04W 60/04* (2013.01); *G06F 9/45533* (2013.01); *H04L 67/10* (2013.01)

(58) Field of Classification Search
CPC ................................. H04L 67/10; H04L 67/51
See application file for complete search history.

(56) References Cited

U.S. PATENT DOCUMENTS

2019/0141142 A1* 5/2019 Filippou ................. H04W 4/40
2020/0288302 A1* 9/2020 Feng .................... H04W 36/305
(Continued)

FOREIGN PATENT DOCUMENTS

WO    WO-2023003686 A1    1/2023

OTHER PUBLICATIONS

"International Application Serial No. PCT/US2022/035974, International Search Report mailed Oct. 25, 2022", 2 pgs.
(Continued)

*Primary Examiner* — Johnny B Aguiar
(74) *Attorney, Agent, or Firm* — Schwegman Lundberg & Woessner, P.A.

(57) ABSTRACT

Various systems and methods are described implementing a multi-access edge computing (MEC) based system to realize MEC application registration and application data functions for MEC frameworks. In an example, operations are performed at a MEC orchestrator to maintain a registry of applications within a MEC system or among a federation of MEC systems, with the MEC orchestrator performing operations including: identifying, based on the communications with a plurality of MEC hosts, a plurality of applications provided by the MEC hosts in the MEC system (or, by applications provided by a plurality of MEC hosts in a federation); storing and synchronizing application information for the plurality of applications in a registry; and communicating the application information from the registry to an entity of the MEC system or to an entity federated with the MEC system.

20 Claims, 20 Drawing Sheets

(56) References Cited

U.S. PATENT DOCUMENTS

2022/0086218 A1* 3/2022 Sabella .................. H04M 15/66
2022/0224600 A1* 7/2022 Giust .................... H04L 67/141
2022/0232386 A1* 7/2022 Sehrawat ............ H04L 63/0807

OTHER PUBLICATIONS

"International Application Serial No. PCT/US2022/035974, Written Opinion mailed Oct. 25, 2022", 6 pgs.
"Multi-access Edge Computing (MEC); Study on Inter-MEC systems and MEC-Cloud systems coordination", ETSIGR MEC 035 V3.1.1, (Jun. 2021), 1-52.
Cao, Xiaofeng, et al., "Edge Federation: Towards an Integrated Service Provisioning Model", IEEE/ACM Transactions On Networking, vol. 28, No. 3,, (Mar. 2020), 14 pgs.
Kiril, Antevski, et al., "DLT federation for Edge robotics", arXiv:2010.01977v1 [cs.NI], (Oct. 2020), 1-6.
Luis, M Contreras, et al., "Overview of Architectural Alternatives for the Integration of ETSI MEC Environments from Different Administrative Domains", electronics, 9,, (Aug. 28, 2020), 1-20.
"3GPP; TSG SA; Architecture for enabling Edge Applications (Release 17)", 3GPP TS 23.558 V17.0.0, (Jun. 2021), 157 pages.
"ETSI GS MEC 003 V2.2.1", Multi-access Edge Computing (MEC); Framework and Reference Architecture, (Dec. 2020), 21 pgs.
"ETSI GS MEC 010-2 V2.1.1", Multi-access Edge Computing (MEC); MEC Management; Part 2: Application lifecycle, rules and requirements management, (Nov. 2019), 134 pgs.
"Harmonizing standards for edge computing—A synergized architecture leveraging ETSI ISG MEC and 3GPP specifications", ETSI White Paper #36 [Online]. Retrieved from the Internet: <URL: https://www.etsi.org/images/files/ETSIWhitePapers/ETSI_wp36_Harmonizing-standards-for-edge-computing.pdf>, (Jul. 2020), 14 pgs.
"International Application Serial No. PCT/US2022/035974, International Preliminary Report on Patentability mailed Feb. 1, 2024", 8 pgs.
"Multi-access Edge Computing (MEC); Federation enablement APIs", Draft ETSI GS MEC 040 V3.0.9, (Mar. 2022), 29 pages.
"Multi-access Edge Computing MEC General principles for MEC Service APIs", ETSI GS MEC 009 V2.1.1, (Jan. 2019), 64 pages.
"Operator Platform Telco Edge Requirements", GSMA Version 1.0, (Jun. 29, 2021), 124 pgs.
Berners-Lee, T. ., et al., "Uniform Resource Identifier URI Generic Syntax", IETF Network Working Group RFC 3986, (Jan. 2005).
Dario, Sabella, "MEC: Multi-access Edge Computing; State of play from ETSI MEC", IEEE WoWMom 2021, ETSI, (Jun. 9, 2021).
Fielding, et al., "Hypertext Transfer Protocol HTTP1.1 Semantics and Content", Internet Engineering Task Force (IETF) RFC 7231, (Jun. 2014), 101 pages.
Ha, Kiryong, et al., "OpenStack for Cloudlet Deployment", School of Computer Science Carnegie Mellon University Pittsburgh. http://www.cs.cmu.edu/afs/cs/user/satya/Web/docdir/CMU-CS-15-123.pdf, (Aug. 2015), 24 pages.
Nottingham, M, "URI Design and Ownership", Internet Engineering Task Force (IETF) RFC 8820 https://datatracker.ietf.org/doc/html/rfc8820, (Jun. 2020), 8 pages.

* cited by examiner

MULTI-ACCESS EDGE COMPUTING (MEC) APPLICATION REGISTRY IN MEC FEDERATION

PRIORITY APPLICATION

This application is a U.S. National Stage Application under 35 U.S.C. 371 from International Application No. PCT/US2022/035974, filed Jul. 1, 2022, published as WO 2023/003686, which claims the benefit of priority to: U.S. Provisional Patent Application No. 63/224,072, filed Jul. 21, 2021, all of which are incorporated by reference herein in their entirety.

TECHNICAL FIELD

Embodiments described herein generally relate to data processing, network communication, and communication system implementations, and in particular, to techniques implemented in a federated multi-access edge computing (MEC) framework.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with MEC approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for the operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

Similarly, Internet of Things (IoT) networks and devices are designed to offer a distributed compute arrangement, from a variety of endpoints. IoT devices are physical or virtualized objects that may communicate on a network and may include sensors, actuators, and other input/output components, which may be used to collect data or perform actions in a real-world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, private enterprise networks (e.g., software-defined wide-area networks, or SD-WANs), and IoT networks, devices, and services have introduced a number of advanced use cases and scenarios occurring at and towards the edge of the network. However, these advanced use cases have also introduced a number of corresponding technical challenges relating to security, processing, and network resources, service availability, and efficiency, among many other issues. One such technical challenge is concerning applications available to and used by the various entities of a MEC federation. In this regard, an improvement of the operational information available among the various operating partners (e.g., mobile network operators, edge service providers, etc.) is needed to ensure proper collaboration in the MEC federation.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 11:
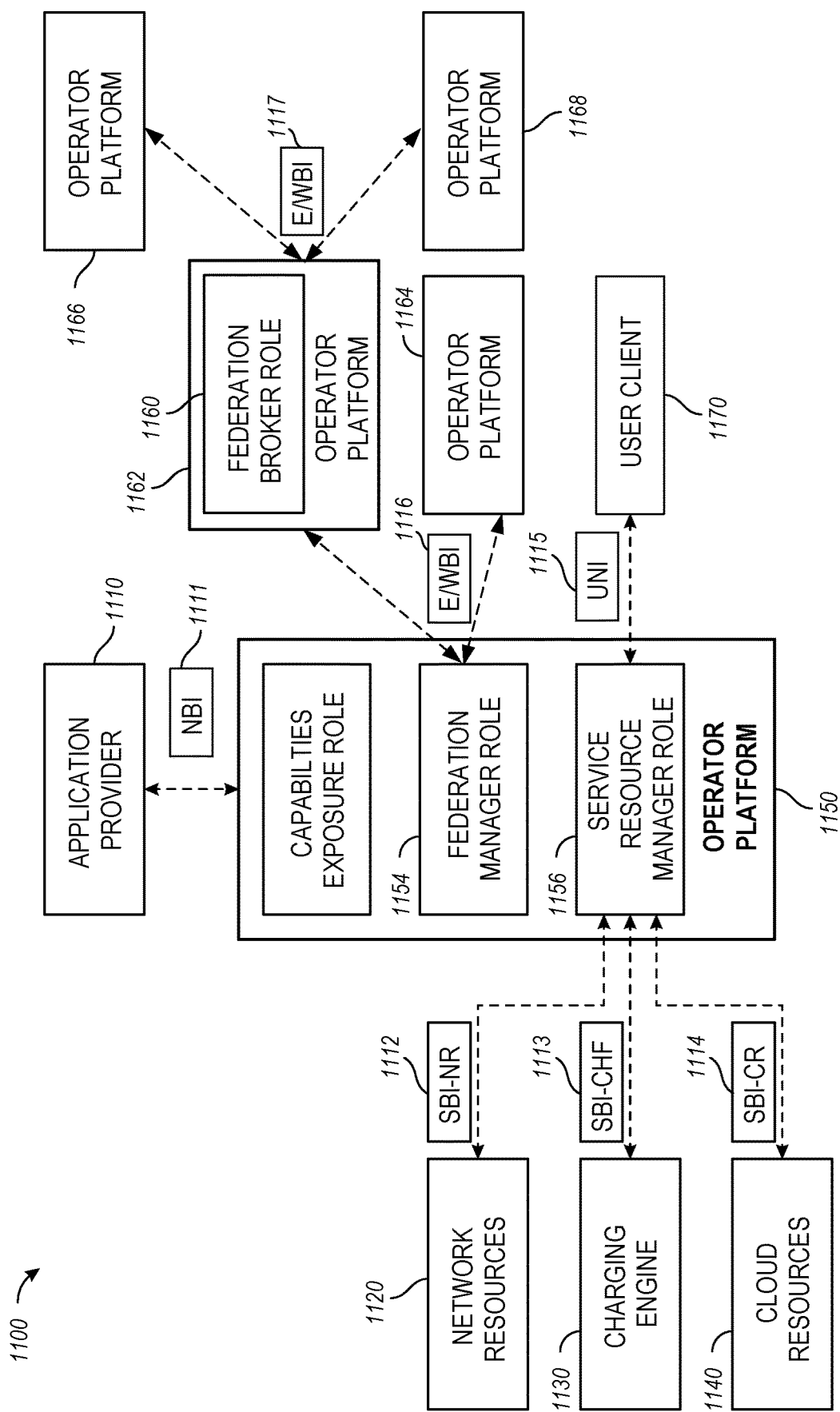
FIG. 11 depicts an Operator Platform (OP) reference architecture, according to an example.

In the following description, methods, configurations, and related apparatuses are disclosed for providing a hierarchical framework to enable a MEC App Registry in a MEC Federation. In scenarios where a MEC Federation contains different MEC systems (or, different OP instances in the GSMA Operator Platform Group (OPG) architecture, as depicted in FIG. 11 below), the present disclosure provides an interoperable interface to developers accessing a MEC Federation, with a list of available MEC Applications and Services. The present disclosure also ensures privacy and heterogeneous presence of federating members, each one with its own policy, needs/requirements to expose information, customized access policies and capabilities to offer customized tools to developers.

For these purposes, an example hierarchical framework is discussed herein, which enables deployment and use of one or more of the following components:

1) The definition of a "MEC App Registry" object type (referred to herein as "REGAPP"), that contains customizable information, provided by the federating entities and offered to the developer, according to GSMA OPG requirements;

2) A set of OP-level instances of those REGAPP objects (these instances are referred to herein as "FED-REGAPPs"), each one contained in the MEC Federation Manager (MEFM) of the respective OP instance of the federating member;

A distributed set of Multi-access Edge Platform (MEP, e.g., MEC platform) instances of those REGAPP objects (these instances are referred to herein as "MEP-REGAPPs") within each OP instance of the federation, synchronized with their hierarchical FED-REGAPP (via a Mobile Edge Orchestrator (MEO)), (as noted below, such instances are optional, based on the OP capabilities and internal OP implementation); and 4) A hierarchical communication protocol for enabling the REGAPP operation, composed by a set of messages at an E/WBI level, to allow information exchange among FED-REGAPP instances related to the involved federating members; consequently to the hierarchical framework, a set of internal messages at MEC system and host level to allow information exchange among each MEP-REGAPP instances within OP instances.

The hierarchical framework discussed herein may involve ETSI MEC standards such as, for example, ETSI GS MEC 040, including the mechanisms that enable NBI and E/WBI interfaces. The hierarchical framework also introduces a globally interoperable mechanism to enable MEC applications operations in a MEC federated environment. This multi Mobile Network Operator (multi-MNO) scenario is relevant to many settings involving network operators, who collaborate to deploy MEC technology and offer MEC services.

It will be understood that the following hierarchical framework may affect a variety of users, including datacenter users, end users, and application developers. This hierarchical framework may also help enable the adoption of edge computing as hardware processing operations are expanded at the edge of the network. Accordingly, the present hierarchical framework is applicable to specific MEC platform implementations, such as OpenNESS and Intel® Smart Edge, among others.

The hierarchical framework discussed herein enables instances of a MEC app registry for the MEC federation, and defines proper messages among MEC systems, exchanged via a E/WBI interface, which may be standardized in ETSI MEC (and potentially certified by OPG). The introduced communication protocol is composed not only by internal messages (within a MEC system) but also external messages (among different MEC systems). As a result, it will be understood that the adoption of this framework will provide benefits to both ETSI MEC and GSMA OPG standards and implementations.

The present MEC federation and application registration techniques may be coordinated and monitored in a variety of device and computing system deployment environments involving the edge computing/edge cloud deployments, cloud deployments, Internet of Things (IoT) networks, Multi-Access Edge Computing (MEC) systems including MEC-based automotive deployments, edge workloads such as network function virtualization (NFV) implementations or other virtualized node functions, and other aspects of networking technologies. The present techniques and configurations may be utilized in connection with many aspects of current networking systems, but are provided regarding Edge Cloud, IoT, MEC, and other distributed computing deployments including automotive deployments. The following systems and techniques may be implemented in, or augment, a variety of distributed, virtualized, or managed edge computing systems. These include environments in which network services are implemented or managed using multi-access edge computing (MEC) or 4G/5G wireless network configurations; or in wired network configurations involving fiber, copper, and other connections. Further, aspects of processing by the respective computing components may involve computational elements that are in the geographical proximity of user equipment or other endpoint locations, such as a smartphone, vehicular communication component, IoT device, etc. Further, the presently disclosed techniques may relate to other Edge/MEC/IoT network communication standards and configurations, and other intermediate processing entities and architectures.

The present MEC federation and application registration techniques and configurations facilitate the establishment of MEC federation enabling secure communication among the OP partners. Such a development enables and supports new business and market deployments with regards to MEC and cloud computing technology. More particularly, the framework addresses the needs of the entire ecosystem of computing (from MNOs to Edge Cloud vendors, to Infrastructure providers, etc.).

The examples disclosed herein may utilize various aspects in connection with a variety of computing deployments to achieve improved interoperability with OPs. Below, a discussion of such computing deployments is provided in FIGS. 1 to 10, followed by a discussion of specific MEC App Registry features in FIGS. 11 to 18.

Example Edge Computing Architectures

Figure 1:
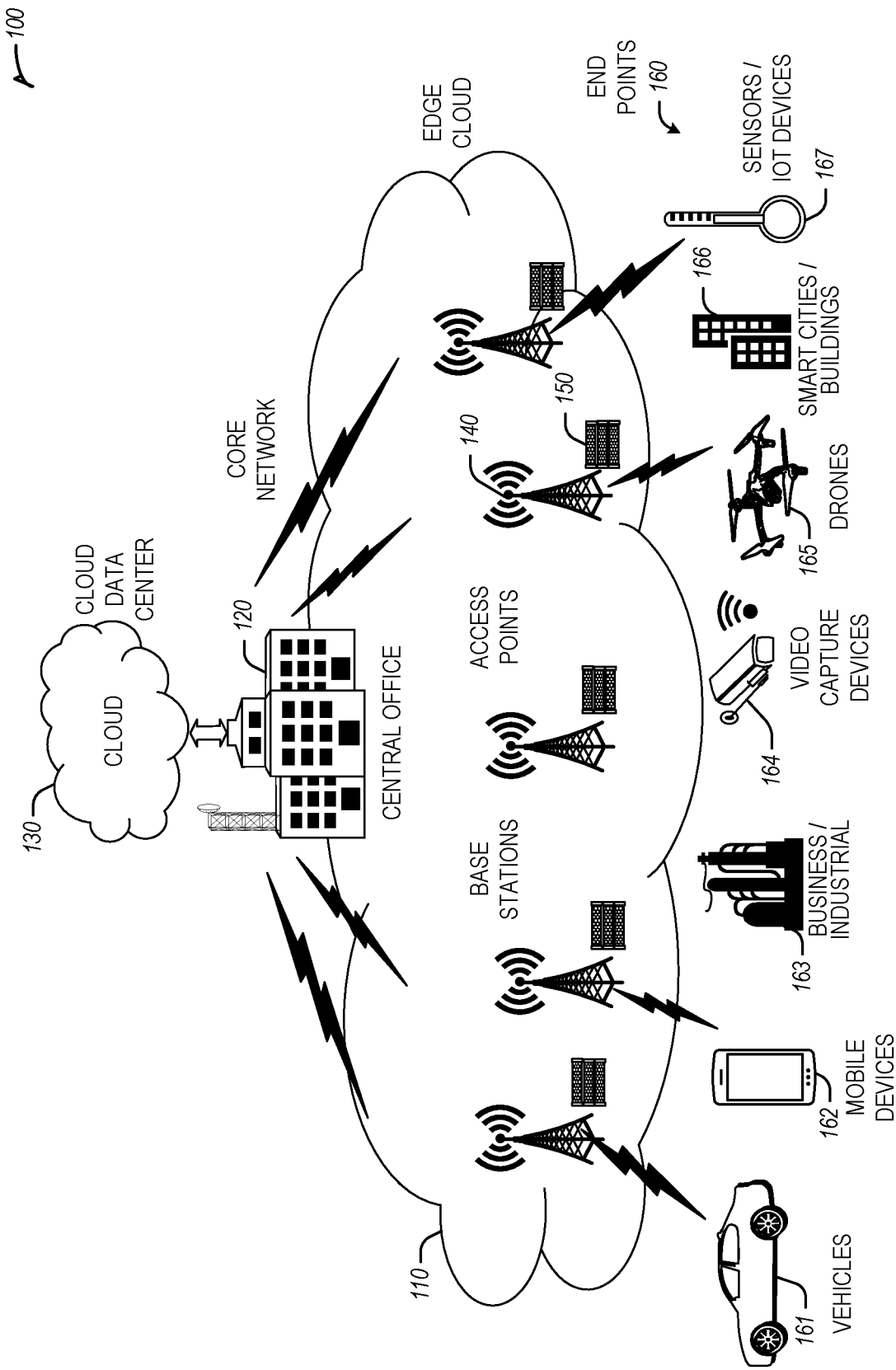
FIG. 1 illustrates an overview of an edge cloud configuration for edge computing, according to an example.

FIG. 1 is a block diagram 100 showing an overview of a configuration for edge computing, which includes a layer of processing referenced in many of the current examples as an "edge cloud". This network topology, which may include a number of conventional networking layers (including those not shown herein), may be extended through the use of a MEC Federation and MEC System interconnections discussed herein.

As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally, decrease depending on the edge location (e.g., fewer processing resources being available at consumer end point devices than at a base station or at a central office). However, the closer that the edge location is to the endpoint (e.g., user equipment (UEs)), the more that space and power are constrained. Thus, edge computing, as a general design principle, attempts to minimize the resources needed for network services, through the distribution of more resources which are located closer both geographically and in-network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86, AMD® or ARM® hardware architectures) implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Within edge computing networks, there may be scenarios in services in which the compute resource will be "moved" to the data, as well as scenarios in which the data will be "moved" to the compute resource. Or as an example, base station compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle. These and other scenarios may involve the use of MEC federation, as provided in the discussion below.

In contrast to the network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage but is not optimal for highly time-varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage, and processing as well as remote cloud data-center based storage and processing. Key performance indicators (KPIs) may be used to identify where sensor data is best transferred and where it is processed or stored. This typically depends on the International Organization for Standardization (ISO) layer dependency of the data. For example, lower layer (Physical (PHY), Media Access Control (MAC), routing, etc.) data typically changes quickly and is better handled locally to meet latency requirements. Higher layer data such as Application-Layer data is typically less time-critical and may be stored and processed in a remote cloud data-center.

Figure 2:
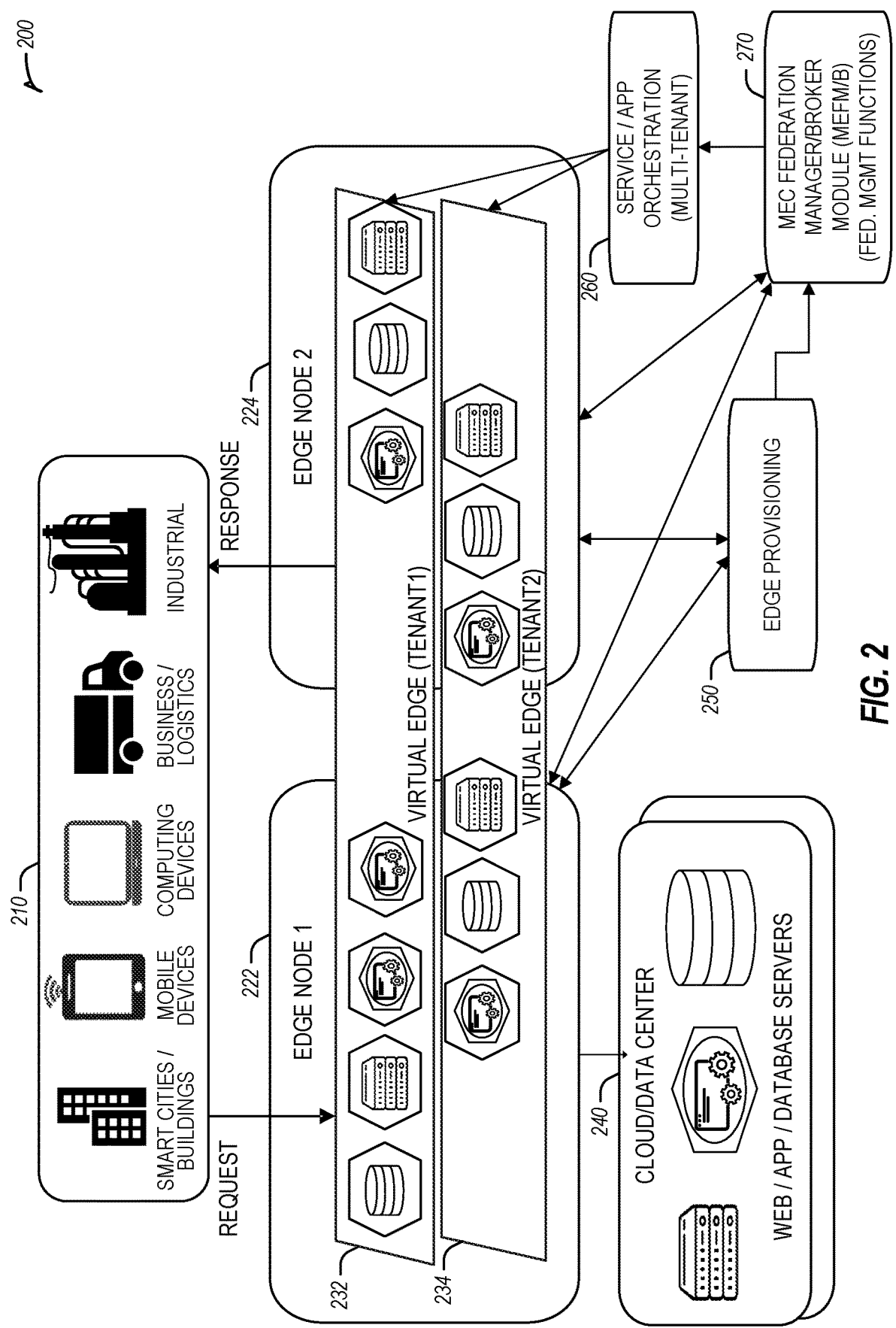
FIG. 2 illustrates deployment and orchestration for virtual edge configurations across an edge-computing system operated among multiple edge nodes and multiple tenants, according to an example.

FIG. 2 illustrates deployment and orchestration for virtual edge configurations across an edge computing system operated among multiple edge nodes and multiple tenants. Specifically, FIG. 2 depicts coordination of a first edge node 222 and a second edge node 224 in an edge computing system 200, to fulfill requests and responses for various client endpoints 210 (e.g., smart cities/building systems, mobile devices, computing devices, business/logistics systems, industrial systems, etc.), which access various virtual edge instances. The virtual edge instances 232, 234 (or virtual edges) provide edge compute capabilities and processing in an edge cloud, with access to a cloud/data center 240 for higher-latency requests for websites, applications, database servers, etc. Thus, the edge cloud enables coordination of processing among multiple edge nodes for multiple tenants or entities.

In the example of FIG. 2, these virtual edge instances include a first virtual edge 232, offered to a first tenant (Tenant 1), which offers a first combination of edge storage, computing, and services; and a second virtual edge 234, offering a second combination of edge storage, computing, and services, to a second tenant (Tenant 2). The virtual edge instances 232, 234 are distributed among the edge nodes 222, 224, and may include scenarios in which a request and response are fulfilled from the same or different edge nodes. The configuration of each edge node 222, 224 to operate in a distributed yet coordinated fashion occurs based on edge provisioning functions 250. The functionality of the edge nodes 222, 224 to provide coordinated operation for applications and services, among multiple tenants, occurs based on orchestration functions 260.

The Multi-access edge Federation Manager and Broker (MEFM/B) 270 can be used to configure and perform federation management and broker functions within a communication network, including a federated MEC framework including multiple MEC systems (e.g., as discussed in connection with FIGS. 5A-6 and FIGS. 11-18). For example, as a service is provided in a MEC framework and network (e.g., among the edge nodes 222, 224), the MEFM/B 270 may coordinate MEC federation and MEC operations. More details on federation management and application registration functions are discussed in connection with FIGS. 5A-6 and FIGS. 11-18.

It should be understood that some of the devices in 210 are multi-tenant devices where Tenant1 may function within a Tenant1 'slice' while a Tenant2 may function within a Tenant2 'slice' (and, in further examples, additional or sub-tenants may exist; and each tenant may even be specifically entitled and transactionally tied to a specific set of features all the way to specific hardware features). A trusted multi-tenant device may further contain a tenant-specific cryptographic key such that the combination of a key and a slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for secured and authenticated layering of device capabilities (such as with use of a Field Programmable Gate Array (FPGA)). The RoT also may be used for a trusted computing context to support respective tenant operations, etc. Use of this RoT and the security architecture may be enhanced by the attestation operations further discussed herein.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS (function as a service) engines, servlets, servers, or other computation abstraction may be partitioned according to a DICE layering and fan-out structure to support a RoT context for each. Accordingly, the respective RoTs spanning devices in 210, 222, and 240 may coordinate the establishment of a distributed trusted computing base (DTCB) such that a tenant-specific virtual trusted secure channel linking all elements end-to-end can be established.

Further, it will be understood that a container may have data or workload-specific keys protecting its content from a previous edge node. As part of the migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

As an example, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 2. An orchestrator may use a DICE layering and fan-out construction to create a root of trust context that is tenant specific. Thus, orchestration functions, provided by an orchestrator, may participate as a tenant-specific orchestration provider.

Accordingly, an edge-computing system may be configured to fulfill requests and responses for various client endpoints from multiple virtual edge instances (and, from a cloud or remote data center, not shown). The use of these virtual edge instances supports multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications, latency-sensitive applications, latency-critical applications, user plane applications, networking applications, etc.). The virtual edge instances may also be spanned across systems of multiple owners at different geographic locations (or, respective computing systems and resources which are co-owned or co-managed by multiple owners).

For instance, each edge node 222, 224 may implement the use of containers, such as with the use of a container "pod" 226, 228 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices of virtual edges 232, 234 are partitioned according to the needs of each container.

With the use of container pods, a pod controller oversees the partitioning and allocation of containers and resources. The pod controller receives instructions from an orchestrator (e.g., performing orchestration functions 260) that instructs the controller on how best to partition physical resources and for what duration, such as by receiving key performance indicator (KPI) targets based on SLA contracts. The pod controller determines which container requires which resources and for how long to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents the assignment of resources until the right tenant authenticates or prevents provisioning of data or a workload to a container until an attestation result is satisfied.

Also, with the use of container pods, tenant boundaries can still exist but in the context of each pod of containers. If each tenant-specific pod has a tenant-specific pod controller, there may be a shared pod controller that consolidates resource allocation requests to avoid typical resource starvation situations. Further controls may be provided to ensure the attestation and trustworthiness of the pod and pod controller. For instance, the orchestrator 260 may provision an attestation verification policy to local pod controllers that perform attestation verification. If an attestation satisfies a policy for a first tenant pod controller but not a second tenant pod controller, then the second pod may be migrated to a different edge node that does satisfy it. Alternatively, the first pod may be allowed to execute and a different shared pod controller is installed and invoked before the second pod executing.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside from the execution of virtualized network functions).

Within the edge cloud, a first edge node 222 (e.g., operated by a first owner) and a second edge node 224 (e.g., operated by a second owner) may operate or respond to a container orchestrator to coordinate the execution of various applications within the virtual edge instances offered for respective tenants. For instance, the edge nodes 222, 224 may be coordinated based on edge provisioning functions 250, while the operation of the various applications is coordinated with orchestration functions 260.

Various system arrangements may provide an architecture that treats Virtual Machines (VMs), Containers, and Functions equally in terms of application composition (and resulting applications are combinations of these three ingredients). Each ingredient may involve the use of one or more accelerator (e.g., Field-Programmable Gate Array (FPGA), Application-Specific Integrated Circuit (ASIC)) components as a local backend. In this manner, applications can be split across multiple edge owners, coordinated by an orchestrator.

Figure 3:
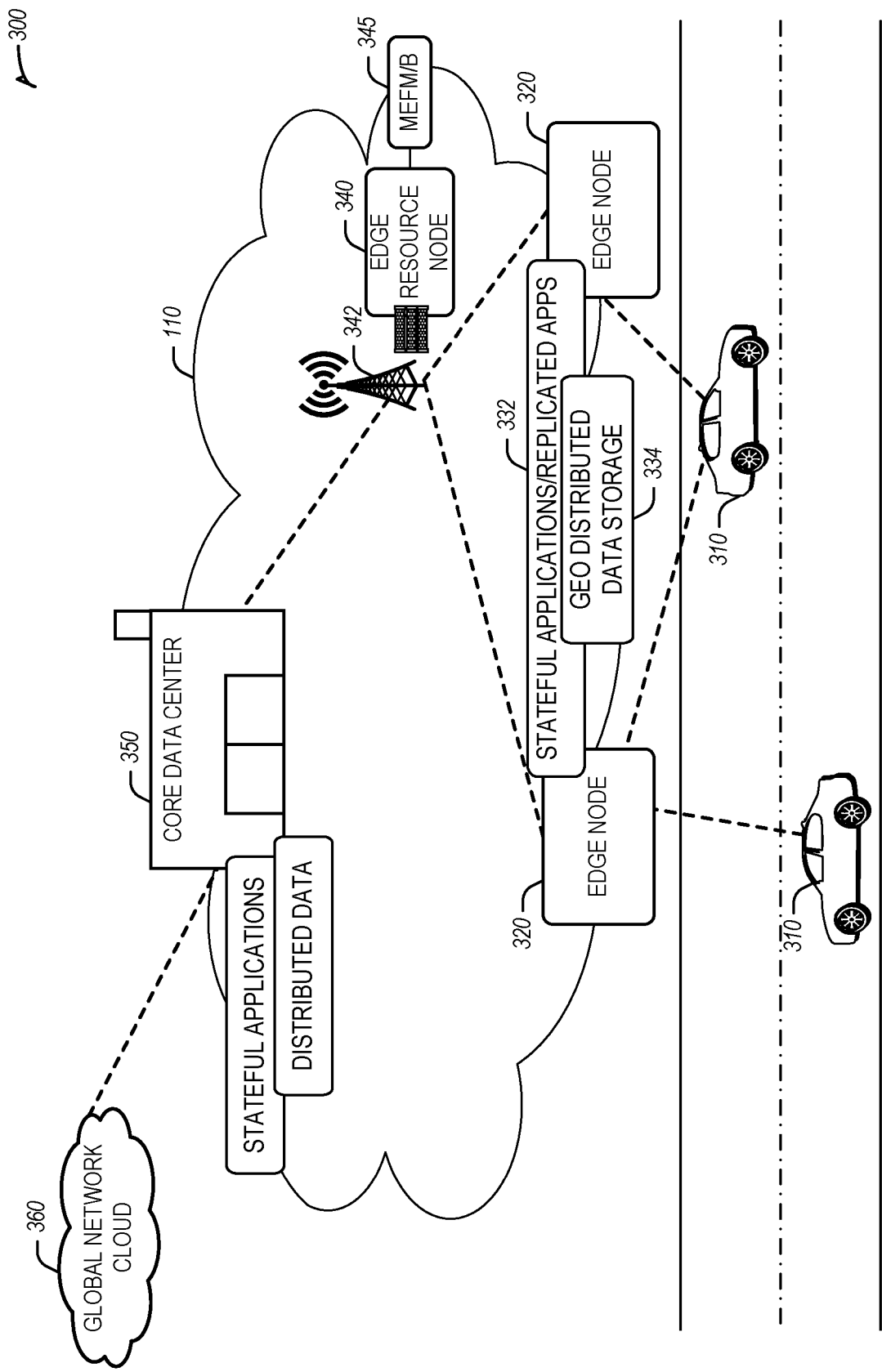
FIG. 3 illustrates a vehicle compute and communication use case involving mobile access to applications in an edge-computing system, according to an example.

It should be appreciated that the edge computing systems and arrangements discussed herein may be applicable in various solutions, services, and/or use cases. As an example, FIG. 3 shows a simplified vehicle compute and communication use case involving mobile access to applications in an edge computing system 300 that implements an edge cloud 110 and an MEFM/B 345 (which can be the same as the federation manager and broker entity/entities discussed in connection with FIGS. 5A-6 and FIGS. 11-18). In this use case, each client compute node 310 may be embodied as in-vehicle compute systems (e.g., in-vehicle navigation and/or infotainment systems) located in corresponding vehicles that communicate with the edge gateway nodes 320 during traversal of a roadway. For instance, edge gateway nodes 320 may be located in roadside cabinets, which may be placed along the roadway, at intersections of the roadway, or other locations near the roadway. As each vehicle traverses along the roadway, the connection between its client compute node 310 and a particular edge gateway node 320 may propagate to maintain a consistent connection and context for the client compute node 310. Each of the edge gateway nodes 320 includes some processing and storage capabilities and, as such, some processing and/or storage of data for the client compute nodes 310 may be performed on one or more of the edge gateway nodes 320.

Each of the edge gateway nodes 320 may communicate with one or more edge resource nodes 340, which are illustratively embodied as compute servers, appliances or components located at or in a communication base station 342 (e.g., a base station of a cellular network). As discussed above, each edge resource node 340 includes some processing and storage capabilities, and, as such, some processing and/or storage of data for the client compute nodes 310 may be performed on the edge resource node 340. For example, the processing of data that is less urgent or important may be performed by the edge resource node 340, while the processing of data that is of a higher urgency or importance may be performed by edge gateway devices or the client nodes themselves (depending on, for example, the capabilities of each component). Further, various wired or wireless communication links (e.g., fiber optic wired backhaul, 5G wireless links) may exist among the edge nodes 320, edge resource node(s) 340, core data center 350, and network cloud 360.

The edge resource nodes 340 (or any other edge nodes within the edge computing system 300) may further include an MEFM/B 345 configured to perform federation management and broker functions within a communication network, such as an edge computing system 300 implementing a MEC federation. For example, as a service or apps is provided in a MEC framework and network (e.g., among the edge nodes 340 or 320), the MEFM/B 270 may coordinate MEC federation and MEC operations. Various federation management and application registration techniques functions are also discussed in connection with FIGS. 5A-6 and FIGS. 11-18.

The edge resource node(s) 340 also communicate with the core data center 350, which may include compute servers, appliances, and/or other components located in a central location (e.g., a central office of a cellular communication network). The core data center 350 may provide a gateway to the global network cloud 360 (e.g., the Internet) for the edge cloud 110 operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low urgency or importance, or high complexity). The edge gateway nodes 320 or the edge resource nodes 340 may offer the use of stateful applications 332 and a geographically distributed data storage 334 (e.g., database, data store, etc.).

In further examples, FIG. 3 may utilize various types of mobile edge nodes, such as an edge node hosted in a vehicle (e.g., car, truck, tram, train, etc.) or other mobile units, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 320, some others at the edge resource node 340, and others in the core data center 350 or the global network cloud 360.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example Internet of Things Architectures

Figure 4:
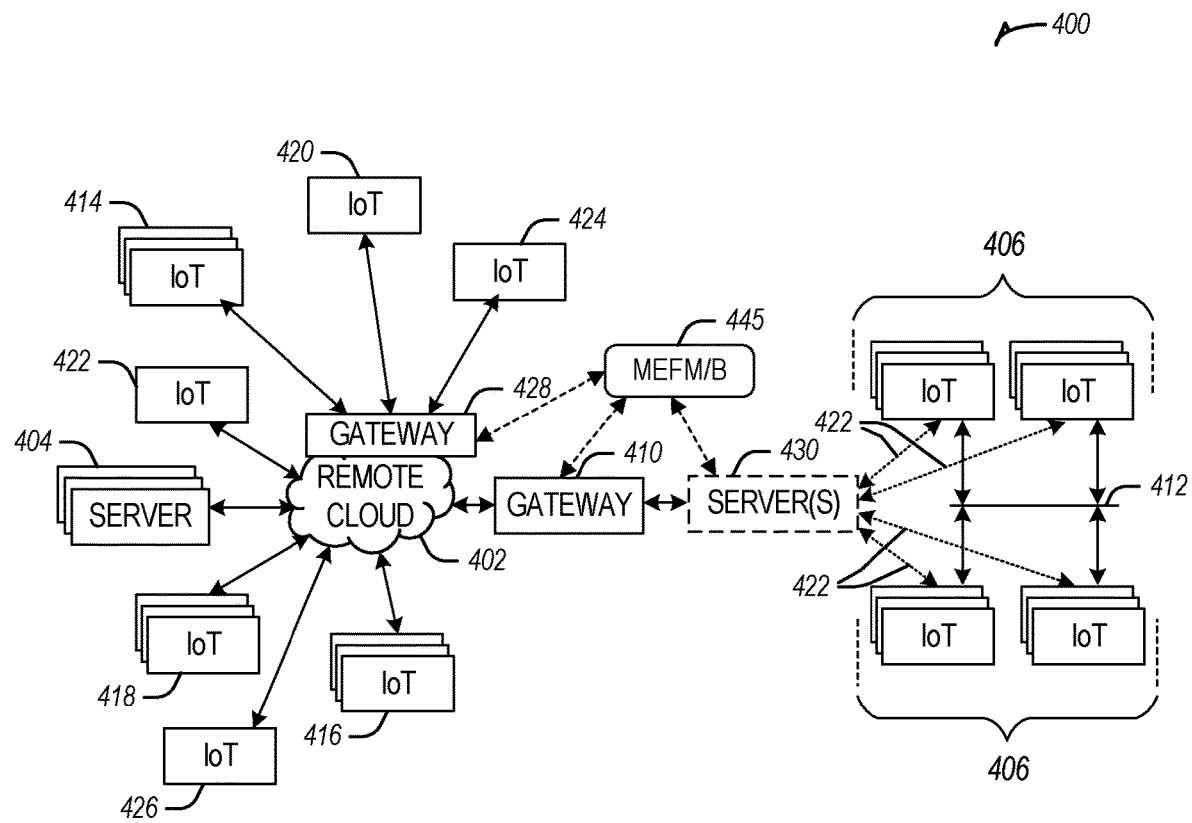
FIG. 4 illustrates a block diagram depicting deployment and communications among several Internet of Things (IoT) devices, according to an example.

As a more detailed illustration of an Internet of Things (IoT) network, FIG. 4 illustrates a drawing of a cloud or edge computing network 400, in communication with several IoT devices and an MEFM/B 445. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar (or lower) cost compared to the cost of smaller numbers of larger devices. However, an IoT device may be a smartphone, laptop, tablet, or Personal Computer (PC), or other larger device. Further, an IoT device may be a virtual device, such as an application on a smartphone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Returning to FIG. 4, the network 400 may represent portions of the Internet or may include portions of a local area network (LAN), or a wide area network (WAN), such as a proprietary network for a company. The IoT devices may include any number of different types of devices, grouped in various combinations. For example, a traffic control group 406 may include IoT devices along streets in a city. These IoT devices may include stoplights, traffic flow monitors, cameras, weather sensors, and the like. The traffic control group 406, or other subgroups, may be in communication within the network 400 through wired or wireless links 408, such as LPWA links, optical links, and the like. Further, a wired or wireless sub-network 412 may allow the IoT devices to communicate with each other, such as through a local area network, a wireless local area network, and the like. The IoT devices may use another device, such as a gateway 410 or 428 to communicate with remote locations such as remote cloud 402; the IoT devices may also use one or more servers 430 to facilitate communication within the network 400 or with the gateway 410. For example, the one or more servers 430 may operate as an intermediate network node to support a local edge cloud or fog implementation among a local area network. Further, the gateway 428 that is depicted may operate in a cloud-to-gateway-to-many edge devices configuration, such as with the various IoT devices 414, 420, 424 being constrained or dynamic to an assignment and use of resources in the network 400.

In an example embodiment, the network 400 can further include an MEFM/B 445 configured to perform federation management, broker functions, and application registration techniques within the network 400. For example, as a service is provided in a MEC framework and network within systems in the network 400, the MEFM/B 445 may coordinate MEC federation and MEC system operations. Other federation and application registration functions are also discussed in connection with FIGS. 5A-6 and FIGS. 11-18.

Other example groups of IoT devices may include remote weather stations 414, local information terminals 416, alarm systems 418, automated teller machines 420, alarm panels 422, or moving vehicles, such as emergency vehicles 424 or other vehicles 426, among many others. Each of these IoT devices may be in communication with other IoT devices, with servers 404, with another IoT device or system, another edge computing or "fog" computing system, or a combination therein. The groups of IoT devices may be deployed in various residential, commercial, and industrial settings (including in both private or public environments).

As may be seen from FIG. 4, a large number of IoT devices may be communicating through the network 400. This may allow different IoT devices to request or provide information to other devices autonomously. For example, a group of IoT devices (e.g., the traffic control group 406) may request a current weather forecast from a group of remote weather stations 414, which may provide the forecast without human intervention. Further, an emergency vehicle 424 may be alerted by an automated teller machine 420 that a burglary is in progress. As the emergency vehicle 424 proceeds towards the automated teller machine 420, it may access the traffic control group 406 to request clearance to the location, for example, by lights turning red to block cross traffic at an intersection in sufficient time for the emergency vehicle 424 to have unimpeded access to the intersection.

Clusters of IoT devices may be equipped to communicate with other IoT devices as well as with a cloud network. This may allow the IoT devices to form an ad-hoc network between the devices, allowing them to function as a single device, which may be termed a fog device or system. Clusters of IoT devices, such as may be provided by the remote weather stations 414 or the traffic control group 406, may be equipped to communicate with other IoT devices as well as with the network 400. This may allow the IoT devices to form an ad-hoc network between the devices, allowing them to function as a single device, which also may be termed a fog device or system.

In further examples, a variety of topologies may be used for IoT networks comprising IoT devices, with the IoT networks coupled through backbone links to respective gateways. For example, a number of IoT devices may communicate with a gateway, and with each other through the gateway. The backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/de-MUXing components that facilitate the interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through Institute of Electrical and Electronics Engineers (IEEE) 802.11 (Wi-Fi®) links, a cellular network used to communicate with IoT devices through an Long-Term Evolution (LTE)/LTE-Advanced (LTE-A) (4G) or 5G cellular network, and a low-power wide-area (LPWA) network, for example, a LPWA network compatible with the LoRaWan specification promulgated by the LoRa alliance, or an IPV6 over Low Power Wide-Area Networks (LP-WAN) network compatible with a specification promulgated by the Internet Engineering Task Force (IETF).

Further, the respective IoT networks may communicate with an outside network provider (e.g., a tier 2 or tier 3 provider) using any number of communication links, such as an LTE cellular link, a LPWA link, or a link based on the IEEE 802.15.4 standard, such as Zigbee®. The respective IoT networks may also operate with the use of a variety of network and internet application protocols such as the Constrained Application Protocol (CoAP). The respective IoT networks may also be integrated with coordinator devices that provide a chain of links that forms a cluster tree of linked devices and networks.

IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration, and quality of service (QoS) based swarming and fusion of resources.

An IoT network, arranged as a mesh network, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance, and deliver a metric of data confidence.

An IoT network, arranged as a WLAN network, for instance, may use systems that perform standards conversion to provide multi-standard connectivity, enabling IoT devices to use different protocols to communicate. Further systems may provide seamless interconnectivity across a multi-standard infrastructure comprising visible Internet resources and hidden Internet resources.

An IoT network, using communications in the cellular network, for instance, may be enhanced by systems that offload data, extend communications to more remote devices, or both. A LPWA network may include systems that perform non-Internet protocol (IP) to IP interconnections, addressing, and routing. Further, each of the IoT devices may include the appropriate transceiver for wide-area communications with that device. Further, each IoT device may include other transceivers for communications using additional protocols and frequencies.

In further examples, an edge or cloud computing network may be in communication with a mesh network of IoT devices at the edge of the cloud computing network. The mesh network of IoT devices may be termed a fog device or system, operating at the edge of the cloud. This fog device or system may be a massively interconnected network where several IoT devices are in communications with each other by radio links, for example. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the Open Mobile Alliance (OMA) Lightweight Machine to Machine (M2M) (LWM2M) protocol, among others.

These and other examples of IoT networks may be enhanced with the following uses of MEC federation and application registration techniques using the MEFM/B 445 or other entities as discussed in connection with FIGS. 5A-6 and FIGS. 11-18.

Example MEC Architectures

Figure 5A:
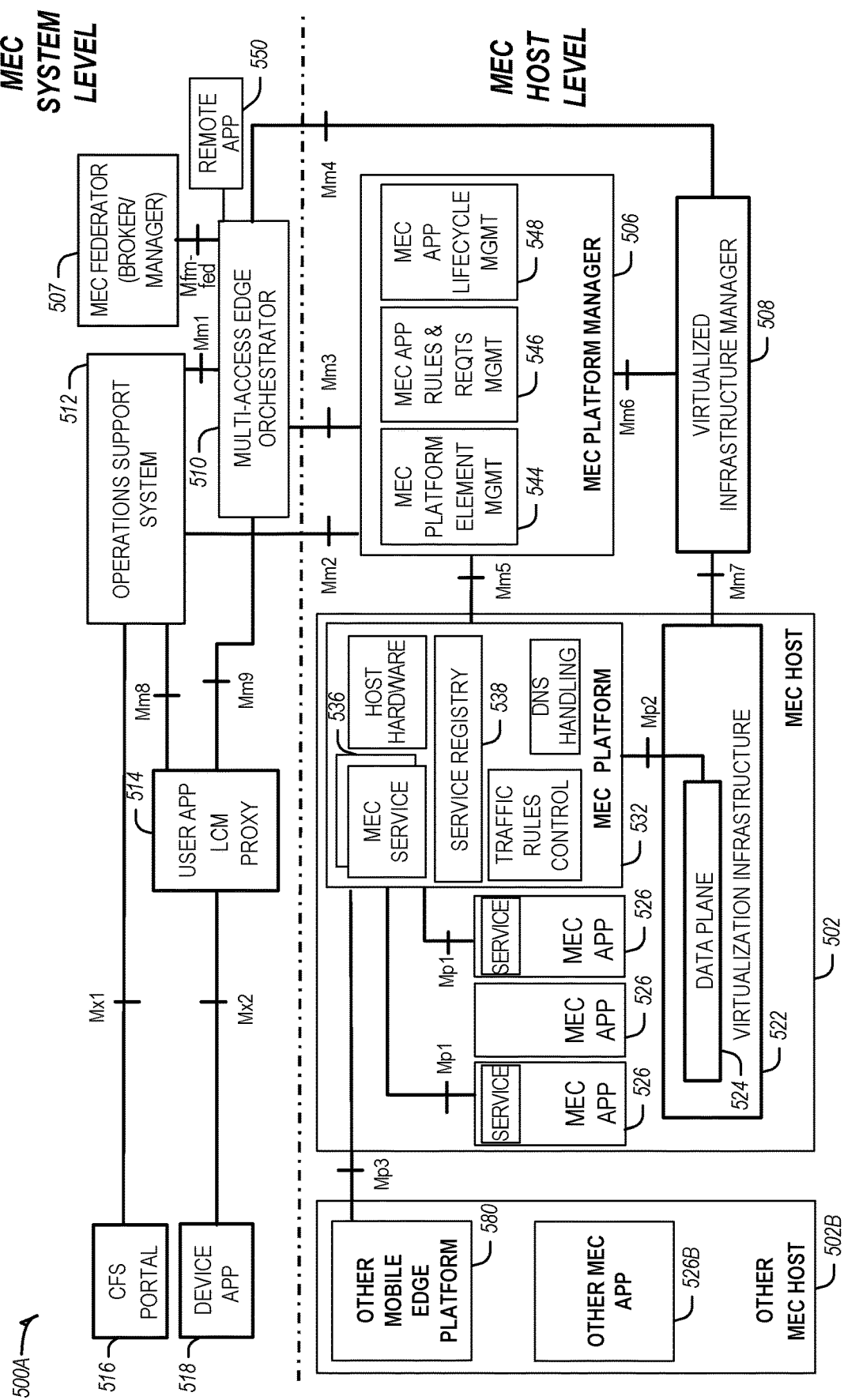
FIG. 5A illustrates a MEC system reference architecture, according to an example.

FIG. 5A illustrates a MEC system reference architecture (or MEC architecture) 500A providing functionalities in accordance with ETSI GS MEC 003 v2.1.1 (2019 January) ("[MEC003]"); ETSI GS MEC 009 V2.1.1 (2019 January) ("[MEC009]"); ETSI GS MEC 010-1 V1.1.1 (2017 October) ("[MEC010-1]"); ETSI GS MEC 010-2 V2.1.1 (2019 November) ("[MEC010-2]"); ETSI GS MEC 011 V1.1.1 (2017 July) ("[MEC011]"); ETSI GS MEC 012 V2.1.1 (2019 December) ("[MEC012]"); ETSI GS MEC 013 v2.1.1 (2019 September) ("[MEC013]"); ETSI GS MEC 014 V1.1.1 (2018 February) ("[MEC014]"); ETSI GS MEC 015 v2.1.1 (2020 June) ("[MEC015]"); ETSI GS MEC 028 v2.1.1 (2020 July) ("[MEC028]"); ETSI GS MEC 029 v2.1.1 (2019 July) ("[MEC029]"); ETSI MEC GS 030 v2.1.1 (2020 April) ("[MEC030]"); ETSI GR MEC 035 V3.1.1 (2021 June) ("[MEC035]"); ETSI GS MEC 040

("[MEC040]"); among many other ETSI MEC standards. MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X need to exchange data, provide data to aggregation points and access to data in databases which provide an overview of the local situation derived from a multitude of sensors (by various cars, roadside units, etc.).

The MEC architecture 500A includes MEC hosts 502, a virtualization infrastructure manager (VIM) 508, an MEC platform manager 506, an MEC orchestrator 510, an operations support system (OSS) 512, a user app proxy 514, a UE app 518 running on UE (not shown), and CFS portal 516. The MEC host 502 can include a MEC platform 532 with filtering rules control component, a DNS handling component, a service registry 538, and MEC services 536. The MEC services 536 can include at least one scheduler, which can be used to select resources for instantiating MEC apps (or NFVs) 526 upon virtualization infrastructure (VI) 522. The MEC apps 526 can be configured to provide services 530, which can include processing network communications traffic of different types associated with one or more wireless connections (e.g., connections to one or more radio access network(s) (RANs) or core network functions) and/or some other services such as those discussed herein. The other MEC host 502B may have a same or similar configuration/implementation as the MEC host 502, and the other MEC app 526B instantiated within other MEC host 502 can be similar to the MEC apps 526 instantiated within MEC host 502. The VI 522 includes a data plane 524 coupled to the MEC platform 532 via an MP2 interface. Additional interfaces between various network entities of the MEC architecture 500A are illustrated in FIG. 5A.

The MEC system includes three groups of reference points, including "Mp" reference points regarding the MEC platform functionality; "Mm" reference points, which are management reference points; and "Mx" reference points, which connect MEC entities to external entities. The interfaces/reference points in the MEC system may include Internet Protocol (IP)-based connections, and may be used to provide Representational State Transfer (REST or RESTful) services, and the messages conveyed using the reference points/interfaces may be in Extensible Markup Language (XML), HyperText Markup Language (HTML), JavaScript Object Notation (JSON), or some other desired format, such as those discussed herein. A suitable Authentication, Authorization, and Accounting (AAA) protocol, such as the radius or diameter protocols, may also be used for communicating over the reference points/interfaces.

The logical connections between various entities of the MEC architecture 500A may be access-agnostic and not dependent on a particular deployment. MEC enables implementation of MEC apps 526 as software-only entities that run on top of a VI 522, which is located in or close to the network edge. A MEC app 526 is an application that can be instantiated on a MEC host 502 within the MEC system and can potentially provide or consume MEC services 536.

The MEC entities depicted by FIG. 5A can be grouped into a MEC system level, MEC host level, and network level entities (not shown). The network level (not shown) includes various external network level entities, such as a 3GPP network, a local area network (e.g., a Local Area Network (LAN), Wireless Local Area Network (WLAN), Personal Area Network (PAN), Data Network (DN), Local Area Data Network (LADN), etc.), and external network(s). The MEC system level includes MEC system level management entities and UE(s), and is discussed in more detail below. The MEC host level includes one or more MEC hosts 502, 502B and MEC management entities, which provide functionality to run MEC Apps 526, 526B within an operator network or a subset of an operator network. The MEC management entities include various components that handle the management of the MEC-specific functionality of a particular MEC platform 532, MEC host 502, and the MEC Apps 526 to be run.

The MEC platform manager 506 is a MEC management entity including MEC platform element management component 544, MEC app rules and requirements management component 546, and MEC app lifecycle management component 548. The various entities within the MEC architecture 500A can perform functionalities as discussed in [MEC003]. The remote app 550 is configured to communicate with the MEC host 502 (e.g., with the MEC apps 526) via the MEC orchestrator 510 and the MEC platform manager 506.

The MEC host 502 is an entity that contains an MEC platform 532 and VI 522 which provides compute, storage, and network resources for the purpose of running MEC Apps 526. The VI 522 includes a data plane (DP) 524 that executes traffic rules 540 received by the MEC platform 532, and routes the traffic among MEC Apps 526, MEC services 536, Domain Name Service (DNS) server/proxy (see e.g., via DNS handling entity 542), 3GPP network, local networks, and external networks. The MEC DP 524 may be connected with the (R) AN nodes and the 3GPP core network, and/or may be connected with an access point via a wider network, such as the internet, an enterprise network, or the like.

The MEC platform 532 is a collection of essential functionality required to run MEC Apps 526 on a particular VI 522 and enable them to provide and consume MEC services 536, and that can provide itself a number of MEC services 536. The MEC platform 532 can also provide various services and/or functions, such as offering an environment where the MEC Apps 526 can discover, advertise, consume and offer MEC services 536 (discussed in more detail below), including MEC services 536 available via other platforms when supported. The MEC platform 532 may be able to allow authorized MEC Apps 526 to communicate with third party servers located in external networks. The MEC platform 532 may receive traffic rules from the MEC platform manager 506, applications, or services, and instruct the data plane accordingly (see e.g., Traffic Rules Control 540). The MEC platform 532 may send instructions to the DP 524 within the VI 522 via the Mp2 reference point. The Mp2 reference point between the MEC platform 532 and the DP 524 of the VI 522 may be used to instruct the DP 524 on how to route traffic among applications, networks, services, etc. The MEC platform 532 may translate tokens representing UEs in the traffic rules into specific IP addresses. The MEC platform 532 also receives DNS records from the MEC platform manager 506 and configures a DNS proxy/server accordingly. The MEC platform 532 hosts MEC services 536 including the multi-access edge services discussed infra, and provide access to persistent storage and time of day information. Furthermore, the MEC platform 532 may communicate with other MEC platforms 532 of other MEC hosts/servers via the Mp3 reference point.

The VI 522 represents the totality of all hardware and software components which build up the environment in which MEC Apps 526 and/or MEC platform 532 are deployed, managed and executed. The VI 522 may span across several locations, and the network providing connectivity between these locations is regarded to be part of the VI 522. The physical hardware resources of the VI 522 includes computing, storage and network resources that provide processing, storage and connectivity to MEC Apps 526 and/or MEC platform 532 through a virtualization layer (e.g., a hypervisor, VM monitor (VMM), or the like). The virtualization layer may abstract and/or logically partition the physical hardware resources of the MEC server 502 as a hardware abstraction layer. The virtualization layer may also enable the software that implements the MEC Apps 526 and/or MEC platform 532 to use the underlying VI 522, and may provide virtualized resources to the MEC Apps 526 and/or MEC platform 532, so that the MEC Apps 526 and/or MEC platform 532 can be executed.

The MEC Apps 526 are applications that can be instantiated on a MEC host/server 502 within the MEC system and can potentially provide or consume MEC services 536. The term "MEC service" refers to a service provided via a MEC platform 532 either by the MEC platform 532 itself or by a MEC App 526. MEC Apps 526 may run as VM on top of the VI 522 provided by the MEC server 502, and can interact with the MEC platform 532 to consume and provide the MEC services 536. The Mp1 reference point between the MEC platform 532 and the MEC Apps 526 is used for consuming and providing service specific functionality. Mp1 provides service registration 538, service discovery, and communication support for various services, such as the MEC services 536 provided by MEC host 502. Mp1 may also provide application availability, session state relocation support procedures, traffic rules and DNS rules activation, access to persistent storage and time of day information, and/or the like.

The MEC Apps 526 are instantiated on the VI 522 of the MEC server 502 based on configuration or requests validated by the MEC management (e.g., MEC platform manager 506). The MEC Apps 526 can also interact with the MEC platform 532 to perform certain support procedures related to the lifecycle of the MEC Apps 526, such as indicating availability, preparing relocation of user state, etc. The MEC Apps 526 may have a certain number of rules and requirements associated to them, such as required resources, maximum latency, required or useful services, etc. These requirements may be validated by the MEC management, and can be assigned to default values if missing. MEC services 536 are services provided and/or consumed either by the MEC platform 532 and/or MEC Apps 526. The service consumers (e.g., MEC Apps 526 and/or MEC platform 532) may communicate with particular MEC services 536 over individual Application Programming Interfaces (APIs) (including the various MEC APIs discussed herein). When provided by an application, a MEC service 536 can be registered in a list of services in the service registries 538 to the MEC platform 532 over the Mp1 reference point. Additionally, a MEC App 526 can subscribe to one or more services 530/536 for which it is authorized over the Mp1 reference point.

Communication between applications and services in the MEC server is designed according to the principles of Service-oriented Architecture (SOA). The communication services allow applications hosted on a single MEC server to communicate with the application-platform services through well-defined APIs and with each other through a service-specific API. The service registry 538 provides visibility of the services available on the MEC server 502. The service registry 538 uses the concept of loose coupling of services, providing flexibility in application deployment. In addition, the service registry presents service availability (status of the service) together with the related interfaces and versions. It is used by applications to discover and locate the end-points for the services they require, and to publish their own service end-point for other applications to use. The access to the service registry 538 is controlled (authenticated and authorized). Additionally or alternatively, for the communication services, a lightweight broker-based 'publish and subscribe' messaging protocol is used. The 'publish and subscribe' capability provides one-to-many message distribution and application decoupling. Subscription and publishing by applications are access controlled (authenticated and authorized). The messaging transport should be agnostic to the content of the payload. Mechanisms should be provided to protect against malicious or misbehaving applications.

Examples of MEC services 536 include the VIS, Radio Network Information Service (RNIS) [MEC012], Location Service (LS) [MEC013], User Equipment Identifier (UE_ID) Services [MEC014], Bandwidth Management Service (BWMS) [MEC015], WLAN Access Information Service (WAIS) [MEC028], Fixed Access Information Service (FAIS) [MEC029], and/or other MEC services. The RNIS, when available, provides authorized MEC Apps 526 with radio network related information, and expose appropriate up-to-date radio network information to the MEC Apps 526. The RNI may include, inter alia, radio network conditions, measurement and statistics information related to the user plane, information related to UEs served by the radio node(s) associated with the MEC host 502 (e.g., UE context and radio access bearers), changes on information related to UEs served by the radio node(s) associated with the MEC host 502, and/or the like. The RNI may be provided at the relevant granularity (e.g., per UE, per cell, per period of time).

The service consumers (e.g., MEC Apps 526, MEC platform 532, etc.) may communicate with the RNIS over an RNI API to obtain contextual information from a corresponding RAN. RNI may be provided to the service consumers via a Network Access Node (NAN) (e.g., (R) AN node, remote radio head (RRH), access point (AP), etc.). The RNI API may support both query and subscription (e.g., a pub/sub) based mechanisms that are used over a Representational State Transfer (RESTful) API or over a message broker of the MEC platform 532 (not shown). A MEC App 526 may query information on a message broker via a transport information query procedure, wherein the transport information may be pre-provisioned to the MEC App 526 via a suitable configuration mechanism. The various messages communicated via the RNI API may be in XML, JSON, Protobuf, or some other suitable format.

The VIS provides supports various V2X applications. The RNI may be used by MEC Apps 526 and MEC platform 532 to optimize the existing services and to provide new types of services that are based on up to date information on radio conditions. As an example, a MEC App 526 may use RNI to optimize current services such as video throughput guidance. In throughput guidance, a radio analytics MEC App 526 may use MEC services to provide a backend video server with a near real-time indication on the throughput estimated to be available at the radio DL interface in a next time instant. The throughput guidance radio analytics application computes throughput guidance based on the required radio network information it obtains from a multi-access edge service running on the MEC server 502. RNI may be also used by the MEC platform 532 to optimize the mobility procedures required to support service continuity, such as when a certain MEC App 526 requests a single piece of information using a simple request-response model (e.g., using RESTful mechanisms) while other MEC Apps 526 subscribe to multiple different notifications regarding information changes (e.g., using a pub/sub mechanism and/or message broker mechanisms).

The LS, when available, may provide authorized MEC Apps 526 with location-related information, and expose such information to the MEC Apps 526. With location related information, the MEC platform 532 or one or more MEC Apps 526 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs currently served by the radio node(s) associated with the MEC server 502, information about the location of all UEs currently served by the radio node(s) associated with the MEC server 536, information about the location of a certain category of UEs currently served by the radio node(s) associated with the MEC server 536, a list of UEs in a particular location, information about the location of all radio nodes currently associated with the MEC host 502, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 502, or a subset thereof, according to a desired deployment. In this regard, the OMA Zonal Presence API provides means for MEC Apps 526 to retrieve information about a zone, the access points associated to the zones and the users that are connected to the access points. In addition, the OMA Zonal Presence API, allows authorized application to subscribe to a notification mechanism, reporting about user activities within a zone. A MEC server 502 may access location information or zonal presence information of individual UEs using the OMA Zonal Presence API to identify the relative location or positions of the UEs.

The Traffic Management Service (TMS) allows edge applications to get informed of various traffic management capabilities and multi-access network connection information, and allows edge applications to provide requirements, e.g., delay, throughput, loss, for influencing traffic management operations. In some implementations, the TMS includes Multi-Access Traffic Steering (MTS), which seamlessly performs steering, splitting, and duplication of application data traffic across multiple access network connections. The BWMS provides for the allocation of bandwidth to certain traffic routed to and from MEC Apps 526, and specify static/dynamic up/down bandwidth resources, including bandwidth size and bandwidth priority. MEC Apps 526 may use the BWMS to update/receive bandwidth information to/from the MEC platform 532. Different MEC Apps 526 running in parallel on the same MEC server 502 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HyperText Transport Protocol (HTTP) protocol bindings for BWM functionality using RESTful services or some other suitable API mechanism.

The purpose of the UE Identity feature is to allow UE specific traffic rules in the MEC system. When the MEC system supports the UE Identity feature, the MEC platform 532 provides the functionality (e.g., UE Identity API) for a MEC App 526 to register a tag representing a UE or a list of tags representing respective UEs. Each tag is mapped into a specific UE in the MNO's system, and the MEC platform 532 is provided with the mapping information. The UE Identity tag registration triggers the MEC platform 532 to activate the corresponding traffic rule(s) 540 linked to the tag. The MEC platform 532 also provides the functionality (e.g., UE Identity API) for a MEC App 526 to invoke a de-registration procedure to disable or otherwise stop using the traffic rule for that user.

The WAIS is a service that provides WLAN access related information to service consumers within the MEC System. The WAIS is available for authorized MEC Apps 526 and is discovered over the Mp1 reference point. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System. The FAIS is available for the authorized MEC Apps 526 and is discovered over the Mp1 reference point. The FAI may be used by MEC Apps 526 and the MEC platform 532 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 526 and the MEC platform 532 may consume the FAIS; and both the MEC platform 532 and the MEC Apps 526 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 506 and the VI manager (VIM) 508, and handles the management of MEC-specific functionality of a particular MEC server 502 and the applications running on it. In some implementations, some or all of the multi-access edge management components may be implemented by one or more servers located in one or more data centers, and may use virtualization infrastructure that is connected with NFV infrastructure used to virtualize NFs, or using the same hardware as the NFV infrastructure.

The MEC platform manager 506 is responsible for managing the life cycle of applications including informing the MEC orchestrator (MEC-O) 510 of relevant application related events. The MEC platform manager 506 may also provide MEC Platform Element management functions 544 to the MEC platform 532, manage MEC App rules and requirements 546 including service authorizations, traffic rules, DNS configuration and resolving conflicts, and manage MEC App lifecycle management 548. The MEC platform manager 506 may also receive virtualized resources, fault reports, and performance measurements from the VIM 508 for further processing. The Mm5 reference point between the MEC platform manager 506 and the MEC platform 532 is used to perform platform configuration, configuration of the MEC Platform element management 544, MEC App rules and requirements 546, MEC App lifecycle management 548, and management of application relocation.

The VIM 508 may be an entity that allocates, manages and releases virtualized (compute, storage and networking) resources of the VI 522, and prepares the VI 522 to run a software image. To do so, the VIM 508 may communicate with the VI 522 over the Mm7 reference point between the VIM 508 and the VI 522. Preparing the VI 522 may include configuring the VI 522, and receiving/storing the software image. When supported, the VIM 508 may provide rapid provisioning of applications, such as described in "Openstack++ for Cloudlet Deployments", available at http://reports-archive.adm.cs.cmu.edu/anon/2015/CMU-CS-15-123.pdf. The VIM 508 may also collect and report performance and fault information about the virtualized resources, and perform application relocation when supported. For application relocation from/to external cloud environments, the VIM 508 may interact with an external cloud manager to perform the application relocation, for example using the mechanism described in "Adaptive VM Handoff Across Cloudlets", and/or possibly through a proxy. Furthermore, the VIM 508 may communicate with the MEC platform manager 506 via the Mm6 reference point, which may be used to manage virtualized resources, for example, to realize the application lifecycle management. Moreover, the VIM 508 may communicate with the MEC-O 510 via the Mm4 reference point, which may be used to manage virtualized resources of the MEC server 502, and to manage application images. Managing the virtualized resources may include tracking available resource capacity, etc.

The MEC system level management includes the MEC-O 510, which has an overview of the complete MEC system. The MEC-O 510 may maintain an overall view of the MEC system based on deployed MEC hosts 502, available resources, available MEC services 536, and topology. The Mm3 reference point between the MEC-O 510 and the MEC platform manager 506 may be used for the management of the application lifecycle, application rules and requirements and keeping track of available MEC services 536. The MEC-O 510 may communicate with the user application lifecycle management proxy (UALMP) 514 via the Mm9 reference point in order to manage MEC Apps 526 requested by UE app 518.

The MEC-O 510 may also be responsible for on-boarding of application packages, including checking the integrity and authenticity of the packages, validating application rules and requirements and if necessary adjusting them to comply with operator policies, keeping a record of on-boarded packages, and preparing the VIM(s) 508 to handle the applications. The MEC-O 510 may select appropriate MEC host(s) 901 for application instantiation based on constraints, such as latency, available resources, and available services. The MEC-O 510 may also trigger application instantiation and termination, as well as trigger application relocation as needed and when supported.

The Operations Support System (OSS) 512 is the OSS of an operator that receives requests via the Customer Facing Service (CFS) portal 516 over the Mx1 reference point and from UE apps 518 for instantiation or termination of MEC Apps 526. The OSS 512 decides on the granting of these requests. The CFS portal 516 (and the Mx1 interface) may be used by third-parties to request the MEC system to run apps 518 in the MEC system. Granted requests may be forwarded to the MEC-O 510 for further processing. When supported, the OSS 512 also receives requests from UE apps 518 for relocating applications between external clouds and the MEC system. The Mm2 reference point between the OSS 512 and the MEC platform manager 506 is used for the MEC platform manager 506 configuration, fault and performance management. The Mm1 reference point between the MEC-O 510 and the OSS 512 is used for triggering the instantiation and the termination of MEC Apps 526 in the MEC system.

The UE app(s) 518 (also referred to as "device applications" or the like) is one or more apps running in a device that has the capability to interact with the MEC system via the user application lifecycle management proxy 514. The UE app(s) 518 may be, include, or interact with one or more client applications, which in the context of MEC, is application software running on the device that utilizes functionality provided by one or more specific MEC Apps 526. The user app Lifecycle Management (LCM) proxy 514 may authorize requests from UE apps 518 in the UE and interacts with the OSS 512 and the MEC-O 510 for further processing of these requests. The term "lifecycle management," in the context of MEC, refers to a set of functions required to manage the instantiation, maintenance and termination of a MEC App 526 instance. The user app LCM proxy 514 may interact with the OSS 512 via the Mm8 reference point, and is used to handle UE App 518 requests for running applications in the MEC system. A user app may be an MEC App 526 that is instantiated in the MEC system in response to a request of a user via an application running in the UE (e.g., UE App 518). The user app LCM proxy 514 allows UE apps 518 to request on-boarding, instantiation, termination of user applications and when supported, relocation of user applications in and out of the MEC system. It also allows informing the user apps about the state of the user apps. The user app LCM proxy 514 is only accessible from within the mobile network, and may only be available when supported by the MEC system. A UE app 518 may use the Mx2 reference point between the user app LCM proxy 514 and the UE app 518 to request the MEC system to run an application in the MEC system, or to move an application in or out of the MEC system. The Mx2 reference point may only be accessible within the mobile network and may only be available when supported by the MEC system.

In order to run an MEC App 526 in the MEC system, the MEC-O 510 receives requests triggered by the OSS 512, a third-party, or a UE app 518. In response to receipt of such requests, the MEC-O 510 selects a MEC server/host 502 to host the MEC App 526 for computational offloading, etc. These requests may include information about the application to be run, and possibly other information, such as the location where the application needs to be active, other application rules and requirements, as well as the location of the application image if it is not yet on-boarded in the MEC system.

The MEC-O 510 may select one or more MEC servers 502 for computationally intensive tasks. The selected one or more MEC servers 536 may offload computational tasks of a UE app 518 based on various operational parameters, such as network capabilities and conditions, computational capabilities and conditions, application requirements, and/or other like operational parameters. The application requirements may be rules and requirements associated to/with one or more MEC Apps 526, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 526 to be able to run; multi-access edge services that the MEC Apps 526 can take advantage of, if available; connectivity or mobility support/requirements (e.g., application state relocation, application instance relocation); required multi-access edge features, such as VM relocation support or UE identity; required network connectivity (e.g., connectivity to applications within the MEC system, connectivity to local networks, or to the Internet); information on the operator's MEC system deployment or mobile network deployment (e.g., topology, cost); requirements on access to user traffic; requirements on persistent storage; traffic rules 540; DNS rules 542; etc.

The MEC-O 510 considers the requirements and information listed above and information on the resources currently available in the MEC system to select one or several MEC servers 502 to host MEC Apps 526 and/or for computational offloading. After one or more MEC servers 536 are selected, the MEC-O 510 requests the selected MEC host(s) 502 to instantiate the application(s) or application tasks. The actual algorithm used to select the MEC servers 502 depends on the implementation, configuration, and/or operator deployment. The selection algorithm(s) may be based on the task offloading criteria/parameters, for example, by taking into account network, computational, and energy consumption requirements for performing application tasks, as well as network functionalities, processing, and offloading coding/encodings, or differentiating traffic between various Radio Access Technologies (RATs). Under certain circumstances (e.g., UE mobility events resulting in increased latency, load balancing decisions, etc.), and if supported, the MEC-O 510 may decide to select one or more new MEC hosts 502 to act as a master node, and initiates the transfer of an application instance or application-related state information from the one or more source MEC hosts 502 to the one or more target MEC hosts 502.

Additionally or alternatively, MEC system can be flexibly deployed depending on the use case/vertical segment/information to be processed. Some components of the MEC system can be co-located with other elements of the system. As an example, in certain use cases (e.g., enterprise), a MEC app 526 may need to consume a MEC service locally, and it may be efficient to deploy a MEC host locally equipped with the needed set of APIs. In another example, deploying a MEC server 502 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. In some other aspects, a bandwidth management API may be present both at the access level edge and also in more remote edge locations, in order to set up transport networks (e.g., for Content Delivery Network (CDN)-based services).

Additionally, FIG. 5A illustrates a MEC system reference architecture variant for MEC federation. Here, this shows a single MEC Federation functional entity, namely, a MEC Federator 507 (providing the roles of a MEC Federation Manager (MEFM) and a MEC Federation Broker (MEFB)), and the Mfm-fed interface/reference point connecting the Federator 507 to the MEO 510. The federator may be divided into separate entities in some examples.

Figure 5B:
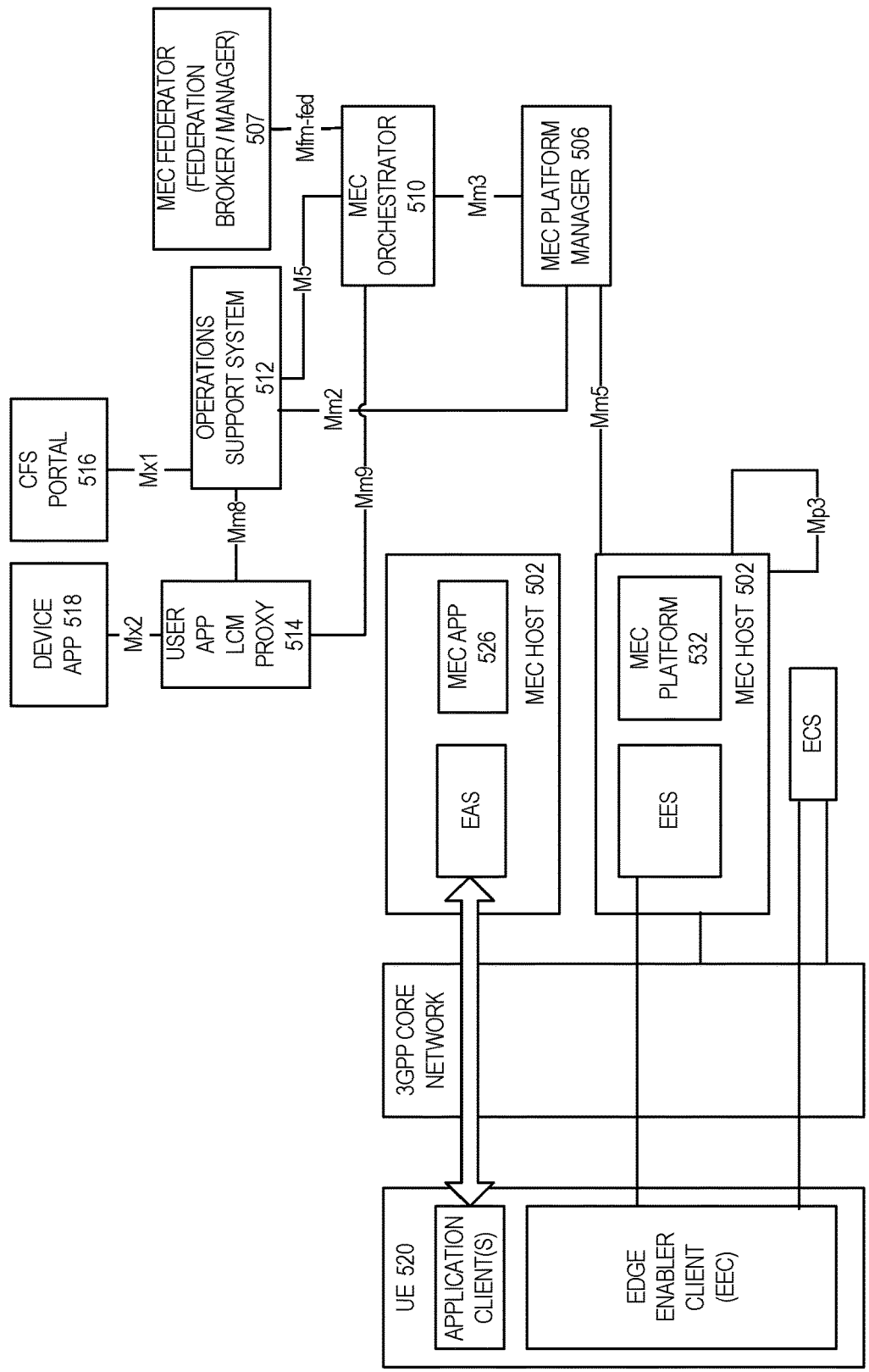
FIG. 5B illustrates an adaptation of the MEC system reference architecture for supporting different modes of operations, according to an example.

FIG. 5B illustrates a Synergized Mobile Edge Cloud architecture 500B supporting different modes of operations and leveraging 3GPP (SA6 EDGEAPP) and ETSI ISG MEC (see e.g., ETSI White Paper #36, "Harmonizing standards for edge computing—A synergized architecture leveraging ETSI ISG MEC and 3GPP specification", 1st Ed., ISBN No. 979-10-92620-35-5 (July 2020) ("[ETSIWP36]")). FIG. 5B further illustrates an adaptation of such synergized architecture, taking into account the MEC Federation variant of the reference MEC architecture and the 3GPP EDGEAPP architecture specified in 3GPP TS 23.558 v17.0.0 (2021 Jun. 28) ("[TS23558]").

On the left side of FIG. 5B, devices (e.g., UE 520) run application clients which either use the DNS to discover application servers (Edge Application Server (EAS) in 3GPP SA6 terminology or MEC Application in ETSI ISG MEC terminology) or use the Edge Enabler Client (EEC) to perform the discovery according to the SA6 EDGEAPP architecture.

Towards the middle of FIG. 5B, a platform (Edge Enabler Server (EES) in 3GPP SA6 and MEC Platform in ETSI ISG MEC) provide functionality pertaining to mediating access to network services, application authorization, application's service registration and application's service discovery, context transfer, etc. A given implementation can combine functions specified by ETSI ISG MEC and ones specified by 3GPP SA6. The platform typically exposes APIs towards edge cloud applications (MEC application or Edge Application Server). EDGE-3 and Mp1 offer complementary API functions, therefore can be considered to be part of a single reference point from an application developer perspective. Towards the right of FIG. 5B, functionalities specified by ETSI ISG MEC include management and orchestration of the MEC platforms and OSS functions supporting access to portals offered to application service providers.

EDGE-3 and Mp1 provide service registration and service discovery features which allow an edge cloud application to register services exposed by this application and their subsequent discovery and use by other applications. The exposed services can be about network services, subject to their availability at the core or access network level. The common capabilities may be harmonized through adoption of the Common API Framework (CAPIF) as specified in 3GPP TS 23.222 v17.5.0 (2021 Jun. 24) ("[TS23222]"). EDGE-9 and Mp3 are both at early stage of development. Both are intended to assist in context migration. The following interfaces are about simple endorsement of SA2 interfaces (e.g., Network Exposure Function/Service Capability Exposure Function, NEF/SCEF): EDGE-2, EDGE-7, EDGE-8, M3GPP-1. According to 3GPP SA6 specification, edge services are exposed to the application clients by the Edge Configuration Server (ECS) and Edge Enabler Server (EES) via the Edge Enabler Client (EEC) in the UE. Each EEC is configured with the address of the ECS, which is provided by either the MNO or by the Edge Computing Service Provider. Deployment options discussed in [ETSIWP36] may implement all or a subset of the features of the synergized architecture as shown in subsequent sections.

Figure 5C:
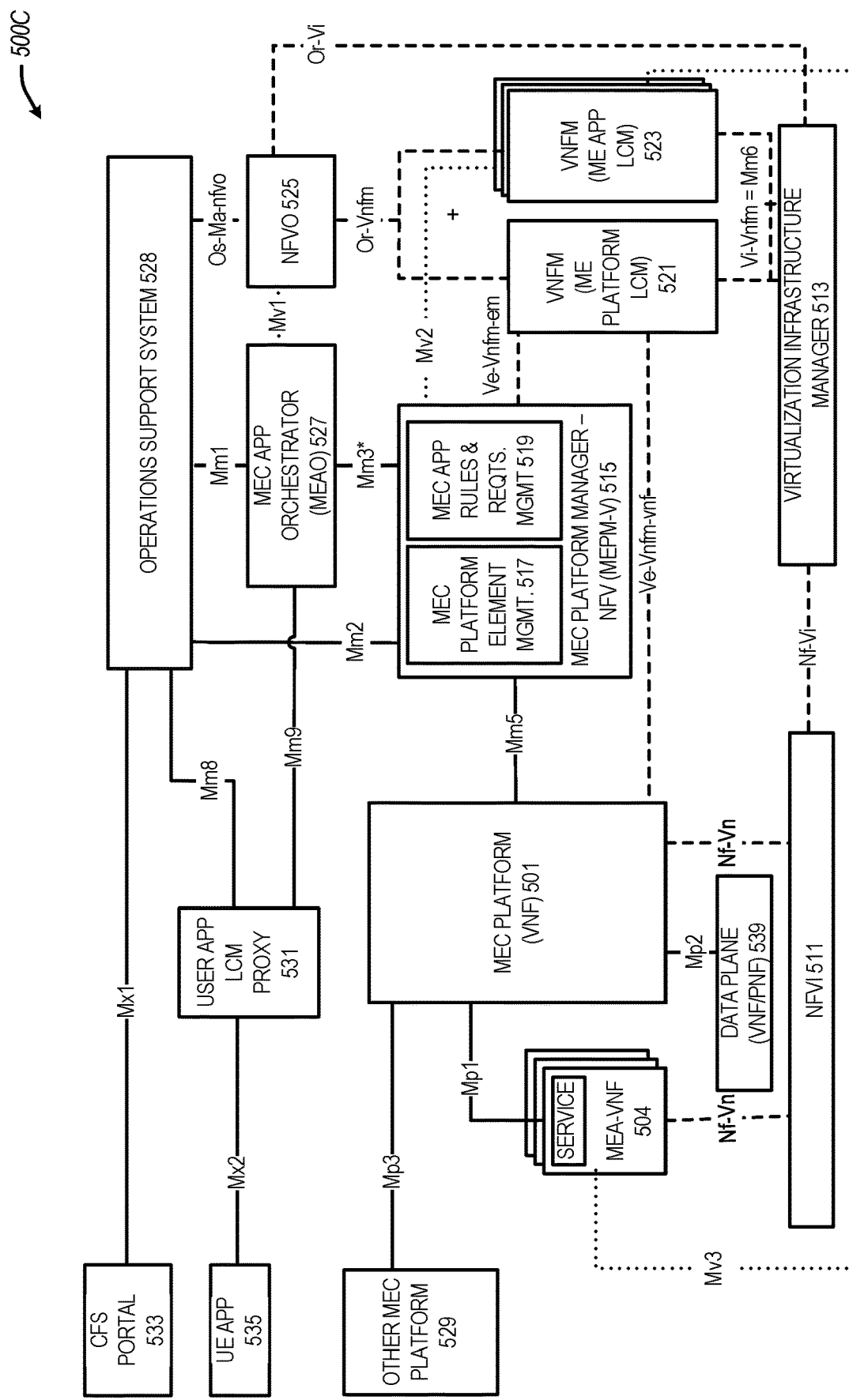
FIG. 5C illustrates a MEC reference architecture in a network function virtualization (NFV) environment, according to an example.

FIG. 5C illustrates a MEC reference architecture 500C in a NFV environment. The MEC architecture 500C includes a MEC platform 501, a MEC platform manager—NFV (MEPM-V) 515, a data plane 539, a NFV infrastructure (NFVI) 510, Virtualized Network Function (VNF) managers (VNFMs) 521 and 523, NFV orchestrator (NFVO) 525, a MEC app orchestrator (MEAO) 527, an OSS 528, a user app LCM proxy 531, a UE app 535, and a CFS portal 533. The MEC platform manager 515 can include a MEC platform element management 517 and MEC app rules and requirements management 519. The MEC platform 501 can be coupled to another MEC platform 529 via an MP3 interface.

The MEC platform 501 is deployed as a VNF. The MEC applications 504 can appear like VNFs towards the ETSI NFV Management and Orchestration (MANO) components. This allows re-use of ETSI NFV MANO functionality. The full set of MANO functionality may be unused and certain additional functionality may be needed. Such a specific MEC app is denoted by the name "MEC app VNF" or "MEA-VNF". The virtualization infrastructure is deployed as an NFVI 511 and its virtualized resources are managed by the virtualized infrastructure manager (VIM) 513. For that purpose, one or more of the procedures defined by ETSI NFV Infrastructure specifications can be used (see e.g., ETSI GS NFV-INF 003 V2.4.1 (2018 February), ETSI GS NFV-INF 004 V2.4.1 (2018 February), ETSI GS NFV-INF 005 V3.2.1 (2019 April), and ETSI GS NFV-IFA 009 V1.1.1 (2016 July) (collectively "[ETSI-NFV]")). The MEA-VNF 504 are managed like individual VNFs, allowing that a MEC-in-NFV deployment can delegate certain orchestration and LCM tasks to the NFVO 525 and VNFMs 521 and 523, as defined by ETSI NFV MANO.

When a MEC platform is implemented as a VNF (e.g., MEC platform VNF 501), the MEPM-V 515 may be configured to function as an Element Manager (EM). The MEAO 527 uses the NFVO 525 for resource orchestration, and for orchestration of the set of MEA-VNFs 504 as one or more NFV Network Services (NSs). The MEPM-V 515 delegates the LCM part to one or more VNFMs 521 and 523. A specific or generic VNFM 521, 523 is/are used to perform LCM. The MEPM-V 515 and the VNFM (ME platform LCM) 521 can be deployed as a single package as per the ensemble concept in 3GPP TR 32.842 v13.1.0 (2015 Dec. 21) ("[TR32842]"), or that the VNFM is a Generic VNFM as per [ETSI-NFV] and the MEC Platform VNF 501 and the MEPM-V 515 are provided by a single vendor.

The Mp1 reference point between a MEC app 504 and the MEC platform 515 can be optional for the MEC app 504, unless it is an application that provides and/or consumes a MEC service. The Mm3* reference point between MEAO 527 and the MEPM-V 515 is based on the Mm3 reference point (see e.g., [MEC003]). Changes may be configured to this reference point to cater for the split between MEPM-V 515 and VNFM (ME applications LCM) 523. The following new reference points (Mv1, Mv2, and Mv3) are introduced between elements of the ETSI MEC architecture and the ETSI NFV architecture to support the management of ME app VNFs 504.

The following reference points are related to existing NFV reference points, but only a subset of the functionality may be used for ETSI MEC, and extensions may be necessary. Mv1 is a reference point connecting the MEAO 527 and the NFVO 525, and is related to the Os-Ma-nfvo reference point as defined in ETSI NFV). Mv2 is a reference point connecting the VNFM 523 that performs the LCM of the MEC app VNFs 504 with the MEPM-V 515 to allow LCM related notifications to be exchanged between these entities. Mv2 is related to the Ve-Vnfm-em reference point as defined in ETSI NFV, but may possibly include additions, and might not use all functionality offered by the Ve-Vnfm-em. Mv3 is a reference point connecting the VNFM 523 with the ME app VNF 504 instance to allow the exchange of messages (e.g., related to MEC app LCM or initial deployment-specific configuration). Mv3 is related to the Ve-Vnfm-vnf reference point, as defined in ETSI NFV, but may include additions, and might not use all functionality offered by Ve-Vnfm-vnf.

The following reference points are used as they are defined by ETSI NFV: Nf-Vn reference point connects each ME app VNF 504 with the NFVI 511. The Nf-Vi reference point connects the NFVI 511 and the VIM 513. The Os-Ma-nfvo reference point connects the OSS 528 and the NFVO 525 and is primarily used to manage NSs (e.g., a number of VNFs connected and orchestrated to deliver a service). The Or-Vnfm reference point connects the NFVO 525 and the VNFM (MEC Platform LCM) 521 and is primarily used for the NFVO 525 to invoke VNF LCM operations. Vi-Vnfm reference point connects the VIM 513 and the VNFM (MEC Platform LCM) 521 and is primarily used by the VNFM 521 to invoke resource management operations to manage cloud resources that are needed by the VNF (it is assumed in an NFV-based MEC deployment that this reference point corresponds 1:1 to M5). The Or-Vi reference point connects the NFVO 525 and the VIM 513 and is primarily used by the NFVO 525 to manage cloud resources capacity. The Ve-Vnfm-em reference point connects the VNFM (MEC Platform LCM) 521 with the MEPM-V 515. The Ve-Vnfm-vnf reference point connects the VNFM (MEC Platform LCM) 521 with the MEC Platform VNF 501.

Figure 6:
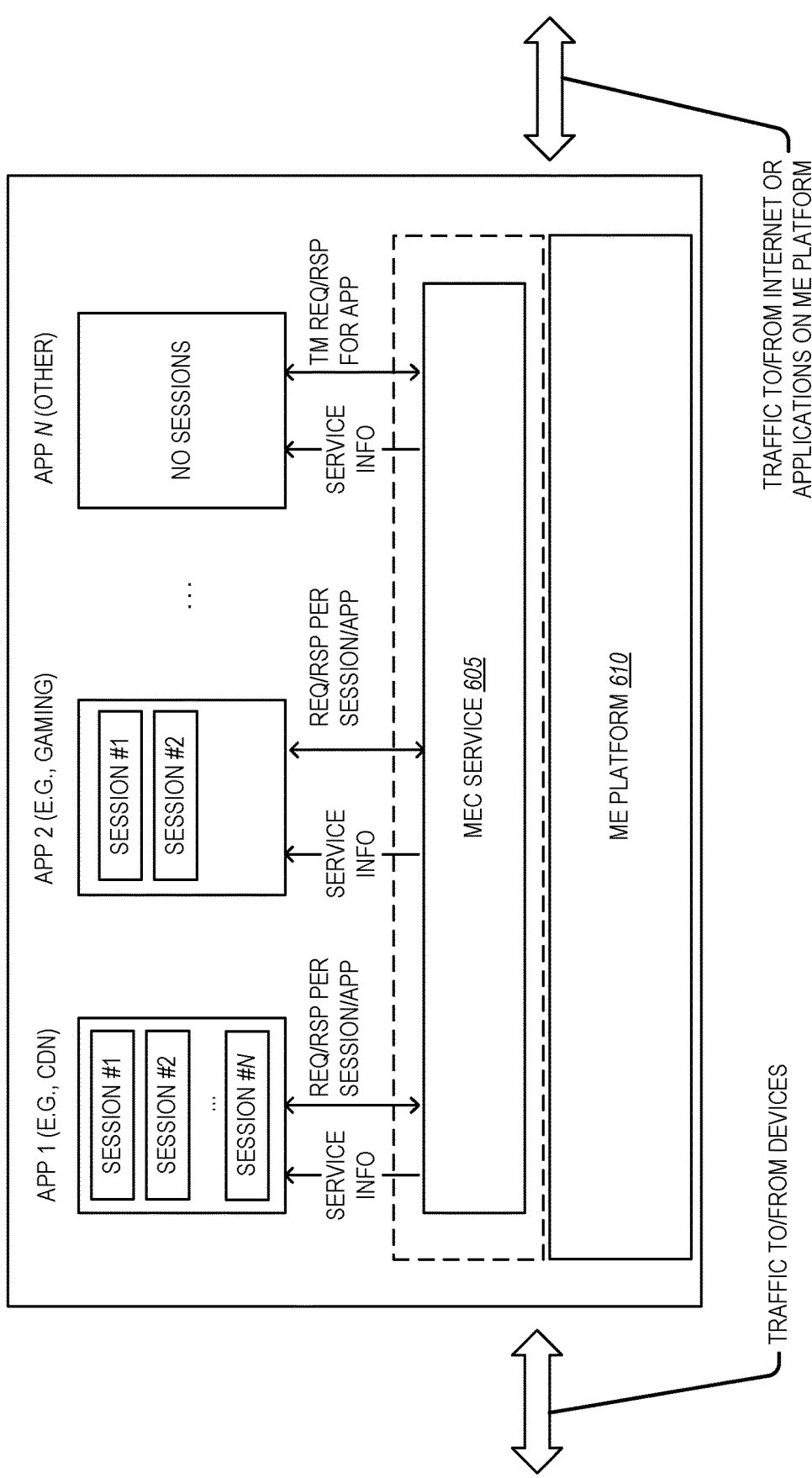
FIG. 6 illustrates an example MEC service architecture, according to an example.

FIG. 6 illustrates an example MEC service architecture 600. MEC service architecture 600 includes the MEC service 605, ME platform 610 (corresponding to MEC platform 632), and applications (Apps) 1 to N (where N is a number). As an example, the App 1 may be a CDN app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as ME platform 610) and consumers (e.g., UEs, user apps instantiated by individual UEs, other servers/services, network functions, application functions, etc.). Each session represents an interactive information exchange between two or more elements, such as a client-side app and its corresponding server-side app, a user app instantiated by a UE and a MEC app instantiated by the ME platform 610, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA)

PDU session. A PDU session is an association between a UE 520 and a DN that provides a PDU connectivity service, which is a service that provides for the exchange of PDUs between a UE 520 and a Data Network. An MA PDU session is a PDU Session that provides a PDU connectivity service, which can use one access network at a time, or simultaneously a 3GPP access network and a non-3GPP access network. Furthermore, each session may be associated with a session identifier (ID) which is data the uniquely identifies a session, and each App (or App instance) may be associated with an App ID (or App instance ID) which is data the uniquely identifies an App (or App instance).

The MEC service 605 provides one or more MEC services to MEC service consumers (e.g., Apps 1 to N). The MEC service 605 may optionally run as part of the platform (e.g., ME platform 610) or as an application (e.g., ME app). Different Apps 1 to N, whether managing a single instance or several sessions (e.g., CDN), may request specific service info per their requirements for the whole application instance or different requirements per session. The MEC service 605 may aggregate all the requests and act in a manner that will help optimize the BW usage and improve Quality of Experience (QoE) for applications.

The MEC service 605 provides a MEC service API that supports both queries and subscriptions (e.g., pub/sub mechanism) that are used over a Representational State Transfer ("REST" or "RESTful") API or over alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics in relation to the identified request target, and responds to that request with one or more response messages. A client constructs request messages to communicate specific intentions, examines received responses to see if the intentions were carried out, and determines how to interpret the results. The target of an HTTP request is called a "resource." Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything, and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For the purposes of HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., Fielding et al., "Hypertext Transfer Protocol (HTTP/1.1): Semantics and Content", IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of [MEC009]). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure:

{apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under control of the deployment, whereas the remaining parts of the URI are under control of the API specification. In the above root, "apiRoot" and "apiName" are discovered using the service registry (see e.g., service registry 538 in FIG. 5A). It includes the scheme ("http" or "https"), host and optional port, and an optional prefix string. For the a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI.

The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

Example Computing Devices

Figure 7:
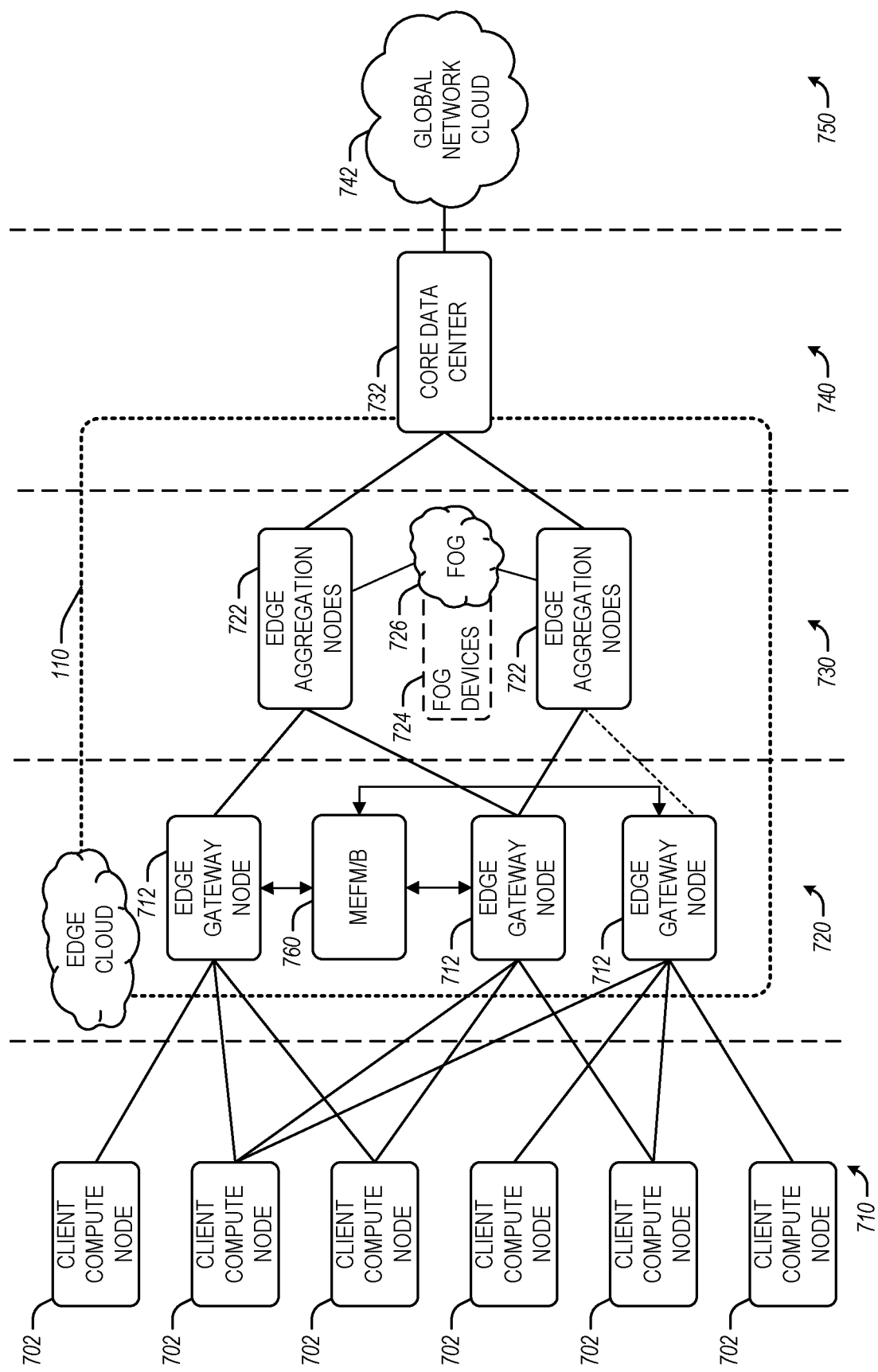
FIG. 7 illustrates an overview of layers of distributed compute deployed among an edge computing system, according to an example.

At a more generic level, an edge computing system may be described to encompass any number of deployments operating in the edge cloud 110, which provide coordination from client and distributed computing devices. FIG. 7 provides a further abstracted overview of layers of distributed compute deployed among an edge computing environment for purposes of illustration.

FIG. 7 generically depicts an edge computing system for providing edge services and applications to multi-stakeholder entities, as distributed among one or more client compute nodes 702, one or more edge gateway nodes 712, one or more edge aggregation nodes 722, one or more core data centers 732, and a global network cloud 742, as distributed across layers of the network. The implementation of the edge computing system may be provided at or on behalf of a telecommunication service provider ("telco", or "TSP"), internet-of-things service provider, a cloud service provider (CSP), enterprise entity, or any other number of entities. Various forms of wired or wireless connections may be configured to establish connectivity among the nodes 702, 712, 722, 732, including interconnections among such nodes (e.g., connections among edge gateway nodes 712, and connections among edge aggregation nodes 722).

Each node or device of the edge computing system is located at a particular layer corresponding to layers 710, 720, 730, 740, and 750. For example, the client compute nodes 702 are each located at an endpoint layer 710, while each of the edge gateway nodes 712 is located at an edge devices layer 720 (local level) of the edge computing system. Additionally, each of the edge aggregation nodes 722 (and/or fog devices 724, if arranged or operated with or among a fog networking configuration 726) is located at a network access layer 730 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein apply to fog networks, fogging, and fog configurations. Further, aspects of the edge computing systems discussed herein may be configured as a fog, or aspects of a fog may be integrated into an edge computing architecture.

The core data center 732 is located at a core network layer 740 (e.g., a regional or geographically-central level), while the global network cloud 742 is located at a cloud data center layer 750 (e.g., a national or global layer). The use of "core" is provided as a term for a centralized network location— deeper in the network—which is accessible by multiple edge nodes or components; however, a "core" does not necessarily designate the "center" or the deepest location of the network. Accordingly, the core data center 732 may be located within, at, or near the edge cloud 110.

Although an illustrative number of client compute nodes 702, edge gateway nodes 712, edge aggregation nodes 722, core data centers 732, and global network clouds 742 are shown in FIG. 7, it should be appreciated that the edge computing system may include more or fewer devices or systems at each layer. Additionally, as shown in FIG. 7, the number of components of each layer 710, 720, 730, 740, and 750 generally increases at each lower level (i.e., when moving closer to endpoints). As such, one edge gateway node 712 may service multiple client compute nodes 702, and one edge aggregation node 722 may service multiple edge gateway nodes 712.

Consistent with the examples provided herein, each client compute node 702 may be embodied as any type of end point component, device, appliance, or "thing" capable of communicating as a producer or consumer of data. Further, the label "node" or "device" as used in the edge computing system 700 does not necessarily mean that such node or device operates in a client or minion/follower/agent role; rather, any of the nodes or devices in the edge computing system 700 refer to individual entities, nodes, or subsystems which include discrete or connected hardware or software configurations to facilitate or use the edge cloud 110.

As such, the edge cloud 110 is formed from network components and functional features operated by and within the edge gateway nodes 712 and the edge aggregation nodes 722 of layers 720, 730, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 7 as the client compute nodes 702. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 726 (e.g., a network of fog devices 724, not shown in detail), which may be embodied as a system-level horizontal and distributed architecture that distributes resources and services to perform a specific function. For instance, a coordinated and distributed network of fog devices 724 may perform computing, storage, control, or networking aspects in the context of an IoT system arrangement. Other networked, aggregated, and distributed functions may exist in the edge cloud 110 between the cloud data center layer 750 and the client endpoints (e.g., client compute nodes 702). Some of these are discussed in the following sections in the context of network functions or service virtualization, including the use of virtual edges and virtual services which are orchestrated for multiple stakeholders.

The edge gateway nodes 712 and the edge aggregation nodes 722 cooperate to provide various edge services and security to the client compute nodes 702. Furthermore, because each client compute node 702 may be stationary or mobile, each edge gateway node 712 may cooperate with other edge gateway devices to propagate presently provided edge services and security as the corresponding client compute node 702 moves about a region. To do so, each of the edge gateway nodes 712 and/or edge aggregation nodes 722 may support multiple tenancies and multiple stakeholder configurations, in which services from (or hosted for) multiple service providers and multiple consumers may be supported and coordinated across a single or multiple compute devices.

In various examples, the edge cloud 110 may include an MEFM/B 760 (which can be similar to the federation manager or broker entities, discussed in connection with FIGS. 5A-6 and FIGS. 11-18) used for configuring and managing a MEC federation constituting of MEC systems, possibly owned and operated by different parties (e.g., MNOs). Other federation and application registration functions are also discussed in connection with FIGS. 5A-6 and FIGS. 11-18.

In further examples, any of the compute nodes or devices discussed with reference to the present edge computing systems and environment may be fulfilled based on the components depicted in FIGS. 8 and 9. Each edge compute node may be embodied as a type of device, appliance, computer, or other "thing" capable of communicating with other edge, networking, or endpoint components. For example, an edge compute device may be embodied as a personal computer, a server, smartphone, a mobile compute device, a smart appliance, an in-vehicle compute system (e.g., a navigation system), a self-contained device having an outer case, shell, etc., or other devices or systems capable of performing the described functions.

Figure 8:
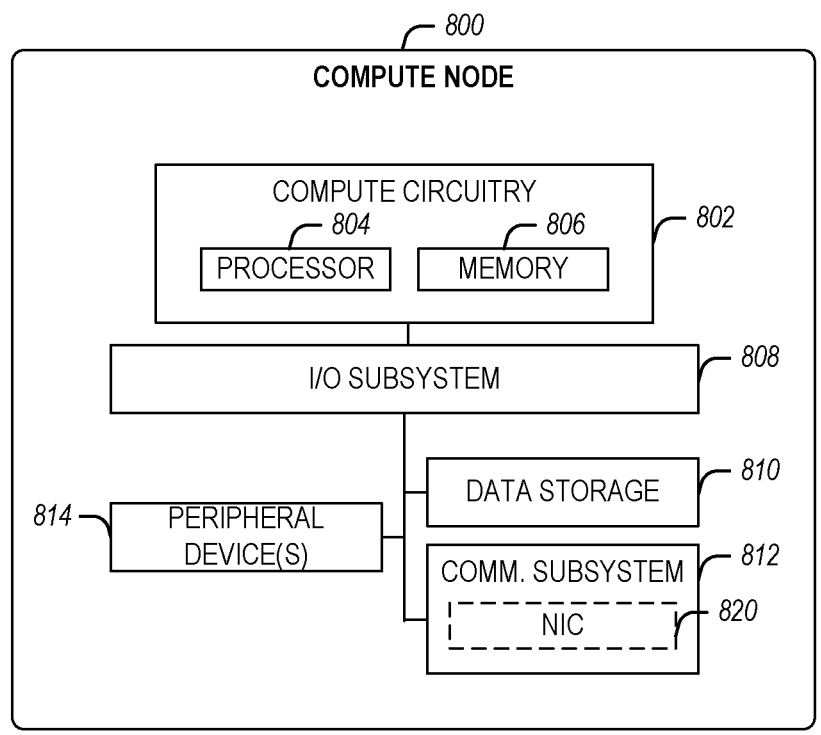
FIG. 8 illustrates an overview of example components deployed at a compute node system, according to an example.

In the simplified example depicted in FIG. 8, an edge compute node 800 includes a compute engine (also referred to herein as "compute circuitry") 802, an input/output (I/O) subsystem 808, data storage 810, a communication circuitry subsystem 812, and, optionally, one or more peripheral devices 814. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 800 may be embodied as any type of engine, device, or collection of devices capable of performing various compute functions. In some examples, the compute node 800 may be embodied as a single device such as an integrated circuit, an embedded system, a field-programmable gate array (FPGA), a system-on-a-chip (SOC), or other integrated system or device. In the illustrative example, the compute node 800 includes or is embodied as a processor 804 and a memory 806. The processor 804 may be embodied as any type of processor capable of performing the functions described herein (e.g., executing an application). For example, the processor 804 may be embodied as a multi-core processor(s), a microcontroller, a processing unit, a specialized or special purpose processing unit, or other processor or processing/controlling circuit. In some examples, the processor 804 may be embodied as, include, or be coupled to an FPGA, an application-specific integrated circuit (ASIC), reconfigurable hardware or hardware circuitry, or other specialized hardware to facilitate performance of the functions described herein. Also in some examples, the processor 804 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within a System-on-Chip (SOC), or integrated with networking circuitry (e.g., in a Smart Network Interface Card (SmartNIC), or enhanced SmartNIC), acceleration circuitry, storage devices, or AI or specialized hardware (e.g., GPUs, programmed FPGAs, Network Processing Units (NPUs), Infrastructure Processing Units (IPUs), Storage Processing Units (SPUs), AI Processors (APUs), Data Processing Unit (DPUs), or other specialized accelerators such as a cryptographic processing unit/accelerator). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, a SOC, a CPU, and other variations of the processor 704 may work in coordination with each other to execute many types of operations and instructions within and on behalf of the compute node 800.

The main memory 806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 806 may be integrated into the processor 804. The main memory 806 may store various software and data used during operation such as one or more applications, data operated on by the application(s), libraries, and drivers.

The compute circuitry 802 is communicatively coupled to other components of the compute node 800 via the I/O subsystem 808, which may be embodied as circuitry and/or components to facilitate input/output operations with the compute circuitry 802 (e.g., with the processor 804 and/or the main memory 806) and other components of the compute circuitry 802. For example, the I/O subsystem 808 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 808 may form a portion of a system-on-a-chip (SoC) and be incorporated, along with one or more of the processor 804, the main memory 806, and other components of the compute circuitry 802, into the compute circuitry 802.

The one or more illustrative data storage devices 810 may be embodied as any type of device configured for short-term or long-term storage of data such as, for example, memory devices and circuits, memory cards, hard disk drives, solid-state drives, or other data storage devices. Each data storage device 810 may include a system partition that stores data and firmware code for the data storage device 810. Each data storage device 810 may also include one or more operating system partitions that store data files and executables for operating systems depending on, for example, the type of compute node 800.

The communication circuitry 812 may be embodied as any communication circuit, device, or collection thereof, capable of enabling communications over a network between the compute circuitry 802 and another compute device (e.g., an edge gateway node 712 of the edge computing system 700). The communication circuitry 812 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LPWAN) or low-power wide-area (LPWA) protocols, etc.) to effect such communication.

The illustrative communication circuitry 812 includes a network interface controller (NIC) 820, which may also be referred to as a host fabric interface (HFI). The NIC 820 may be embodied as one or more add-in-boards, daughter cards, network interface cards, controller chips, chipsets, or other devices that may be used by the compute node 800 to connect with another compute device (e.g., an edge gateway node 712). In some examples, the NIC 820 may be embodied as part of a system-on-a-chip (SoC) that includes one or more processors or included on a multichip package that also contains one or more processors. In some examples, the NIC 820 may include a local processor (not shown) and/or a local memory and storage (not shown) that are local to the NIC 820. In such examples, the local processor of the NIC 820 (which can include general-purpose accelerators or specific accelerators) may be capable of performing one or more of the functions of the compute circuitry 802 described herein. Additionally, or alternatively, the local memory of the NIC 820 may be integrated into one or more components of the client compute node at the board level, socket level, chip level, and/or other levels.

Additionally, in some examples, each compute node 800 may include one or more peripheral devices 814. Such peripheral devices 814 may include any type of peripheral device found in a compute device or server such as audio input devices, a display, other input/output devices, interface devices, and/or other peripheral devices, depending on the particular type of the compute node 800. In further examples, the compute node 800 may be embodied by a respective edge compute node in an edge computing system (e.g., client compute node 702, edge gateway node 712, edge aggregation node 722) or like forms of appliances, computers, subsystems, circuitry, or other components.

Figure 9:
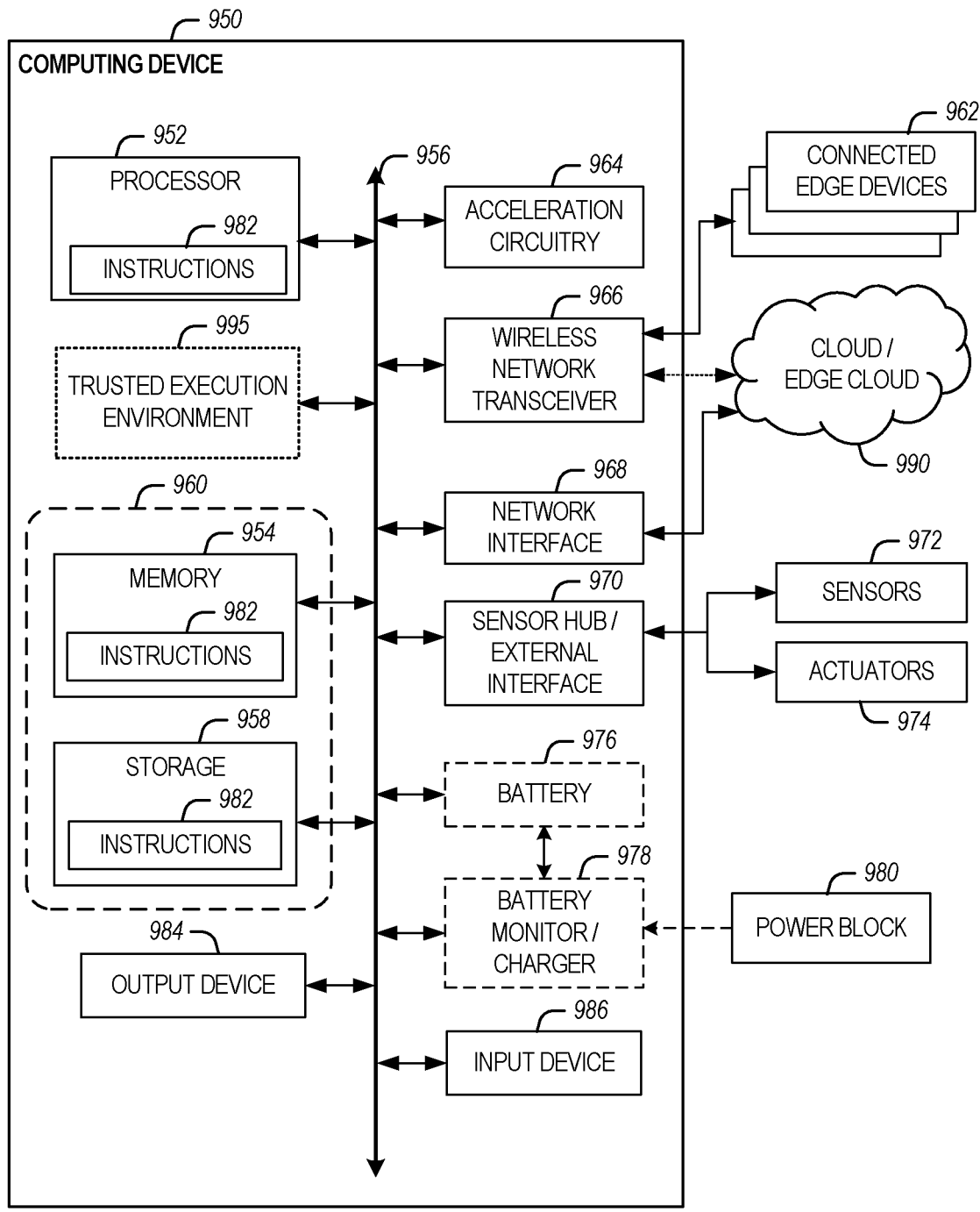
FIG. 9 illustrates a further overview of example components within a computing device, according to an example.

In a more detailed example, FIG. 9 illustrates a block diagram of an example of components that may be present in an edge computing device (or node) 950 for implementing the techniques (e.g., operations, processes, methods, and methodologies) described herein. The edge computing node 950 provides a closer view of the respective components of node 800 when implemented as or as part of a computing device (e.g., as a mobile device, a base station, server, gateway, etc.). The edge computing node 950 may include any combinations of the components referenced above, and it may include any device usable with an edge communication network or a combination of such networks. The components may be implemented as integrated circuits (ICs), portions thereof, discrete electronic devices, or other modules, logic, instruction sets, programmable logic or algorithms, hardware, hardware accelerators, software, firmware, or a combination thereof adapted in the edge computing node 950, or as components otherwise incorporated within a chassis of a larger system.

The edge computing node 950 may include processing circuitry in the form of a processor 952, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 952 may be a part of a system on a chip (SoC) in which the processor 952 and other components are formed into a single integrated circuit, or a single package, such as the Edison™ or Galileo™ SoC boards from Intel Corporation, Santa Clara, California. As an example, the processor 952 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc. The processor 952 and accompanying circuitry may be provided in a single socket form factor, multiple socket form factor, or a variety of other formats, including in limited hardware configurations or configurations that include fewer than all elements shown in FIG. 9.

The processor 952 may communicate with a system memory 954 over an interconnect 956 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 958 may also couple to the processor 952 via the interconnect 956. In an example, the storage 958 may be implemented via a solid-state disk drive (SSDD). Other devices that may be used for the storage 958 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low power implementations, the storage 958 may be on-die memory or registers associated with the processor 952. However, in some examples, the storage 958 may be implemented using a micro hard disk drive (HDD) or solid-state drive (SSD). Further, any number of new technologies may be used for the storage 958 in addition to, or instead of, the technologies described, such resistance change memories, phase change memories, holographic memories, or chemical memories, among others.

The components may communicate over the interconnect 956. The interconnect 956 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 956 may be a proprietary bus, for example, used in an SoC based system. Other bus systems may be included, such as an I2C interface, an SPI interface, point to point interfaces, and a power bus, among others.

The interconnect 956 may couple the processor 952 to a transceiver 966, for communications with the connected edge devices 962. The transceiver 966 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 962. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 966 (or multiple transceivers) may communicate using multiple standards or radios for communications at a different range. For example, the edge computing node 950 may communicate with close devices, e.g., within about 10 meters, using a local transceiver based on BLE, or another low power radio, to save power. More distant connected edge devices 962, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee®.

A wireless network transceiver 966 (e.g., a radio transceiver) may be included to communicate with devices or services in the edge cloud 990 via local or wide area network protocols. The wireless network transceiver 966 may be an LPWA transceiver that follows the IEEE 802.15.4, or IEEE 802.15.4g standards, among others. The edge computing node 950 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 966, as described herein. For example, the transceiver 966 may include a cellular transceiver that uses spread spectrum (Spectrum Access System (SAS)) communications for implementing high-speed communications. Further, any number of other protocols may be used, such as Wi-Fi® networks for medium speed communications and provision of network communications. The transceiver 966 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 968 may be included to provide a wired communication to nodes of the edge cloud 990 or other devices, such as the connected edge devices 962 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, Time Sensitive Networks (TSN), among many others. An additional NIC 968 may be included to enable connecting to a second network, for example, a first NIC 968 providing communications to the cloud over Ethernet, and a second NIC 968 providing communications to other devices over another type of network.

Given the variety of types of applicable communications from the device to another component or network, applicable communications circuitry used by the device may include or be embodied by any one or more of components 964, 966, 968, or 970. Accordingly, in various examples, applicable means for communicating (e.g., receiving, transmitting, etc.) may be embodied by such communications circuitry.

The edge computing node 950 may include or be coupled to acceleration circuitry 964, which may be embodied by one or more AI accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 956 may couple the processor 952 to a sensor hub or external interface 970 that is used to connect additional devices or subsystems. The devices may include sensors 972, such as accelerometers, level sensors, flow sensors, optical light sensors, camera sensors, temperature sensors, a global navigation system (e.g., GPS) sensors, pressure sensors, barometric pressure sensors, and the like. The hub or interface 970 further may be used to connect the edge computing node 950 to actuators 974, such as power switches, valve actuators, an audible sound generator, a visual warning device, and the like.

In some optional examples, various input/output (I/O) devices may be present within or connected to, the edge computing node 950. For example, a display or other output device 984 may be included to show information, such as sensor readings or actuator position. An input device 986, such as a touch screen or keypad may be included to accept input. An output device 984 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 950. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 976 may power the edge computing node 950, although, in examples in which the edge computing node 950 is mounted in a fixed location, it may have a power supply coupled to an electrical grid, or the battery may be used as a backup or for temporary capabilities. The battery 976 may be a lithium-ion battery, or a metal-air battery, such as a zinc-air battery, an aluminum-air battery, a lithium-air battery, and the like.

A battery monitor/charger 978 may be included in the edge computing node 950 to track the state of charge (SoCh) of the battery 976. The battery monitor/charger 978 may be used to monitor other parameters of the battery 976 to provide failure predictions, such as the state of health (SoH) and the state of function (SoF) of the battery 976. The battery monitor/charger 978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 978 may communicate the information on the battery 976 to the processor 952 over the interconnect 956. The battery monitor/charger 978 may also include an analog-to-digital (ADC) converter that enables the processor 952 to directly monitor the voltage of the battery 976 or the current flow from the battery 976. The battery parameters may be used to determine actions that the edge computing node 950 may perform, such as transmission frequency, mesh network operation, sensing frequency, and the like.

A power block 980, or other power supply coupled to a grid, may be coupled with the battery monitor/charger 978 to charge the battery 976. In some examples, the power block 980 may be replaced with a wireless power receiver to obtain the power wirelessly, for example, through a loop antenna in the edge computing node 950. A wireless battery charging circuit, such as an LTC4020 chip from Linear Technologies of Milpitas, California, among others, may be included in the battery monitor/charger 978. The specific charging circuits may be selected based on the size of the battery 976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 958 may include instructions 982 in the form of software, firmware, or hardware commands to implement the techniques described herein. Although such instructions 982 are shown as code blocks included in the memory 954 and the storage 958, it may be understood that any of the code blocks may be replaced with hardwired circuits, for example, built into an application-specific integrated circuit (ASIC).

Also in a specific example, the instructions 982 on the processor 952 (separately, or in combination with the instructions 982 of the machine readable medium 960) may configure execution or operation of a trusted execution environment (TEE) 995. In an example, the TEE 995 operates as a protected area accessible to the processor 952 for secure execution of instructions and secure access to data. Various implementations of the TEE 995, and an accompanying secure area in the processor 952 or the memory 954 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the edge computing node 950 through the TEE 995 and the processor 952.

In an example, the instructions 982 provided via memory 954, the storage 958, or the processor 952 may be embodied as a non-transitory, machine-readable medium 960 including code to direct the processor 952 to perform electronic operations in the edge computing node 950. The processor 952 may access the non-transitory, machine-readable medium 960 over the interconnect 956. For instance, the non-transitory, machine-readable medium 960 may be embodied by devices described for the storage 958 or may include specific storage units such as optical disks, flash drives, or any number of other hardware devices. The non-transitory, machine-readable medium 960 may include instructions to direct the processor 952 to perform a specific sequence or flow of actions, for example, as described with respect to the flowchart(s) and block diagram(s) of operations and functionality depicted above. As used herein, the terms "machine-readable medium", "computer-readable medium", "machine-readable storage", and "computer-readable storage" are interchangeable.

In an example embodiment, the edge computing node 950 can be implemented using components/modules/blocks 952-986 which are configured as IP Blocks. Each IP Block may contain a hardware RoT (e.g., device identifier composition engine, or DICE), where a DICE key may be used to identify and attest the IP Block firmware to a peer IP Block or remotely to one or more of components/modules/blocks 962-980. Thus, it will be understood that the node 950 itself may be implemented as a SoC or standalone hardware package.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and Compact Disc Read-Only Memory (CD-ROM) and Digital Versatile Disc Read-Only Memory (DVD-ROM) disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 8 and 9 is intended to depict a high-level view of components of a device, subsystem, or arrangement of an edge computing node. However, it will be understood that some of the components shown may be omitted, additional components may be present, and a different arrangement of the components shown may occur in other implementations.

Figure 10:
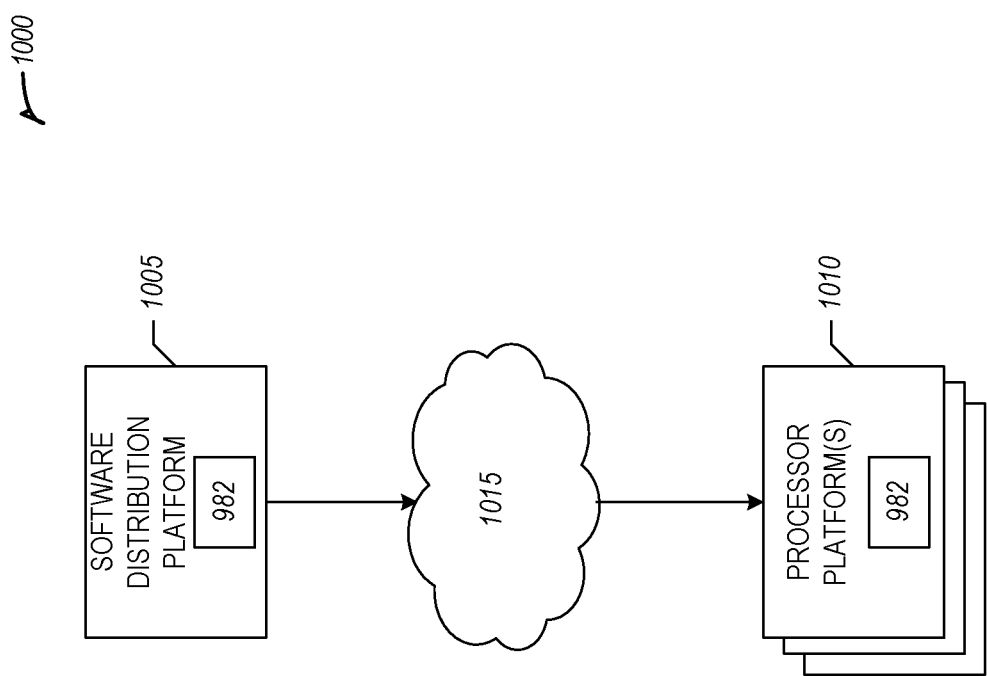
FIG. 10 illustrates a software distribution platform to distribute software instructions and derivatives, according to an example.

FIG. 10 illustrates an example software distribution platform 1005 to distribute software, such as the example computer readable instructions 982 of FIG. 9, to one or more devices, such as example processor platform(s) 1010 and/or other example connected edge devices or systems discussed herein. The example software distribution platform 1005 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 1005). Example connected edge devices may operate in commercial and/or home automation environments. In some examples, a third party is a developer, a seller, and/or a licensor of software such as the example computer readable instructions 982 of FIG. 9. The third parties may be consumers, users, retailers, Original Equipment Manufacturers (OEMs), etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 10, the software distribution platform 1005 includes one or more servers and one or more storage devices that store the computer readable instructions 982. The one or more servers of the example software distribution platform 1005 are in communication with a network 1015, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 982 from the software distribution platform 1005. For example, the software, which may correspond to example computer readable instructions, may be downloaded to the example processor platform(s), which is/are to execute the computer readable instructions 982. In some examples, one or more servers of the software distribution platform 1005 are communicatively connected to one or more security domains and/or security devices through which requests and transmissions of the example computer readable instructions 982 must pass. In some examples, one or more servers of the software distribution platform 1005 periodically offer, transmit, and/or force updates to the software (e.g., the example computer readable instructions 982 of FIG. 9) to ensure improvements, patches, updates, etc. are distributed and applied to the software at the end user devices.

In the illustrated example of FIG. 10, the computer readable instructions 982 are stored on storage devices of the software distribution platform 1005 in a particular format. A format of computer readable instructions includes, but is not limited to a particular code language (e.g., Java, JavaScript, Python, C, C#, Structured Query Language (SQL), HTML, etc.), and/or a particular code state (e.g., uncompiled code (e.g., American Standard Code for Information Interchange (ASCII)), interpreted code, linked code, executable code (e.g., a binary), etc.). In some examples, the computer readable instructions 982 stored in the software distribution platform 1005 are in a first format when transmitted to the example processor platform(s) 1010. In some examples, the first format is an executable binary in which particular types of the processor platform(s) 1010 can execute. However, in some examples, the first format is uncompiled code that requires one or more preparation tasks to transform the first format to a second format to enable execution on the example processor platform(s) 1010. For instance, the receiving processor platform(s) 1000 may need to compile the computer readable instructions 982 in the first format to generate executable code in a second format that is capable of being executed on the processor platform(s) 1010. In still other examples, the first format is interpreted code that, upon reaching the processor platform(s) 1010, is interpreted by an interpreter to facilitate execution of instructions.

Example MEC App Functionalities

In the context of a deployed system (such as the IoT system depicted in FIG. 4, the MEC system depicted in FIGS. 5A-6, the edge computing system depicted in FIGS. 7-10, or like variations of distributed computing architectures) the present techniques and configurations provide the capability for application registration, management, and information exchange.

As context for the following discussion, according to ETSI GR MEC 035 V3.1.1 (2021 July) ("[MEC035]"), a Multi-access Edge Computing (MEC) federation is a federated model of MEC systems enabling shared usage of MEC services and applications. This definition is based on the need to standardize solutions to address the Operator Platform (OP) Telco Edge requirements discussed in GSMA OPG Permanent Reference Document (PRD), "Operator Platform Telco Edge Requirements", GSMA Assoc., Official Document OPG.02, version 1 (29 Jun. 2021) ("[OPG02]"). A MEC Federation should comply with these requirements.

FIG. 11 depicts an OP Roles and Interfaces Reference Architecture 1100. According to [OPG02], an Operator Platform (OP) is a facilitator of subscribers' seamless access to edge applications instantiated within a federation of edge networks involving multiple owners. Such seamless access is needed either when subscribers roam to visited networks or when a partner network is a better choice for edge application instantiation. The objective of the OP concept is to guide the industry ecosystem (e.g., mobile network operators (MNOs), vendors, OEMs and service providers) towards shaping a common solution for the exposure of network capabilities. As an initial step, [OPG02] provides both an end-to-end definition and requirements of the OP for the support of edge computing. In further details, the GSMA defines OP requirements as well as OP architecture and functional modules. Therefore, an aim of GSMA is to engage with standardization and open source communities that will undertake the standard definition of the OP.

As depicted in FIG. 11, the following OP interfaces have been defined according to the principles set forth in [OPG02]:

Northbound Interface (NBI) 1111 (e.g., providing an interface between an application provider 1110 and an operator platform 1150);

Southbound Interface (SBI)-Cloud Resources (SBI-CR) 1114 (e.g., providing a connection between cloud resources 1140 and the service resource manager role 1156 of the operator platform 1150);

Southbound Interface (SBI)-Network Resources (SBI-NR) 1112 (e.g., providing a connection between network resources 1120 and the service resource manager role 1156 of the operator platform 1150);

Southbound Interface (SBI)-Charging Functions (SBI-CHF) 1113 (e.g., providing a connection between a charging engine 1130 and the service resource manager role 1156 of the operator platform 1150);

User Network Interface (UNI) 1115 (e.g., providing a connection between a user client 1170 and the service resource manager role 1156 of the operator platform 1150); and East/West Bound Interface (E/WBI) 1116, 1117 (e.g., providing a connection between an operator platform 1162, 1164 and the federation manager role 1154 of operator platform 1150, including the operator platform 1162 that includes a federation broker role 1160; or, a connection between operator platform 1162 and operator platforms 1166, 1168).

In particular, the NBI 1111 connecting an Application Provider 1110 to an OP instance (e.g., operator platform 1150) and the E/WBIs 1116, 1117 connecting two OP instances (e.g., two of operator platforms 1150, 1152, 1164, 1166, 1168) are aimed to be standardized by ETSI MEC.

Figure 12:
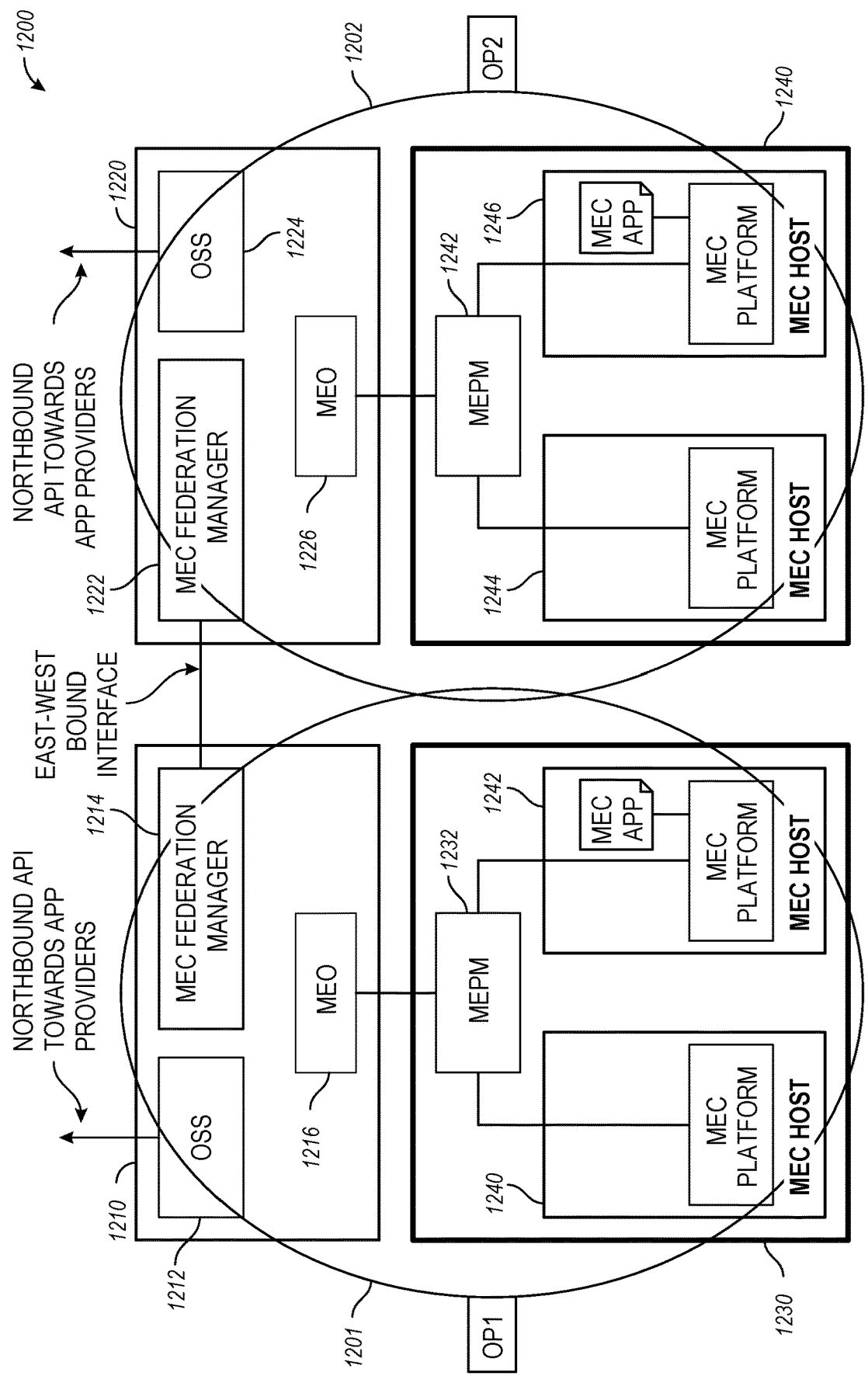
FIG. 12 depicts MEC Federation and correspondence to Global System for Mobile Communications Association (GSMA) Operator Platform (OP) northbound (NBI) and eastbound-westbound (E/WBI) interfaces, according to an example.

FIG. 12 depicts a correspondence of NBI and E/WBI to MEC federation functional entities, in a federated system configuration 1200. Here, reference points are shown in FIG. 12, where it is assumed that each OP instance 1201, 1202 refers to a MEC system (1230, 1240, which is part of the MEC Federation) and there is no MEC Federator/Federation Broker (MEFB) entity present (e.g., Federator 507 in FIG. 5A). Consistent with MEC system architectures, each MEC system includes respective hosts (e.g., hosts 1240, 1242, 1244, 1246), platform managers (e.g., MEPM 1232, 1242), orchestrators (1216, 1226), Operations Support Systems (e.g., OSS 1212, 1224), federation managers (e.g., 1214, 1222).

In the context of a MEC Federation, in the view of an implementation with 5G networks, both ETSI MEC and 3GPP standards may be in use. In this scenario, an interoperable solution for enabling edge application developers to access the MEC federation via NBI is needed. In particular, there is a need for an application to be registered to the whole MEC federation, which would benefit from all the resources shared in the federation (according to the authorization policies defined by the multi-party agreements among the federating entities).

Currently there are no interoperable solutions to allow registration of edge applications in a MEC Federation. Single operator solutions are provided by 3GPP, for the registration of Edge Application Servers (EASs). Analogously, ETSI MEC currently still supports MEC App onboarding and instantiation for a single MEC system implementation, but nothing so far for a MEC Federation.

The MEC App instantiation mechanism defines an Application Descriptor (AppD). An AppD is a part of application package, and describes application requirements and rules required by an application provider. The AppD contains a set of information elements and attributes for MEC App lifecycle management, however, not all AppD attributes are necessary or sufficient for proper consumption by the application developer. Table 1 shows attributes of the AppD data type (based on table 6.2.1.2.2-1 in [MEC010-2]).

TABLE 1

| Attributes of AppD | |
|---|---|
| AppD attribute name | Description |
| appDId | Identifier of this MEC application descriptor. The appDId is used as the unique identifier of the application package that contains the AppD. |

TABLE 1-continued

Attributes of AppD

| AppD attribute name | Description |
| --- | --- |
| appName | Name to identify the MEC application. |
| appProvider | Provider of the application and of the AppD. |
| appSoftVersion | Identifies the version of software of the MEC application. |
| appDVersion | Identifies the version of the application descriptor. |
| mecVersion | Identifies version(s) of MEC system compatible with the MEC App |
| appInfoName | Human readable name for the MEC application. |
| appDescription | Human readable description of the MEC application. |
| virtualComputeDescriptor | Describes CPU, Memory and acceleration requirements of the virtual machine. |
| swImageDescriptor | Describes the software image which is directly loaded on the VM |
| virtualStorageDescriptor | descriptors of virtual storage resources to be used by the MEC application. |
| appExtCpd | Describes external interface(s) exposed by this MEC application. |
| appServiceRequired | Describes services a MEC application requires to run. |
| appServiceOptional | Describes services a MEC application may use if available. |
| appServiceProduced | Describes services a MEC application is able to produce |
| appFeatureRequired | Describes features a MEC application requires to run. |
| appFeatureOptional | Describes features a MEC application may use if available. |
| transportDependencies | Transports that this application requires to be provided by the platform. |
| appTrafficRule | Describes traffic rules the MEC application requires. |
| appDNSRule | Describes DNS rules the MEC application requires. |
| appLatency | Describes the maximum latency tolerated by the MEC application. |
| terminateAppInstanceOpConfig | Configuration parameters for the Terminate application instance operation. |
| changeAppInstanceStateOpConfig | Configuration parameters for the change application instance state operation. |
| userContextTransferCapability | Only if the application supports the user context transfer capability |
| appNetworkPolicy | it represents the application network policy of carrying the application traffic. |

The AppD attribute indicates groups of transport bindings that a service-producing MEC application requires to be supported by the platform in order to be able to produce its services. At least one of the indicated groups needs to be supported to fulfil the requirements. Other aspects of the AppD descriptor are discussed in ETSI GS MEC 010-2 (e.g., V2.1.1 (2019-11)).

Existing solutions only work in specific conditions (e.g., single operator, or single MEC systems). Data types like AppD contain attributes for the lifecycle operation of MEC applications, but none or few attributes related to the application itself, and thus, this is less useful from a developer's point of view.

These and other challenges are overcome with the use of the following hierarchical framework. Among other features and functions, such a framework includes (i) the definition and use of a MEC App Registry object type (called REGAPP); (ii) the configuration and use of OP-level instances of such REGAPP objects; (iii) the configuration and use of a distributed set of MEP-level instances of those REGAPP objects within each OP instance of the federation; and (iv) a hierarchical communication protocol for enabling the REGAPP operation, composed by a set of messages at the E/WBI level, to allow information exchange among FED-REGAPP instances related to the involved federating members. These features and functions are addressed in the respective sections.

Definition of "MEC APP REGISTRY" Object Type (REGAPP)

In the context of MEC federation, an object type called REGAPP is defined. REGAPP is the generic type of MEC App Registry, and it includes information related to the application itself, thus useful from a developer point of view. Table 2 shows example attributes of the REGAPP.

TABLE 2

Attributes of REGAPP

| REGAPP attribute name | Relevance (MEP/FED/Both) | Description |
|---|---|---|
| [fedApps] | Both | List of available MEC Applications in the Federation |
| fedAppId | Both | Identifier of this MEC application in the federation<br>NOTE1: this identifier can hide the actual correspondence with the MEC-internal AppD, for security reasons. |
| appDId | Both | Identifier of this MEC application descriptor (MEC-internal). |
| appName | Both | Name to identify the MEC application. NOTE2: no need to hide this field at federation level. This corresponds to the actual appName in the AppD. |
| appProvider | Both | Provider of the application and of the AppD. See NOTE2. |
| appSoftVersion | Both | Identifies the version of software of the MEC application. See NOTE2. |
| mecVersion | Both | Identifies version(s) of MEC system compatible with the MEC App. See NOTE2. |
| appInfoName | Both | Human readable name for the MEC application. |
| appDescription | Both | Human readable description of the MEC application. |
| virtualComputeDescriptor | Both | Describes CPU, Memory and acceleration requirements of the virtual machine. |
| swImageDescriptor | Both | Describes the software image which is directly loaded on the VM |
| virtualStorageDescriptor | Both | descriptors of virtual storage resources to be used by the MEC application. |
| appExtCpd | Both | Describes external interface(s) exposed by this MEC application. |
| appServiceRequired | Both | Describes services a MEC application requires to run. |
| appServiceOptional | Both | Describes services a MEC application may use if available. |
| appServiceProduced | Both | Describes services a MEC application is able to produce |
| appFeatureRequired | Both | Describes features a MEC application requires to run. |
| appFeatureOptional | Both | Describes features a MEC application may use if available. |
| transportDependencies | Both | Transports that this application requires to be provided by the platform. |
| appTrafficRule | Both | Describes traffic rules the MEC application requires. |
| appDNSRule | Both | Describes DNS rules the MEC application requires. |
| appLatency | Both | Describes the maximum latency tolerated by the MEC application. |
| userContextTransferCapability | Both | Only if the application supports the user context transfer capability |
| appNetworkPolicy | Both | Represents the application network policy of carrying the application traffic. |
| appNumberOfPods | FED | Number of pods (mandatory): The target number of Pods the developer wants his/her application to be deployed in. The value must be a positive integer.<br>NOTE3: a deployment will be created to maintain the desired number of Pods across the cluster of a certain OP instance. |
| serviceMeshInfo | FED | List of Service Meshes in the Federation (assuming a Service Mesh is instantiated within a given MEC system of the federation). For each Service Mesh, Service Mesh Control Plane endpoint information is included. |
| appIpAddress | Both | IP address of the MEC application. |
| appStatus | Both | Status of MEC application. Values are: available and unavailable. |

TABLE 2-continued

Attributes of REGAPP

| REGAPP attribute name | Relevance (MEP/ FED/ Both) | Description |
|---|---|---|
| [fedPlatformServices] | FED | List of available MEC platform services in the Federation. For each service, its name and service discovery information are included (e.g., IP address, API gateway information). |
| [platformServices] | MEP | List of available MEC services in the MEC platform. For each service, its name and service discovery information are included (e.g., IP address, API gateway information). |
| otherFedApis | FED | Other (non-MEC) available APIs in the Federation. |
| otherPlatformApis | MEP | Other (non-MEC) available APIs in the MEC platform. |

The REGAPP may be part of the MEC services registry (e.g., MEC service registry 538 of FIG. 5A) or may be implemented as a separate registry. The REGAPP type can be customized based on the different kind of instances: OP-level REGAPP instances are called FED-REGAPP and are described above; and MEP-level REGAPP instances are called MEP-REGAPPs and are also described above.

OP-level Instances (FED-REGAPPs)

Example FED-REGAPP instances are located on MEOs, as they contain information collected at system level within a MEC System. This information is collected by proper communication with the various MEP-level REGAPP instances, described below. The communication protocol is discussed in more detail below.

Figure 13:
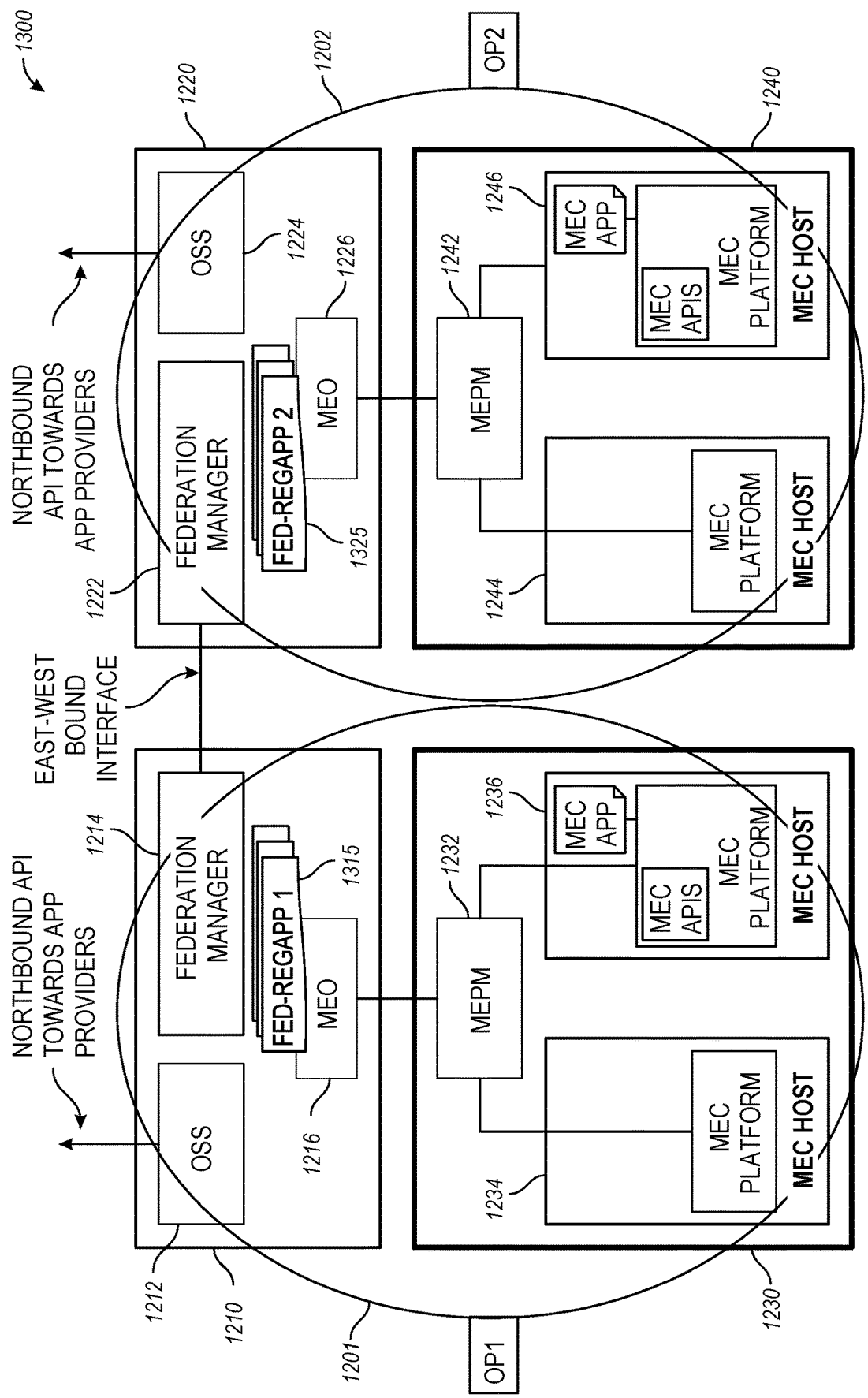
FIG. 13 depicts a MEC federation deployment of OP instances, with a federated registry of applications, according to an example.

FIG. 13 depicts an example MEC Federation 1300, based on the example systems depicted in FIG. 12, where two systems are connected together. Here, federation 1300 depicts two respective instances FED-REGAPP 1 (1315) and FED-REGAPP 2 (1325) are located respectively at MEO 1 (1216) of OP1 and MEO 2 (1226) of OP2.

A FED-REGAPP instance contains a subset of the data defined for the generic REGAPP type, but related to the federation part. The resulting Table 3 shows how an example FED-REGAPP may be defined.

TABLE 3

Attributes of FED-REGAPP

| FED-REGAPP attribute name | Description |
|---|---|
| [fedApps] | List of available MEC Applications in the Federation |
| fedAppId | Identifier of this MEC application in the federation NOTE1: this identifier can hide the actual correspondence with the MEC-internal AppD, for security reasons. |
| appDId | Identifier of this MEC application descriptor (MEC-internal). |
| appName | Name to identify the MEC application. NOTE2: no need to hide this field at federation level. This corresponds to the actual appName in the AppD. |
| appProvider | Provider of the application and of the AppD. See NOTE2. |
| appSoftVersion | Identifies the version of software of the MEC application. See NOTE2. |
| mecVersion | Identifies version(s) of MEC system compatible with the MEC App. See NOTE2. |
| appInfoName | Human readable name for the MEC application. |
| appDescription | Human readable description of the MEC application. |
| virtualComputeDescriptor | Describes CPU, Memory and acceleration requirements of the virtual machine. |
| swImageDescriptor | Describes the software image which is directly loaded on the VM |
| virtualStorageDescriptor | descriptors of virtual storage resources to be used by the MEC application. |
| appExtCpd | Describes external interface(s) exposed by this MEC application. |
| appServiceRequired | Describes services a MEC application requires to run. |
| appServiceOptional | Describes services a MEC application may use if available. |

TABLE 3-continued

Attributes of FED-REGAPP

| FED-REGAPP attribute name | Description |
| --- | --- |
| appServiceProduced | Describes services a MEC application is able to produce |
| appFeatureRequired | Describes features a MEC application requires to run. |
| appFeatureOptional | Describes features a MEC application may use if available. |
| transportDependencies | Transports that this application requires to be provided by the platform. |
| appTrafficRule | Describes traffic rules the MEC application requires. |
| appDNSRule | Describes DNS rules the MEC application requires. |
| appLatency | Describes the maximum latency tolerated by the MEC application. |
| userContextTransferCapability | Only if the application supports the user context transfer capability |
| appNetworkPolicy | it represents the application network policy of carrying the application traffic. |
| appNumberOfPods | Number of pods (mandatory): The target number of Pods the developer wants his/her application to be deployed in. The value must be a positive integer. NOTE3: a deployment will be created to maintain the desired number of Pods across the cluster of a certain OP instance. |
| serviceMeshInfo | List of Service Meshes in the Federation (assuming a Service Mesh is instantiated within a given MEC system of the federation). For each Service Mesh, Service Mesh Control Plane endpoint information is included. |
| appIpAddress | IP address of the MEC application. |
| appStatus | Status of MEC application. Values are: available and unavailable. |
| [fedPlatformServices] | List of available MEC platform services in the Federation. For each service, its name and service discovery information are included (e.g., IP address, API gateway information). |
| otherFedApis | Other (non-MEC) available APIs in the Federation. |

According to OAuth2.0, not all fields and attributes of FED-REGAPP are ought to be exchanged among the various OP instances (e.g., across MEC systems forming a MEC federation). The actual subset of attributes visible to other OP instances depends in fact on authorization policies and filters (defined and implemented by each MEFM of the MEC federation before any FED-REGAPP exchange across OP instances/federated MEC systems).

A MEP-REGAPP instance contains a subset of the data defined for the generic REGAPP type, but related to the MEC host level. Table 4 shows how an example MEP-REGAPP is defined.

TABLE 4

Attributes of MEP-REGAPP

| MEP-REGAPP attribute name | Description |
| --- | --- |
| [fedApps] | List of available MEC Applications in the Federation |
| fedAppId | Identifier of this MEC application in the federation<br>NOTE1: this identifier can hide the actual correspondence with the MEC-internal AppD, for security reasons. |
| appDId | Identifier of this MEC application descriptor (MEC-internal). |
| appName | Name to identify the MEC application.<br>NOTE2: no need to hide this field at federation level. This corresponds to the actual appName in the AppD. |
| appProvider | Provider of the application and of the AppD. See NOTE2. |
| appSoftVersion | Identifies the version of software of the MEC application. See NOTE2. |
| mecVersion | Identifies version(s) of MEC system compatible with the MEC App. See NOTE2. |

TABLE 4-continued

Attributes of MEP-REGAPP

| MEP-REGAPP attribute name | Description |
| --- | --- |
| appInfoName | Human readable name for the MEC application. |
| appDescription | Human readable description of the MEC application. |
| virtualComputeDescriptor | Describes CPU, Memory and acceleration requirements of the virtual machine. |
| swImageDescriptor | Describes the software image which is directly loaded on the VM |
| virtualStorageDescriptor | descriptors of virtual storage resources to be used by the MEC application. |
| appExtCpd | Describes external interface(s) exposed by this MEC application. |
| appServiceRequired | Describes services a MEC application requires to run. |
| appServiceOptional | Describes services a MEC application may use if available. |
| appServiceProduced | Describes services a MEC application is able to produce |
| appFeatureRequired | Describes features a MEC application requires to run. |
| appFeatureOptional | Describes features a MEC application may use if available. |
| transportDependencies | Transports that this application requires to be provided by the platform. |
| appTrafficRule | Describes traffic rules the MEC application requires. |
| appDNSRule | Describes DNS rules the MEC application requires. |
| appLatency | Describes the maximum latency tolerated by the MEC application. |
| userContextTransferCapability | Only if the application supports the user context transfer capability |
| appNetworkPolicy | it represents the application network policy of carrying the application traffic. |
| appIpAddress | IP address of the MEC application. |
| appStatus | Status of MEC application. Values are: available and unavailable. |
| [platformServices] | List of available MEC services in the MEC platform. For each service, its name and service discovery information are included (e.g., IP address, API gateway information). |
| otherPlatformApis | Other (non-MEC) available APIs in the MEC platform. |

In case of a federation containing a member acting as an aggregator (e.g., in accordance with OPG terminology), the OP instance implementing the aggregator role contains a single FED-REGAPP and potential multiple MEP-RE-GAPPs that are relative to different operators. This deployment is corresponding to the specific case where operators with limited capabilities need to establish a partnership with an aggregator, who is capable to connect them to the federation, in some cases not only owning the MEFM, but also potentially managing the resource orchestration functionalities.

Figure 14:
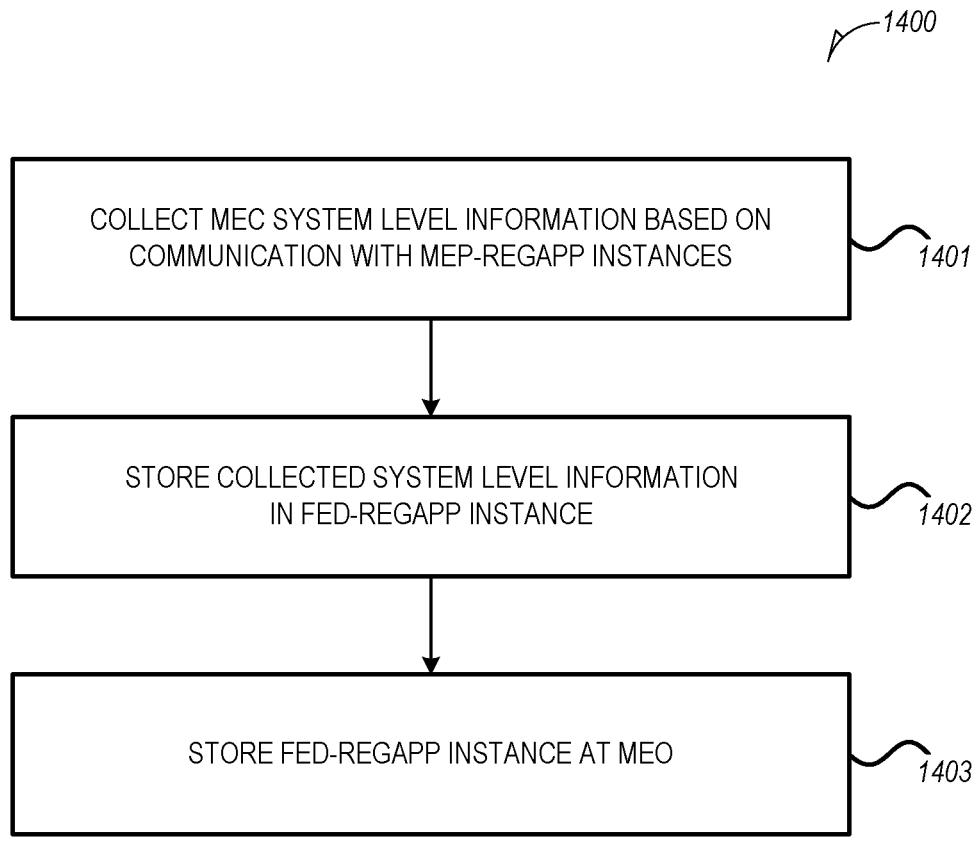
FIG. 14 depicts an example process for establishing an application registry at a MEC platform, according to an example.

FIG. 14 shows an example process 1400 for practicing FED-REGAPP aspects discussed herein, which may be performed by an MEO (e.g., Multi-access Edge Orchestrator 510 of FIG. 5A). Process 1400 begins at operation 1401 where the MEO collects MEC system level information based on communication with individual MEP-REGAPP instances located at corresponding MEPs (e.g., MEC platform 532 of FIG. 5A). The MEO stores the collected system level information in a FED-REGAPP instance(s) at operation 1402 and stores the FED-REGAPP instance(s) at the MEO at operation 1403.

Distributed Set of MEP-Level Instances (MEP-REGAPPs)

The MEP-REGAPP is an instantiation of REGAPP registries at the MEC platform level. As a MEC system includes one or more MEC hosts, each of which includes at least one MEC platform (see e.g., FIGS. 5A-5C), multiple MEP-REGAPP registries per MEC system (or per OP instance) can be present. These registries are optional based on OP capabilities and internal OP implementation; their usage is also optional, in the sense that a MEC application developer may choose to use them to register its produced MEC App instances. Following the description of FED-REGAPP (as discussed above), MEP-REGAPPs are synchronized with their corresponding OP-level FED-REGAPP (via MEO). An instantiation of a MEC system with an OP-level (e.g., MEC system-level) FED-REGAPP and multiple MEP-REGAPPs (each per MEC platform of the MEC system) is shown by FIG. 15.

Figure 15:
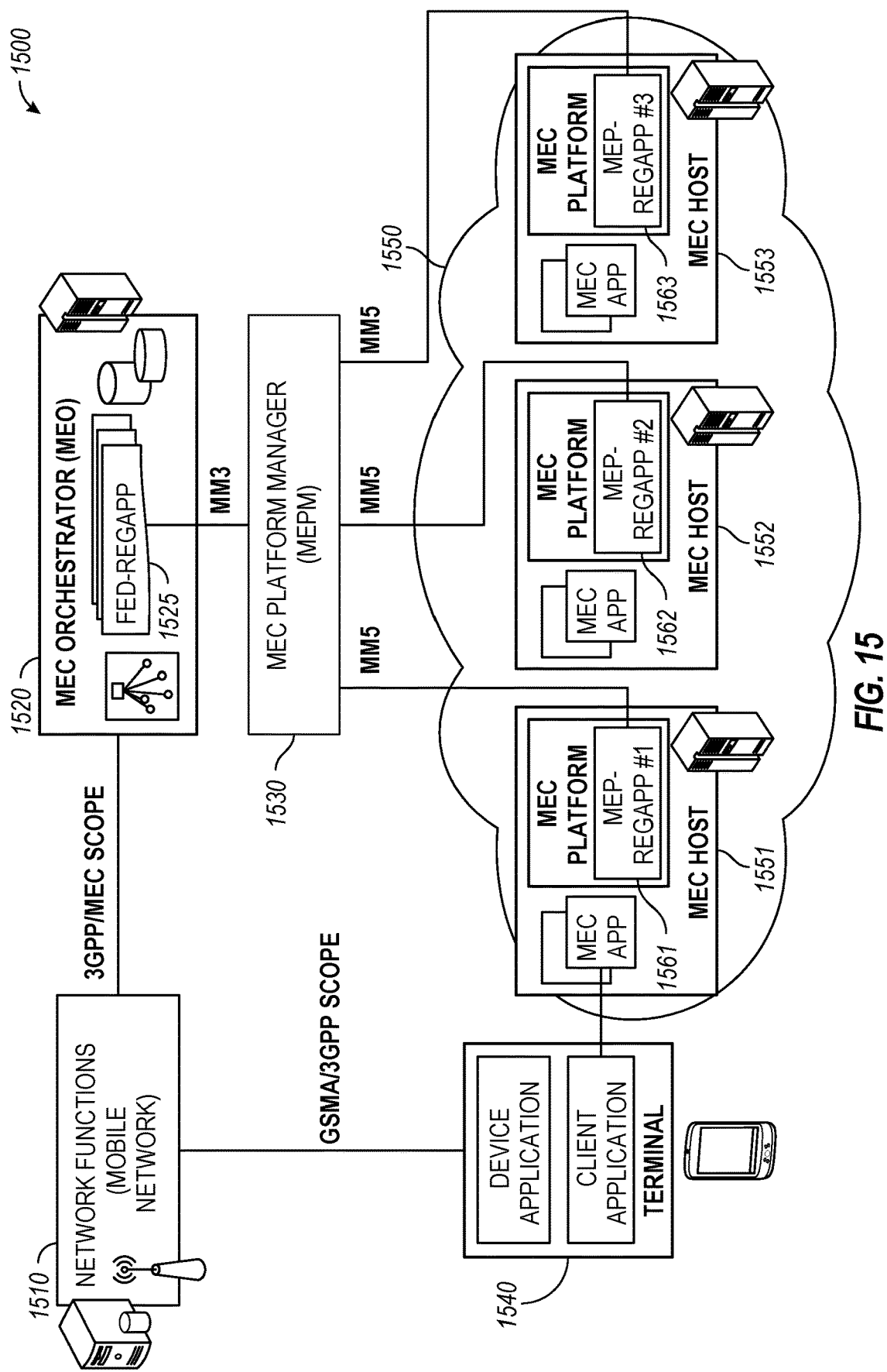
FIG. 15 depicts instances of an application registry at MEC platforms in MEC hosts of a given MEC system (OP instance), according to an example.

FIG. 15 shows example MEP-REGAPP registries 1561, 1562, 1563 instantiated at example MEC hosts of a given example MEC system 1500 (hosts 1551, 1552, 1553, e.g., operating in an OP instance of the system 1500). Here, the MEC system(s) may or may not be a member of a MEC federation.

Consistent with the examples discussed above, a terminal 1540 may use network functions 1510 (e.g., of a mobile network), and 3GPP/MEC features to connect to the respective applications. Such applications may be tracked within an OP instance with use of a FED-REGAPP 1525 operated by a MEC orchestrator 1520, as coordinated by a MEC platform manager 1530. Accordingly, this architecture enables MEP-REGAPPs updated content (from MEC-RE-GAPPs registries 1561, 1562, 1563) to be integrated to the FED-REGAPP 1525 of the overall OP instance.

Figure 16:
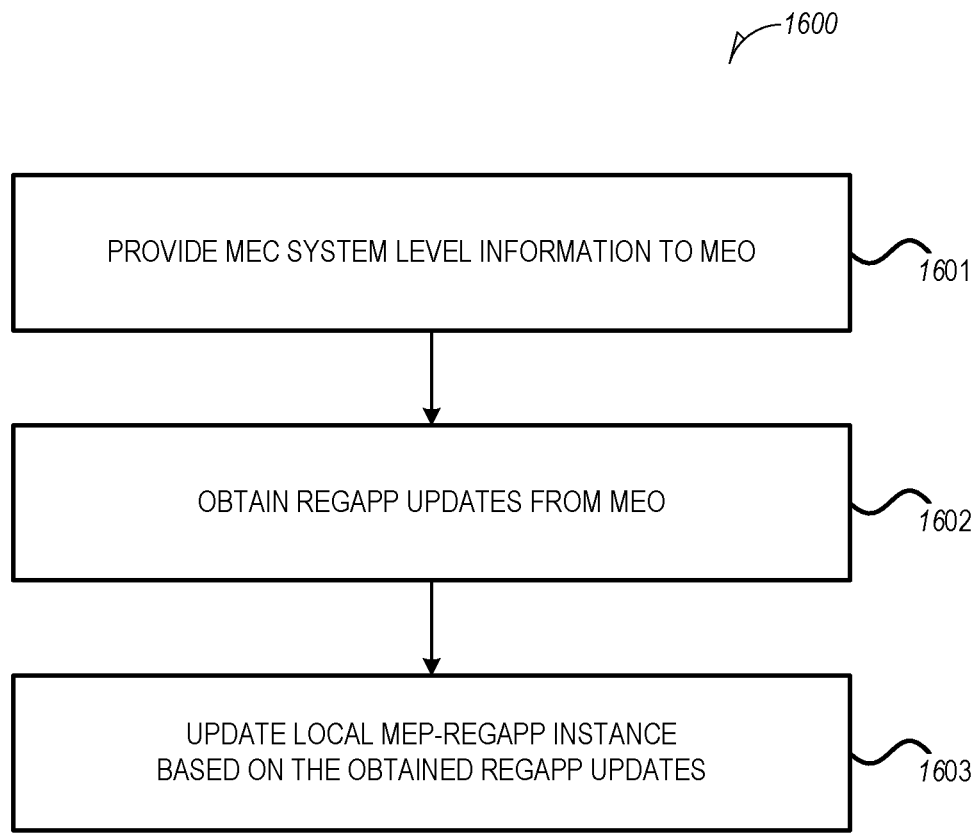
FIG. 16 depicts an example process for establishing an application registry at the MEC platform level, according to an example.

FIG. 16 illustrates a flowchart 1600 of an example method for practicing MEP-REGAPP aspects discussed herein, which may be performed by an MEP (e.g., MEC platform 532 of FIG. 5A). The method of flowchart 1600 may be performed for the purposes of synchronizing the MEP-REGAPPS stored by a set of MEPs (e.g., MEC platforms 532 of FIG. 5A). The method of flowchart 1600 begins at operation 1601 where the MEP provides MEC system level information to an MEO (e.g., Multi-access Edge Orchestrator 510 of FIG. 5A). The MEP obtains REGAPP updates from the MEO at operation 1602 and updates its local MEP-REGAPP instance(s) at operation 1603.

Hierarchical Communication Protocol for Enabling the REGAPP Operation

Figure 17:
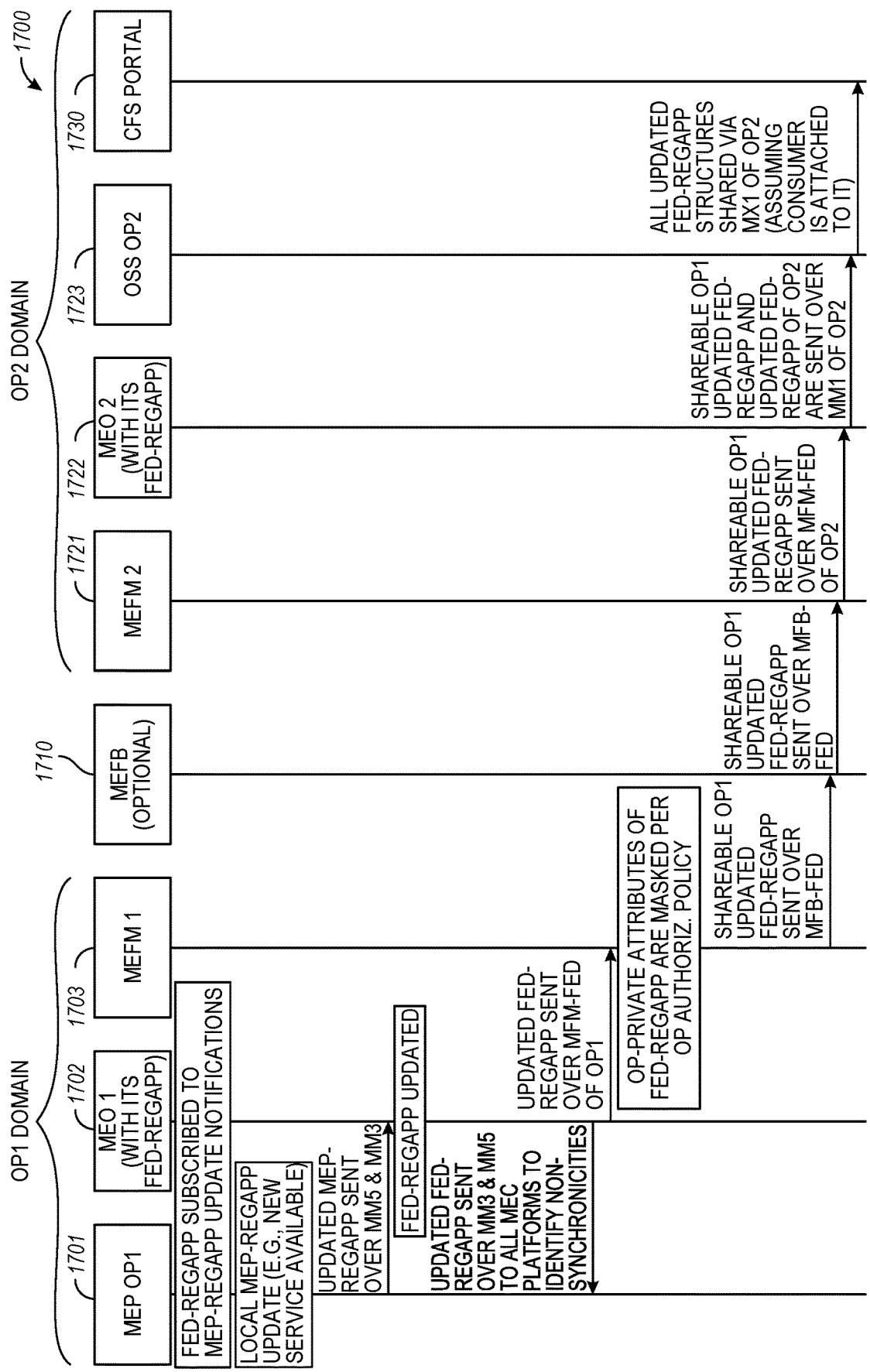
FIG. 17 depicts a hierarchical communication protocol for enabling an application registry operation, according to an example.

FIG. 17 depicts an example hierarchical communication protocol 1700 for enabling the REGAPP operation for an example scenario of an MEP-REGAPP update triggering updates at the CFS portal 1730 (in OP2 domain) connected to another OP of the federation (OP1 domain). FIG. 17 specifically shows a procedure 1700 followed from the moment a MEP-REGAPP update within the domain of an OP 1 triggers its corresponding OP-wide FED-REGAPP update up to the moment when the Customer Facing Service (CFS) portal 1723—assuming it is connected to the Operations Support System (OSS) 1723 of another (federated) OP instance—is updated accordingly. It is assumed that each MEC system (equiv. OP instance) includes one or more MEC platforms (e.g., MEP 1701), orchestrators (e.g., 1702, 1722), and MEC federation managers and broker (1703, 1710, 1721). For the sake of clarity, only the MEC platform and the MEP-REGAPP that undergoes updates is shown by FIG. 17.

Additional Considerations for Integration with an OP Architecture

Referring back to the OP environment described in FIG. 11, the Operator Platform's primary goal is providing a global and universal way of exposing certain services to external Application Providers, whether through a direct connection from the resource owner towards the final consumer or by employing intermediate integration platforms. The OP environment hosts multiple actors who may need to interwork to complete end-to-end service delivery, resource sharing and footprint expansion. This interworking implies defining a common way of enabling actors to interact with each other.

To satisfy its goals, the OP enforces a multi-layer architecture with multi-role separation of the complete functionalities and requirements, such as is presented in FIG. 11. For a system as complex as the OP, a target architecture is needed to localize and inter-relate the requirements. Such a target architecture is presented in [OPG02]. The following discusses additional features of an OP, including those in the current state-of-the-art, which may be relevant to the presently described application registry framework.

As will be understood, an OP target architecture may be described at a relatively high level. Where OP-specific concepts are specified, they are defined as roles, functionalities, and interfaces. This is done to capture the essential behavior needed by OPs without constraining the ability of the architecture to conform to prevailing standards or the ability of vendors to innovate.

There are certain exceptions to this concept where more concrete architectural descriptions are provided, in particular, for (1) Containers and Virtual Machines and (2) Serverless computing. First, in the application development ecosystem with which OP must interact, deploying applications in containers and virtual machines is a well-established practice. The OP does not intend to create a new framework for application development and lifecycle management. Therefore, specific OP requirements may be provided for containers and VMs. Second, serverless computing architectural pattern has been identified as a high priority for monetizing edge computing in the OP environment. Analogously to the cases of containers and VMs, serverless computing presupposes interactions between users and applications that are somewhat specific, and so OP requirements may be specifically provided.

The Federation Management functionality within the OP enables it to interact with other OP instances, often in different geographies, thereby providing access for the Application Providers to a larger footprint of Edge Clouds (see e.g., edge cloud 110 of FIG. 1, discussed above), a more extensive set of subscribers and multiple Operator capabilities. The following may be prerequisites to enable the federation model in specific examples: (1) Operators need to have an agreement to share Edge Cloud resources; (2) Operators need to agree on an Edge Cloud resource sharing policy; and (3) Operators need to enable connectivity between the OP instances over which East/West Bound Interface signaling flows.

In an example, Federation Management provides the Management plane. The Management Plane covers the set of functionalities offered to Application Providers and OPs to control and monitor the resources and applications within the federation under their responsibility. The Management Plane functionality is realized via the multiple functional blocks within an OP instance listed in [OPG02]. The management actions are relayed between these different functional blocks using the NBI, SBI and E/WBI interfaces that have been defined for communication between them in [OPG02].

The Management plane works at two domain levels: application and infrastructure (resources). Each of these domains supports management at two distinct stages in the managed entities life-cycle: the configuration and the run time management. Table 5 lists the functionality provided by the Management Plane in each domain and stage.

TABLE 5

Management Functionalities

| Domain | Stage | Management Functionality |
|---|---|---|
| Resources | Configuration | Federation Interconnect Management |
| | | Resource Catalogue Synchronization and Discovery |
| | | Edge Node Sharing |
| | | Partner OP Provisioning |
| | | Authentication and Authorization |
| | | Resource sharing policies |
| | | Automation of Orchestration |
| | Run Time | Edge Cloud resource monitoring |
| | | Lifecycle Automation |
| Application | Configuration | Application Management |
| | | Service Availability on Visited Networks |
| | | Automation of Orchestration |
| | Run Time | Operational visibility |
| | | Lifecycle Automation |

The Federation Interconnect Management functional block in the OP deals with establishing and sustaining the Federation Interconnect (E/WBI) between the OP instances. The Federation Interconnect uses secure transport, plus capabilities such as integrity protection for the E/WBI messaging between OP instances. During the Federation Interconnect establishment, the Federation Managers of the participating OPs need to verify each other's identities through mutual authentication. Federation interconnect management functionality also ensures that the partner OP is authorized to establish and maintain the interconnect according to the federation agreement between the partnering OPs/Operators.

Resource Catalogue Synchronization and Discovery. Operators can include the edge resources in the OP's set of available resources using the SBI. The OPs shall exchange and maintain the types of resources offered to each other (E/WBI). This exchange includes information about Availability Zones:
  (a) A Region identifier (e.g., geographical area).
  (b) Compute Resources Offered: e.g., a catalogue of resources offered (CPUs, Memory, Storage, Bandwidth in/out).
  (c) Specialized Compute Offered: catalogue of add-on resources (e.g., Graphic Processing Units (GPU), Vision Processing Units (VPU), Neural Processing Units (NPU), and Field Programmable Gate Arrays (FPGA), and/or the like).
  (d) Network QoS supported by the zone: maximum values of latency, jitter, packet loss ratio.
  (e) Supported virtualization technology: only VMs, only containers, both.
  (f) Costs associated with the use of resources. This information can influence the Availability Zone selection (e.g., the use of several small zones, that combined, cover the needed Region and are offered by different partners, instead of a more extensive and expensive zone offered by another partner).

This information may change and can be updated via the E/WBI whenever the geographical area or the types of resources offered to an OP by partner changes due to Operational or Administrative events (e.g., due to scheduled maintenance). A subscription/notification mechanism is supported over the E/WBI to achieve the above.

Application and Resources Management corresponds to the forwarding of a northbound request from one operator to accommodate an Edge Application or a resource booking in another operator's Cloudlets. Operators authorize the deployment or reservation based on available resources and federation agreement. In the Federated model, one OP can coordinate with partner OPs to assist application onboarding, deployment and monitoring in the partner OP Edge Clouds. Therefore, the E/WBI interface must provide capabilities to support resource reservation and application onboarding, deployment and monitoring in partner OP Edge Clouds. The Application Providers interact with one OP instance and provide their requests over the NBI, indicating the intended geographical Regions that they want to target. The OP instance translates these NBI interactions to the E/WBI. The Application Provider request contains mandatory information (required CPU, memory, storage, bandwidth . . . ) defined in an application manifest. It may also include other optional characteristics indicating the application's needs (latency, prioritization, reservation, etc.). There may be multiple models possible for performing application orchestration via the E/WBI. On a federation relationship, the Partner OP decides which Edge Cloud(s) to deploy the applications on or which Cloudlet provides the resources available for a reservation based on the Availability Zone/Region preferences indicated by the Application Provider. In doing so, the Application Provider criteria are used by the partner OP as provided to it via the E/WBI. The E/WBI, therefore, enables the partner OP to be informed about the Application Provider's requirements—information which the home OP has learnt from the Application Provider through the NBI. The application provider's criteria about Availability Zone/Region are considered, but, in the end, it is the Operator Platform that decides which edge cloud resources provide the better fit with the application requirements (QoS) and the costs of using those resources.

Service Availability on Visited Networks Management. When a User Client (UC) requires accessing the Edge Cloud service of a visited network, the federation model facilitates service availability for this UC. The service should be provided via local Edge Cloud resources of the Visited OP if local breakout is available for roaming UEs. When entering into a federation agreement, MNOs may also agree to enable Local Breakout for the data connections towards the edge cloud resources in visited networks. When enabling local breakout, MNOs need to consider regulatory requirements on the home and visited network (e.g., lawful interception).

If local breakout is not possible, the UC may be served via the Home OP. For that reason, and considering the credentials and authoritative ownership of the users to the home operator, the authentication and authorization of the first register request shall always be made to the home operator's OP. Home Public Land Mobile Network (HPLMN) identifiers or pre-provisioned IDs can be used to form the home Service Resource Manager (SRM) URL (e.g., http://register.opg.mnc.mcc.pub.3gppnetwork.org).

During UC registration, to support the Edge service discovery procedure for the UC in the Visited OP, the Home OP shall identify that the UC is in a visited network and provide the UC with the discovery URL of the Visited OP to redirect the UC registration. The Home OP shall be aware of the discovery URL of the Visited OP either: via E/WBI communication, or by deriving it when the UC performs the home OP registration procedure, from the visited operator's identity, e.g., the Mobile Network Code (MNC) and Mobile Country Code (MCC).

NEF/SCEF event and information retrieval may be used to identify the Visited Public Land Mobile Network (VPLMN) ID and the visited OP URL where the user is connected. To facilitate service availability in a visited network, the E/WBI shall allow the Home OP to provide the Visited OP with the necessary information to perform authorization and grant the service access (e.g., a token). When the UC tries to access a service when on visited networks, the Visited OP authorizes the UC using the authorization information received via the E/WBI from the Home OP of the UC as part of the secured federation interconnection. This procedure is network-driven, which means that it shall only be triggered after a network change or a token expiration. Once a UC is registered on a Visited OP, that platform shall remain responsible for providing applications to the UE until any network change, not per application request.

Edge Node Sharing involves two (or more) operators deciding to share edge nodes to maximize their edge presence. For instance, consider a scenario where the mobile network of both operators covers the whole country. However, Partner A deploys edge sites in the country's North Region and operator B in the South Region. In this case, Operator B might deploy an application on Partner A's edge node while providing connectivity to the end-user over their own radio network. The connectivity between the two OPs is over the E/WBI interface.

The East/Westbound interface enables Operator B's OP to retrieve the application instance access information and provide it to the user. This approach allows performing service discovery and delivery in the same way as when the application was delivered from a Cloudlet in Operator B's own network. A subscriber of Operator B accesses its home network/operator platform and asks for the required Edge-Enhanced or Edge-Native Application. When Operator B's OP identifies that the most suitable edge node is in Partner A, Operator B's OP requests the Edge Cloud service through the E/WBI to Partner A's OP. In this example, since the OPs have a long running partnership, they have pre-established commercial agreements, security relationships and policy decisions (for instance, QoS-related). Thus (assuming enough edge resource is available), Partner A can reply with the application endpoint (e.g., FQDN) on the Cloudlet at which the subscriber can connect to the application.

Note that network resources remain managed by Operator B, the operator providing the actual mobile network connection to the user, and IP connectivity between Partner A's edge node and Operator B is managed to ensure end-to-end QoS delivery for the subscriber. Responsibility for the management of the edge cloud resources depends on the agreement between the partners. Most likely, Operator B has a long-term allocation of resources in Partner A's cloudlets and manages them amongst its subscribers wanting access to the edge service.

An OP also may provide various configuration capabilities to establish and manage the Federation Interconnect. An OP allows mechanisms to provision partner OP information used for Federation Interconnect establishment and management. This information would include: the Partner Name; the Partner's geographical area (e.g., Country of operation); the Partner identifiers; the Partner's federation interconnect E/WBI endpoint; and/or the federation agreement validity duration. Other considerations and configurations may include:

Authentication and Authorization. When an OP connects to a partner OP via the federation interconnect, it needs to authenticate itself to that partner OP. This authentication requires that authentication information (e.g., digital certificate or passphrase) is provisioned in the OP. This mechanism can be mutually agreed between the involved operators as a first step. A more generic solution based on a Certificate Authority could be considered going forward within the GSMA. An OP may authorize a partner OP for a limited duration (based on a federation agreement) or specific Availability Zone(s) where they have Edge Cloud resources. This information would need to be provisioned during partner provisioning.

Resource sharing policies. An OP shall provide controls to the Operator to specify Availability Zones to be made available to a partner OP. These controls shall allow all or part of the resources of an Availability Zone to be shared. Availability Zone sharing is dependent on the Federation agreement that exists between the OPs.

Edge Cloud resource monitoring. The OP offers to application providers and operators the capability to monitor the resources by: usage: compute, memory, storage, bandwidth ingress and egress; events, alarms/faults, logs; and/or metrics performance. Usage data about resources consumed, per partner or by application, are the parameters that are monitored by default. However, specific events, alarms, logs and metrics should be defined by the application provider (those related to the applications) or the federation contract between the operators (those related to the shared resources). An OP monitors Edge Cloud resource consumption by the Edge Applications, including applications from the partner OPs. In addition, an OP informs the partner OP of the resource consumption statistics of its applications via the E/WBI. The resource usage shall be identified per Operator and Edge Application and may be reported per Availability Zone. An OP would use this information as an input for billing, audit and settlement purposes.

Operational visibility. The OPs have an operational view of each other, allowing Fault Management and Performance management within the limits of their agreements in the federation contracts. This fault and performance management is based on the information obtained through the monitoring described in [OPG02]. Due to the amount of exchanged information, a subscription/notification mechanism should be available to allow the above filtering for the information relevant for Fault and Performance management.

Automation Capabilities. The OPs offer application providers the automation of the everyday actions related to the resources' lifecycle management across a federation. The information assets used in a federation should be harmonized to enable this (see e.g., Common Data Model, discussed in [OPG02]). There are a few scenarios considered for automation such as, for example, starting new application instances, the reconfiguration of resources and network to maintain SLAs the execution of application policies, and/or the reservation and release of resources.

Low latency interaction between UCs and applications in different networks. The end-to-end (e2e) latency between a UC and corresponding edge application on an OP's edge cloud may play a vital role in the user experience, e.g., for AR/VR based applications or V2X applications for automotive and many others.

Through Edge Node sharing or in a roaming scenario (without LBO), an Application Client may get serviced from Operator A, for example, in the context of edge services. At the same time, the UE is attached to a different mobile network of, say, Operator B (see e.g., scenarios illustrated in FIG. 11). In such cases, the MNOs in a federation relationship need to manage the inter-operator IP connectivity carrying application traffic. They need to do this to meet the required SLAs demanded by edge applications sensitive to latency and other QoS attributes (e.g., throughput, jitter, packet loss, latency etc.) averaged over time.

The inter-operator IP interconnect carrying application traffic between two operators corresponds to the data plane and is different from the E/WBI interface carrying the OP control plane communication for applications and federation management.

MNOs wishing to participate in edge node sharing or offering a home routed scenario involving inter-operator IP connectivity in different networks may agree to set up specific IP transport. This transport may include but is not limited to dedicated connections, IPX or colocation services, to name a few possible options. These IP interconnects and the technologies to be used can be mutually agreed and preconfigured to provide the agreed IP services with the required QoS.

The Service Resource Manager (SRM) may be statically configured to be aware of such inter-IP connectivity aspects with the partner OPs and the associated QoS supported over the IP interconnect. The IP interconnect between MNOs could be monitored by the operators to assess its performance. However, the OP is not expected to be directly involved in any management, control or monitoring functions. The division of control over the set of relevant QoS attributes of IP interconnect can be a mutual agreement between the OP and the operator to provide such network services to Application Providers. Inter-operator IP connectivity in this phase is assumed to be a pre-established dedicated connection between the MNOs that the OP could utilize as a network resource to enable edge node sharing or home-routed scenarios. Aspects like standardized interfaces or dynamic interaction between the OP and the network controller (or management plane) of such inter-operator IP network are for further study in a subsequent phase.

Figure 18:
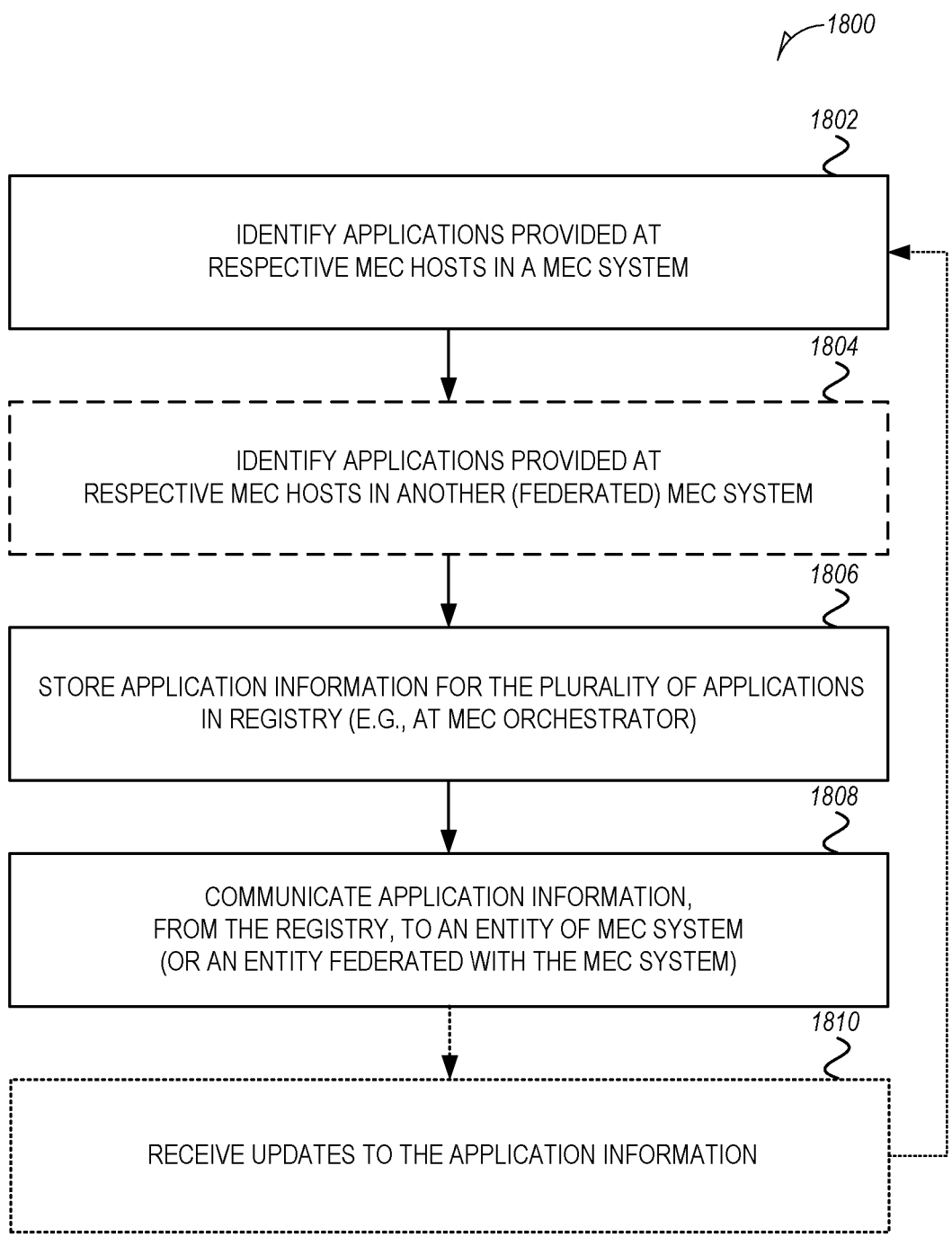
FIG. 18 illustrates a flowchart of a method for enabling application registry and information exchanges in MEC or Operator Platform systems, according to an example.

FIG. 18 illustrates a flowchart 1800 of a method for performing the application registry and information management functions discussed above (e.g., with reference to FIGS. 12 to 17). As will be understood, the following operations of the flowchart 1800 are depicted from the perspective of an orchestrator in an MEC system (e.g., a first MEC system), such as may be performed by the MEO discussed above. However, other entities (such as a federation manager, platform manager, individual hosts, etc.) may also be involved for use of the following operations.

Operation 1802 includes operations to identify applications provided at respective MEC hosts within a MEC system. Such operations may occur in a MEC system configuration where the orchestrator operates as a MEC orchestrator of the MEC system, and the MEC orchestrator controls a plurality of MEC platforms corresponding to the plurality of MEC hosts.

Operation 1804 includes optional operations to identify applications provided at respective MEC hosts in another (federated) MEC system (e.g., a second MEC system). Such operations may be based on communications with a MEC federator, and the communication of application information via the MEC federator. A MEC federator, consistent with the examples above, may establish (manage, broker, etc.) the federation between the MEC system and at least another MEC system. In a specific example, the MEC system is a first operator platform (OP) established by a first network operator, and the another MEC system is a second operator platform (OP) established by a second network operator. In such an OP configuration, the respective operator platforms may be used to provide network functions to respective client devices based on the plurality of applications.

Operation 1806 includes operations to store application information for the plurality of applications in a registry (e.g., a registry at a MEC orchestrator, discussed above). In an example where the MEC system is part of a MEC federation, the application information is maintained in the registry for a plurality of applications in a MEC federation that includes the MEC system. In still a further example, the application information for each of the plurality of applications is maintained in a registry object, and the properties of the registry object for a respective application include: an identifier of the respective application within the MEC federation; an identifier of the respective application within the MEC system; and a name to identify the respective application. Further, the registry object may include additional properties for the respective application. Access to the additional properties may be controlled based on at least one authorization policy defined in the MEC federation or in a particular MEC system.

Operation 1808 includes operations to communicate application data from the registry to an entity of MEC system (or an entity federated with the MEC system). Such operations may include providing the application information to a respective MEC host of the plurality of MEC hosts. This, in turn, may cause the application information to be synchronized with a respective registry hosted at a respective MEC platform of the respective MEC host. Such operations may also include communicating application information relating to the MEC applications from the registry to another MEC system, such as via the MEC federator. In such a setting, the registry at one MEC system may allow synchronization of application information with a registry at another federated MEC system.

Operation 1810 includes optional subsequent operations to receive one or more updates to the application information, for one or more of the plurality of applications. In an example, such updates are implemented as part of the operations to identify the applications in a particular MEC system (at operation 1802), which is then followed by the operations to store the updated application information (at operation 1806) and to communicate the updated application information to entities of the MEC system or entities that are federated with the MEC system (operation 1808). Updates from the MEC federation (e.g., updates from applications in another MEC system) may also be received and stored consistent with these examples. Other examples for receiving and synchronizing additional information from applications, hosts, platforms, and systems may also be implemented.

The operations of flowchart 1800 may be applicable to a variety of configurations discussed above. Such configurations include the OP and mobile network configurations discussed above, such as where at least one of the plurality of applications is accessible via network functions of a mobile network. For instance, such network functions may be used to operate at least one of the plurality of applications for a client user device based on the application information in the registry. Further, the operations of the flowchart 1800 may be applicable in scenarios where the respective entities of the MEC system operate according to a European Telecommunications Standards Institute (ETSI) Multi-Access Edge Computing (MEC) specification, consistent with the many examples above.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing node operating in a first Multi-Access Edge Computing (MEC) system, the computing node comprising: communications circuitry configured to perform communications with a first plurality of MEC hosts in the first MEC system and a second plurality of MEC hosts in a second MEC system, the second MEC system in a MEC federation with the first MEC system; and processing circuitry configured to: identify, based on the communications with the first plurality of MEC hosts, a first plurality of applications provided by the first plurality of MEC hosts in the first MEC system; identify, based on the communications with the second plurality of MEC hosts, a second plurality of applications provided by the second plurality of MEC hosts in the second MEC system; store application information for the first and second plurality of applications in a registry; and communicate the application information from the registry to an entity of the first MEC system or to an entity federated with the first MEC system.

In Example 2, the subject matter of Example 1 optionally includes subject matter where operations to identify the first plurality of applications provided by the first plurality of MEC hosts include operations to: receive, from a respective MEC host of the first plurality of MEC hosts, an update to the application information for at least one of the first plurality of applications.

In Example 3, the subject matter of any one or more of Examples 1-2 optionally include subject matter where operations to communicate the application information include operations to: provide the application information to a respective MEC host of the first plurality of MEC hosts, to cause the application information to be synchronized with a respective registry hosted at a respective MEC platform of the respective MEC host.

In Example 4, the subject matter of any one or more of Examples 1-3 optionally include subject matter where the computing node operates as a MEC Orchestrator of the first MEC system, wherein the MEC Orchestrator controls a plurality of MEC platforms corresponding to the first plurality of MEC hosts.

In Example 5, the subject matter of any one or more of Examples 1-4 optionally include subject matter where the application information for each of the first and second plurality of applications is maintained using a registry object, and wherein properties of the registry object for a respective application include: an identifier of the respective application within the MEC federation; an identifier of the respective application within the first or second MEC system; and a name to identify the respective application.

In Example 6, the subject matter of Example 5 optionally includes subject matter where the registry object includes additional properties for the respective application, and wherein access to the additional properties are controlled in at least one authorization policy defined in the MEC federation.

In Example 7, the subject matter of any one or more of Examples 1-6 optionally include subject matter where the processing circuitry is configured to: communicate with a MEC federator, the MEC federator to establish the MEC federation between the first MEC system and at least the second MEC system.

In Example 8, the subject matter of Example 7 optionally includes subject matter where the first MEC system is a first operator platform established by a first network operator, wherein the second MEC system is a second operator platform established by a second network operator, and wherein the respective operator platforms are used to provide network functions to respective client devices based on the first and second plurality of applications.

In Example 9, the subject matter of any one or more of Examples 7-8 optionally include subject matter where the processing circuitry is further configured to: provide application information relating to at least the first plurality of MEC applications from the registry to the second MEC system, via the MEC federator.

In Example 10, the subject matter of any one or more of Examples 7-9 optionally include subject matter where the processing circuitry is further configured to: obtain additional application information from the second MEC system, via the MEC federator, the additional application information relating to one or more applications operating at second MEC system; and store the additional application information from the second MEC system in the registry.

In Example 11, the subject matter of any one or more of Examples 1-10 optionally include subject matter where at least one of the first plurality of applications is accessible via network functions of a mobile network, and wherein the network functions are used to operate at least one of the first plurality of applications for a client user device based on the application information in the registry.

In Example 12, the subject matter of Example 11 optionally includes subject matter where respective entities of the first and second MEC systems operate according to a European Telecommunications Standards Institute (ETSI) Multi-Access Edge Computing (MEC) specification.

Example 13 is a method performed at a computing device operating in a first Multi-Access Edge Computing (MEC) system, the method comprising: identifying, based on communications with a first plurality of MEC hosts in the first MEC system, a first plurality of applications provided by the first MEC hosts; identifying, based on communications with a second plurality of MEC hosts, a second plurality of applications provided by the second plurality of MEC hosts in a second MEC system, the second MEC system in a MEC federation with the first MEC system; storing application information for the first and second plurality of applications in a registry; and communicating the application information from the registry to an entity of the first MEC system or to an entity federated with the first MEC system.

In Example 14, the subject matter of Example 13 optionally includes subject matter where identifying the first plurality of applications provided by the first plurality of MEC hosts includes: receiving, from a respective MEC host of the first plurality of MEC hosts, an update to the application information for at least one of the first plurality of applications.

In Example 15, the subject matter of any one or more of Examples 13-14 optionally include subject matter where communicating the application information includes: providing the application information to a respective MEC host of the first plurality of MEC hosts, to cause the application information to be synchronized with a respective registry hosted at a respective MEC platform of the respective MEC host.

In Example 16, the subject matter of any one or more of Examples 13-15 optionally include subject matter where the method is performed by a MEC Orchestrator of the first MEC system, wherein the MEC Orchestrator controls a plurality of MEC platforms corresponding to the first plurality of MEC hosts.

In Example 17, the subject matter of any one or more of Examples 13-16 optionally include subject matter where the application information for each of the first and second plurality of applications is maintained using a registry object, and wherein properties of the registry object for a respective application include: an identifier of the respective application within the MEC federation; an identifier of the respective application within the first or second MEC system; and a name to identify the respective application.

In Example 18, the subject matter of Example 17 optionally includes subject matter where the registry object includes additional properties for the respective application, and wherein access to the additional properties are controlled in at least one authorization policy defined in the MEC federation.

In Example 19, the subject matter of any one or more of Examples 13-18 optionally include communicating with a MEC federator, the MEC federator to establish the MEC federation between the first MEC system and at least the second MEC system.

In Example 20, the subject matter of Example 19 optionally includes subject matter where the first MEC system is a first operator platform established by a first network operator, wherein the second MEC system is a second operator platform established by a second network operator, and wherein the respective operator platforms are used to provide network functions to respective client devices based on the first and second plurality of applications.

In Example 21, the subject matter of Example 20 optionally includes communicating application information relating to at least the first plurality of MEC applications from the registry to the second MEC system, via the MEC federator.

In Example 22, the subject matter of any one or more of Examples 20-21 optionally include obtaining additional application information from the second MEC system, via the MEC federator, the additional application information relating to one or more applications operating at the second MEC system; and storing the additional application information from the second MEC system in the registry.

In Example 23, the subject matter of any one or more of Examples 13-22 optionally include subject matter where at least one of the first plurality of applications is accessible via network functions of a mobile network, and wherein the network functions are used to operate at least one of the first plurality of applications for a client user device based on the application information in the registry.

In Example 24, the subject matter of any one or more of Examples 13-23 optionally include subject matter where respective entities of the first and second MEC system operate according to a European Telecommunications Standards Institute (ETSI) Multi-Access Edge Computing (MEC) specification.

Example 25 is at least one machine-readable storage medium comprising instructions stored thereupon, which when executed by processing circuitry of a computing machine, cause the processing circuitry to perform the operations of any one or more of Examples 13 to 24.

Example 26 is a Multi-Access Edge Computing (MEC) system, comprising: a first plurality of MEC hosts; a MEC federator, comprising: a memory including instructions; and processing circuitry that, when in operation, is configured by the instructions to: operate a MEC federation between the MEC system and a second MEC system, the second MEC system comprising a second plurality of MEC hosts; and a MEC orchestrator comprising: a memory including instructions; and processing circuitry that, when in operation, is configured by the instructions to: identify, based on communications with the first plurality of MEC hosts, a first plurality of applications provided by the first MEC hosts; identify, based on communications with the second plurality of MEC hosts, a second plurality of applications provided by the second plurality of MEC hosts; store application information for the first and second plurality of applications in a registry; and communicate the application information from the registry to an entity of the MEC system or to an entity federated with the MEC system.

In Example 27, the subject matter of Example 26 optionally includes a plurality of MEC platforms, each of the MEC platforms located on a respective MEC host, wherein each of the plurality of MEC platforms hosts one or more of the first plurality of applications.

In Example 28, the subject matter of any one or more of Examples 26-27 optionally include subject matter where the first MEC system and the second MEC system are connected via an east-west bound interface.

In Example 29, the subject matter of any one or more of Examples 26-28 optionally include an operations support system, the operations support system configured to communicate with a first application provider via an application programming interface.

In Example 30, the subject matter of Example 29 optionally includes subject matter where the first application provider corresponds to a network operator, and wherein the network operator provides an operator platform that provides network functions to respective client devices based on the first and second plurality of applications.

Example 31 is an apparatus, comprising: means for identifying, based on communications with a plurality of Multi-Access Edge Computing (MEC) hosts in a MEC system, a plurality of applications provided by the MEC hosts; means for storing application information for the plurality of applications in a registry; and means for communicating the application information from the registry to an entity of the MEC system or to an entity federated with the MEC system.

In Example 32, the subject matter of Example 31 optionally includes means for obtaining, from a respective MEC host of the plurality of MEC hosts, an update to the application information for at least one of the plurality of applications.

In Example 33, the subject matter of any one or more of Examples 31-32 optionally include means for communicating the application information to a respective MEC host of the plurality of MEC hosts, to cause the application information to be synchronized with a respective registry hosted at a respective MEC platform of the respective MEC host.

In Example 34, the subject matter of any one or more of Examples 31-33 optionally include means for operating a MEC Orchestrator of the MEC system, wherein the MEC Orchestrator controls a plurality of MEC platforms corresponding to the plurality of MEC hosts.

In Example 35, the subject matter of any one or more of Examples 31-34 optionally include means for maintaining the application information in the registry for a plurality of applications in a MEC federation that includes the MEC system, wherein the application information for each of the plurality of applications is maintained in a registry object, and wherein properties of the registry object for a respective application include: an identifier of the respective application within the MEC federation; an identifier of the respective application within the MEC system; and a name to identify the respective application.

In Example 36, the subject matter of Example 35 optionally includes means for maintaining the registry object to include additional properties for the respective application; and means for controlling access to the additional properties based on at least one authorization policy defined in the MEC federation.

In Example 37, the subject matter of any one or more of Examples 31-36 optionally include means for communicating with a MEC federator, the MEC federator to establish a federation between the MEC system and at least another MEC system.

In Example 38, the subject matter of Example 37 optionally includes means for operating the MEC system as a first operator platform established by a first network operator, wherein the another MEC system is a second operator platform established by a second network operator, and wherein the respective operator platforms are used to provide network functions to respective client devices based on the plurality of applications.

In Example 39, the subject matter of Example 38 optionally includes means for communicating application information relating to the MEC applications from the registry to the another MEC system, via the MEC federator.

In Example 40, the subject matter of any one or more of Examples 38-39 optionally include means for obtaining additional application information from the another MEC system, via the MEC federator, the additional application information relating to one or more other applications operating at the another MEC system; and means for storing the additional application information from the another MEC system in the registry.

In Example 41, the subject matter of any one or more of Examples 31-40 optionally include means for operating at least one of the plurality of applications via network functions of a mobile network, and wherein the network functions are used to operate at least one of the plurality of applications for a client user device based on the application information in the registry.

In Example 42, the subject matter of any one or more of Examples 32-41 optionally include means for operating the respective entities of the MEC system according to a European Telecommunications Standards Institute (ETSI) Multi-Access Edge Computing (MEC) specification.

Example 43 is an apparatus comprising means to implement any of Examples 1-42.

Example 44 is a system to implement any of Examples 1-42.

Example 45 is a method to implement any of Examples 1-42.

Example 46 is an edge computing system, comprising networking and processing components to communicate with a user equipment device, client computing device, provisioning device, or management device to implement any of Examples 1-42.

Example 47 is networking hardware with network functions implemented thereupon, operable within an edge computing system, the network functions configured to implement any of Examples 1-42.

Example 48 is storage hardware with storage capabilities implemented thereupon, operable in an edge computing system, the storage hardware configured to implement any of Examples 1-42.

Example 49 is computation hardware with compute capabilities implemented thereupon, operable in an edge computing system, the computation hardware configured to implement any of Examples 1-42.

Example 50 is a computer program used in an edge computing system, the computer program comprising instructions, wherein execution of the program by a processing element in the edge computing system is to cause the processing element to implement any of Examples 1-42.

Example 51 is an edge computing appliance device operating as a self-contained processing system, comprising a housing, case, or shell, network communication circuitry, storage memory circuitry, and processor circuitry adapted to implement any of Examples 1-42.

Example 52 is an apparatus of an edge computing system comprising means to implement any of Examples 1-42.

Example 53 is an apparatus of an edge computing system comprising logic, modules, or circuitry to implement any of Examples 1-42.

Example 54 is an edge computing system, including respective edge processing devices and nodes to invoke or perform any of the operations of Examples 1-42, or other subject matter described herein.

Example 55 is an edge computing system including aspects of network functions, acceleration functions, acceleration hardware, storage hardware, or computation hardware resources, operable to invoke or perform the use cases discussed herein, with use of any Examples 1-42, or other subject matter described herein.

Implementation of the preceding techniques may be accomplished through any number of specifications, configurations, or example deployments of hardware and software. It should be understood that the functional units or capabilities described in this specification may have been referred to or labeled as components or modules, to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

In the above Detailed Description, various features may be grouped to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing node operating in a first Multi-Access Edge Computing (MEC) system, the computing node comprising:
communications circuitry configured to perform communications with a first plurality of MEC hosts in the first MEC system and a second plurality of MEC hosts in a second MEC system, the second MEC system in a MEC federation with the first MEC system, wherein the first MEC system and the second MEC system are respective operator platforms controlled by different operators; and
processing circuitry configured to:
identify, based on the communications with the first plurality of MEC hosts, a first plurality of applications provided by the first plurality of MEC hosts in the first MEC system;

identify, based on the communications with the second plurality of MEC hosts, a second plurality of applications provided by the second plurality of MEC hosts in the second MEC system;

store application information for the first and second plurality of applications in a multi-federation registry maintained in the first MEC system; and communicate the application information from the multi-federation registry to the first plurality of MEC hosts of the first MEC system, to cause the application information from the respective operator platforms to be synchronized into respective registries hosted at the first plurality of MEC hosts.

2. The computing node of claim 1, wherein operations to identify the first plurality of applications provided by the first plurality of MEC hosts include operations to:

receive, from a respective MEC host of the first plurality of MEC hosts, an update to the application information for at least one of the first plurality of applications.

3. The computing node of claim 1, wherein the computing node operates as a MEC Orchestrator of the first MEC system, wherein the MEC Orchestrator controls a plurality of MEC platforms corresponding to the first plurality of MEC hosts.

4. The computing node of claim 1, wherein the application information for each of the first and second plurality of applications is maintained using a registry object, and wherein properties of the registry object for a respective application include:

an identifier of the respective application within the MEC federation; and an identifier of the respective application within the first or second MEC system; and a name to identify the respective application;

wherein the registry object includes additional properties for the respective application, and wherein access to the additional properties are controlled in at least one authorization policy defined in the MEC federation.

5. The computing node of claim 1, wherein the processing circuitry is configured to:

communicate with a MEC federator, the MEC federator to establish the MEC federation between the first MEC system and at least the second MEC system.

6. The computing node of claim 5, wherein the processing circuitry is further configured to:

provide application information relating to at least the first plurality of MEC applications from the multi-federation registry to the second MEC system, via the MEC federator.

7. The computing node of claim 5, wherein the processing circuitry is further configured to:

obtain additional application information from the second MEC system, via the MEC federator, the additional application information relating to one or more applications operating at second MEC system; and store the additional application information from the second MEC system in the multi-federation registry.

8. The computing node of claim 1, wherein the respective operator platforms are used to provide network functions to respective client devices in either operator platform based on any of the first and second plurality of applications.

9. The computing node of claim 1, wherein at least one of the first plurality of applications is accessible via network functions of a mobile network provided by one of the operators, and wherein the network functions are used to operate at least one of the first plurality of applications for a client user device based on the application information in the multi-federation registry;

wherein respective entities of the first and second MEC systems operate according to a European Telecommunications Standards Institute (ETSI) Multi-Access Edge Computing (MEC) specification.

10. A method performed at a computing device operating in a first Multi-Access Edge Computing (MEC) system, the method comprising:

identifying, based on communications with a first plurality of MEC hosts in the first MEC system, a first plurality of applications provided by the first plurality of MEC hosts;

identifying, based on communications with a second plurality of MEC hosts, a second plurality of applications provided by the second plurality of MEC hosts in a second MEC system, the second MEC system in a MEC federation with the first MEC system, wherein the first MEC system and the second MEC system are respective operator platforms controlled by different operators;

storing application information for the first and second plurality of applications in a multi-federation registry maintained in the first MEC system; and communicating the application information from the multi-federation registry to the first plurality of MEC hosts of the first MEC system, to cause the application information from the respective operator platforms to be synchronized into respective registries hosted at the first plurality of MEC hosts.

11. The method of claim 10, wherein identifying the first plurality of applications provided by the first plurality of MEC hosts includes:

receiving, from a respective MEC host of the first plurality of MEC hosts, an update to the application information for at least one of the first plurality of applications.

12. The method of claim 10, wherein the method is performed by a MEC Orchestrator of the first MEC system, wherein the MEC Orchestrator controls a plurality of MEC platforms corresponding to the first plurality of MEC hosts.

13. The method of claim 10, wherein the application information for each of the first and second plurality of applications is maintained using a registry object, and wherein properties of the registry object for a respective application include:

an identifier of the respective application within the MEC federation;

an identifier of the respective application within the first or second MEC system; and a name to identify the respective application;

wherein the registry object includes additional properties for the respective application, and wherein access to the additional properties are controlled in at least one authorization policy defined in the MEC federation.

14. The method of claim 10, further comprising:

communicating with a MEC federator, the MEC federator to establish the MEC federation between the first MEC system and at least the second MEC system.

15. The method of claim 14, further comprising:

communicating application information relating to at least the first plurality of MEC applications from the multi-federation registry to the second MEC system, via the MEC federator;

obtaining additional application information from the second MEC system, via the MEC federator, the additional application information relating to one or more applications operating at the second MEC system; and storing the additional application information from the second MEC system in the multi-federation registry.

16. The method of claim 10 wherein the respective operator platforms are used to provide network functions to respective client devices in either operator platform based on any of the first and second plurality of applications.

17. The method of claim 10, wherein at least one of the first plurality of applications is accessible via network functions of a mobile network provided by one of the operators, and wherein the network functions are used to operate at least one of the first plurality of applications for a client user device based on the application information in the multi-federation registry;

wherein respective entities of the first and second MEC system operate according to a European Telecommunications Standards Institute (ETSI) Multi-Access Edge Computing (MEC) specification.

18. At least one non-transitory machine-readable storage medium comprising instructions stored thereupon, which when executed by processing circuitry of a computing machine, cause the processing circuitry to:

identify, based on communications with a first plurality of Multi-Access Edge Computing (MEC) hosts in a first MEC system, a first plurality of applications provided by the first plurality of MEC hosts;

identify, based on communications with a second plurality of MEC hosts, a second plurality of applications provided by the second plurality of MEC hosts in a second MEC system, the second MEC system in a MEC federation with the first MEC system, wherein the first MEC system and the second MEC system are respective operator platforms controlled by different operators;

store application information for the first and second plurality of applications in a multi-federation registry maintained in the first MEC system; and communicate the application information from the multi-federation registry to the first plurality of MEC hosts of the first MEC system, to cause the application information from the respective operator platforms to be synchronized into respective registries hosted at the first plurality of MEC hosts.

19. The at least one non-transitory machine-readable storage medium of claim 18, wherein the respective operator platforms are used to provide network functions to respective client devices in either operator platform based on any of the first and second plurality of applications.

20. The at least one non-transitory machine-readable storage medium of claim 18, further comprising instructions that cause the processing circuitry to:

communicate with a MEC federator, the MEC federator to establish the MEC federation between the first MEC system and at least the second MEC system;

communicate application information relating to at least the first plurality of MEC applications from the multi-federation registry to the second MEC system, via the MEC federator;

obtain additional application information from the second MEC system, via the MEC federator, the additional application information relating to one or more applications operating at the second MEC system; and store the additional application information from the second MEC system in the multi-federation registry.

\* \* \* \* \*